United States Patent
Masters et al.

(10) Patent No.: US 7,113,077 B2
(45) Date of Patent: Sep. 26, 2006

(54) SYSTEM AND METHOD FOR PROVIDING A DISPLAY UTILIZING A FAST PHOTON INDICATOR

(75) Inventors: Stephen C. Masters, El Paso, TX (US); Ingolf Gerber, El Paso, TX (US)

(73) Assignee: Autotronic Controls Corporation, El Paso, TX (US)

( * ) Notice: Subject to any disclaimer, the term of this patent is extended or adjusted under 35 U.S.C. 154(b) by 54 days.

(21) Appl. No.: 11/040,897

(22) Filed: Jan. 21, 2005

(65) Prior Publication Data

US 2006/0164229 A1    Jul. 27, 2006

(51) Int. Cl.
*B60Q 1/00* (2006.01)
*G08B 5/24* (2006.01)

(52) U.S. Cl. .................. 340/425.5; 340/461; 340/525; 340/815.45; 340/815.78; 362/23; 362/26; 362/612; 116/48

(58) Field of Classification Search ............. 340/425.5, 340/461, 815.5, 815.78; 362/23, 26; 116/46–48
See application file for complete search history.

(56) References Cited

U.S. PATENT DOCUMENTS

| | | | |
|---|---|---|---|
| 3,129,691 A | 4/1964 | Walker | 362/26 |
| 3,822,402 A | 7/1974 | Vest | 324/169 |
| 4,044,708 A | 8/1977 | Klein | 116/328 |
| 4,163,428 A | 8/1979 | Ishikawa | 116/288 |
| 5,047,761 A | 9/1991 | Sell | 340/815.42 |
| 5,051,688 A | 9/1991 | Murase | 324/143 |
| 5,293,154 A * | 3/1994 | Ginzel et al. | 340/438 |
| 5,359,284 A | 10/1994 | Hawes | 324/146 |
| 5,949,346 A * | 9/1999 | Suzuki et al. | 340/815.45 |
| 5,982,168 A | 11/1999 | Westberg | 324/160 |
| 6,441,746 B1 | 8/2002 | Taborisskiy | 340/815.78 |
| 6,561,123 B1 * | 5/2003 | Kallinke et al. | 116/288 |
| 6,714,126 B1 * | 3/2004 | Wada | 340/438 |

* cited by examiner

*Primary Examiner*—Donnie L. Crosland
(74) *Attorney, Agent, or Firm*—Fitch, Even, Tabin & Flannery

(57) ABSTRACT

A measuring gauge includes a rotatable LED pointer having a light output. As the pointer is rotated about a lens at a constant rate, the output of the LED pointer appears as an arc of light to a user. The arc of light represents a quantity of a desired display unit. A brushless motor and a rotary transformer are magnetically coupled to the LED pointer. A high speed controller is coupled to the motor and the rotary transformer. The controller receives an indication of the quantity and is responsively programmed to actuate the rotary transformer in order to illuminate the LED pointer as it rotates radially about a face of a graduated lens at a substantially constant speed and to activate and deactivate the LED pointer so as to adjust the length of the arc of light and thereby to indicate the quantity of the desired display unit to the user.

31 Claims, 45 Drawing Sheets

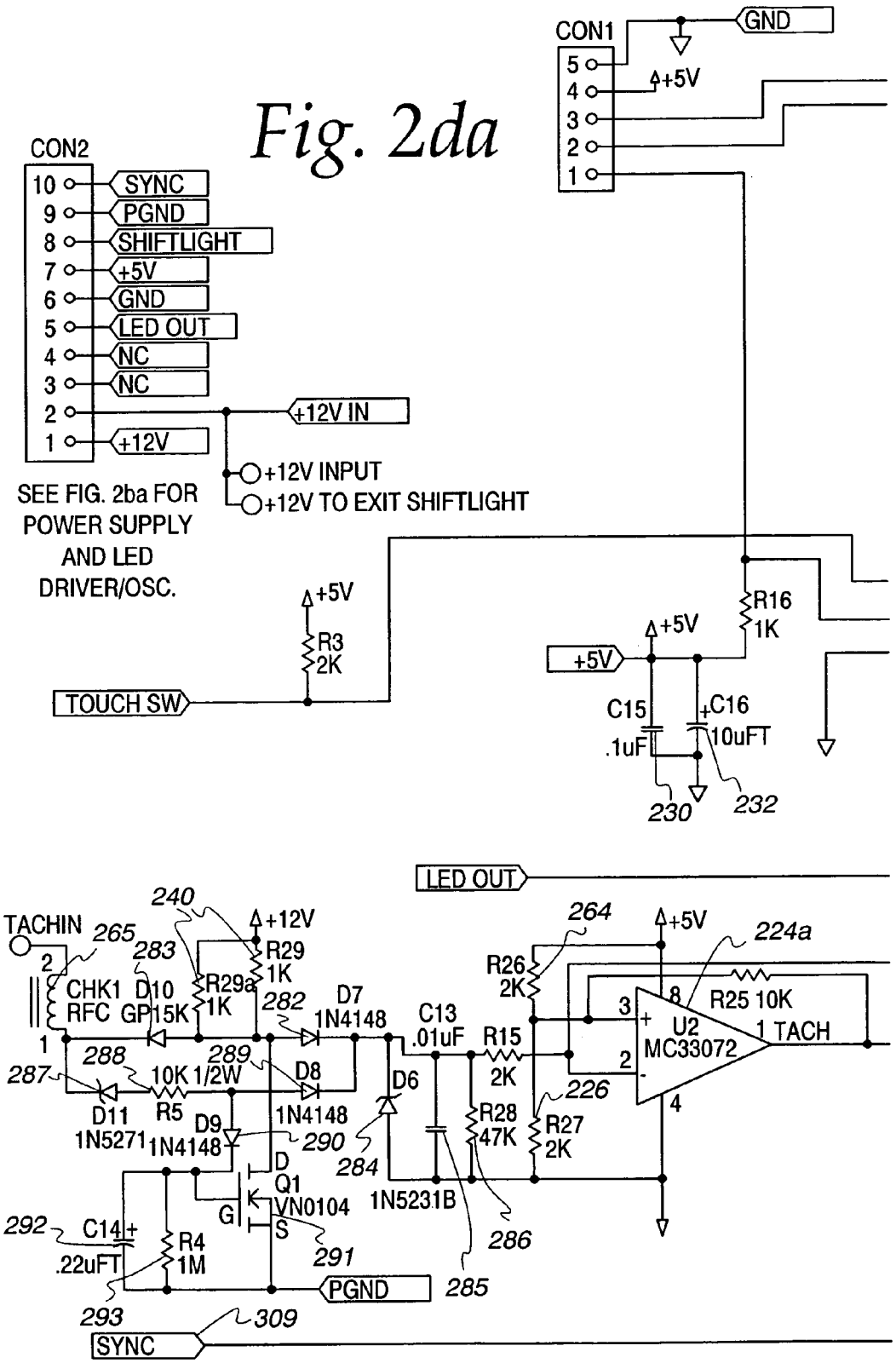

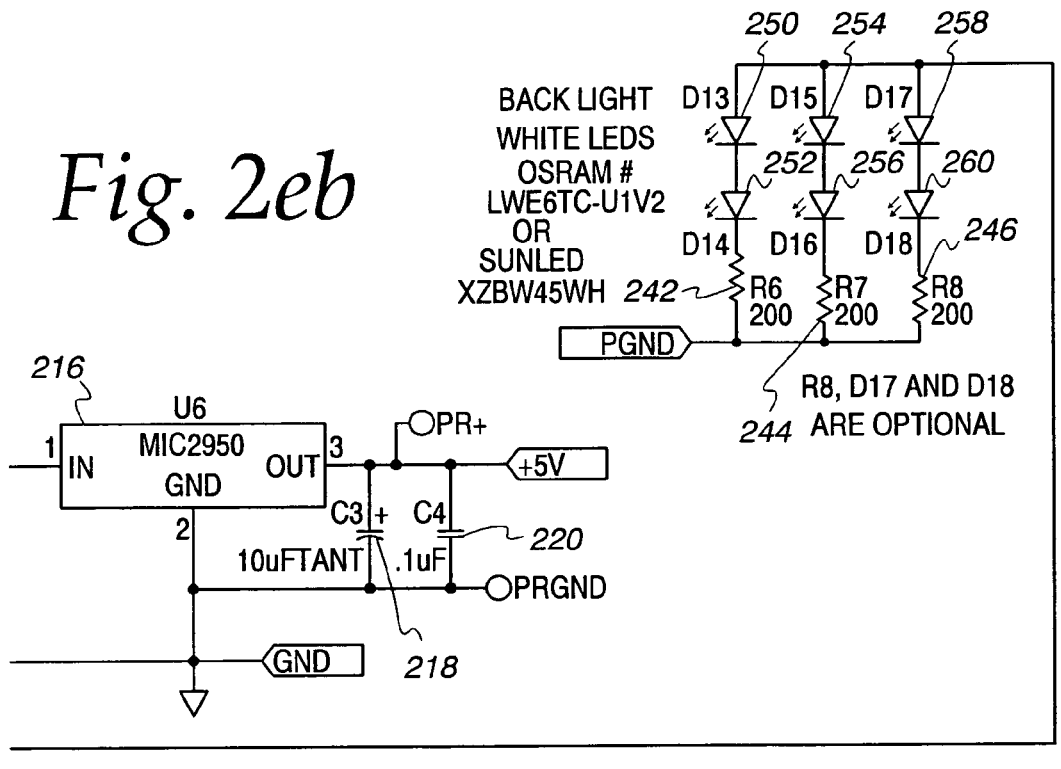
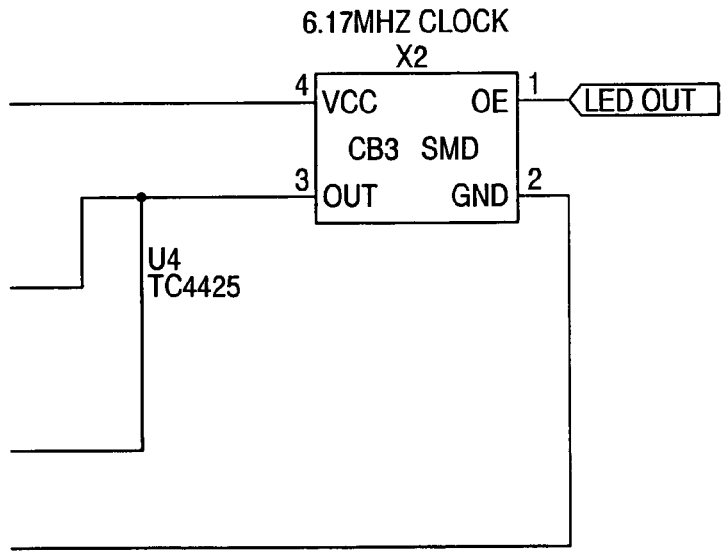
Fig. 2eb

Fig. 2f

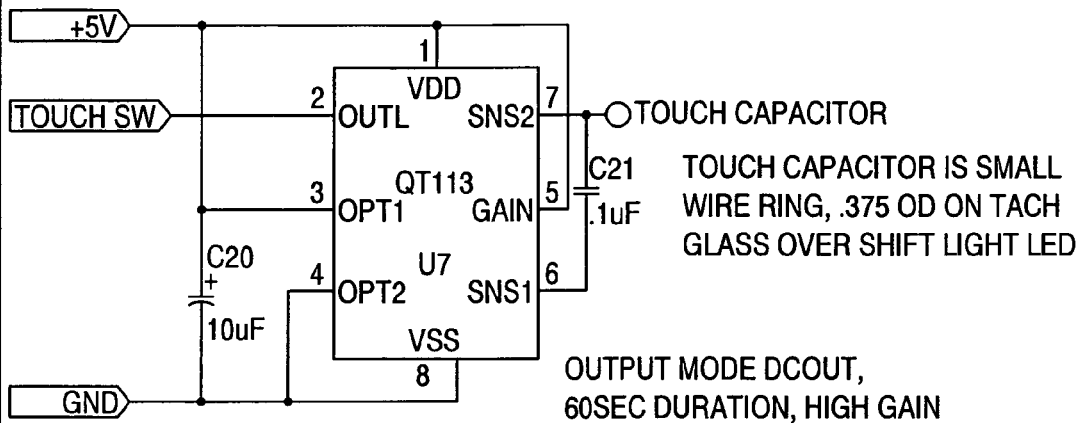

TOUCH CAPACITOR IS SMALL WIRE RING, .375 OD ON TACH GLASS OVER SHIFT LIGHT LED

OUTPUT MODE DCOUT, 60SEC DURATION, HIGH GAIN

+6.2 TO 10.2 VOLTS OUT TO TC4425 DRIVER AND SHIFT LIGHT LED OR OTHER DESIRED RANGE SET BY R1 AND R2

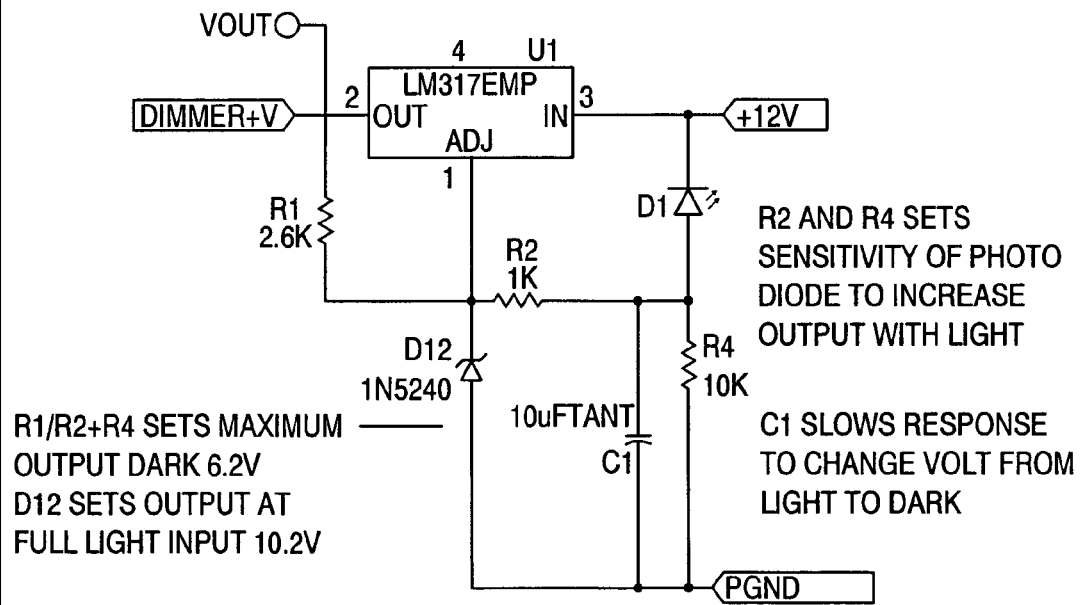

R2 AND R4 SETS SENSITIVITY OF PHOTO DIODE TO INCREASE OUTPUT WITH LIGHT

C1 SLOWS RESPONSE TO CHANGE VOLT FROM LIGHT TO DARK

R1/R2+R4 SETS MAXIMUM OUTPUT DARK 6.2V
D12 SETS OUTPUT AT FULL LIGHT INPUT 10.2V

ALTERNATE LIGHT SENSITIVE DEVICE FOR D1

PHOTOCELL

D1 OR PC IS EXPOSED TO AMBIENT LIGHT

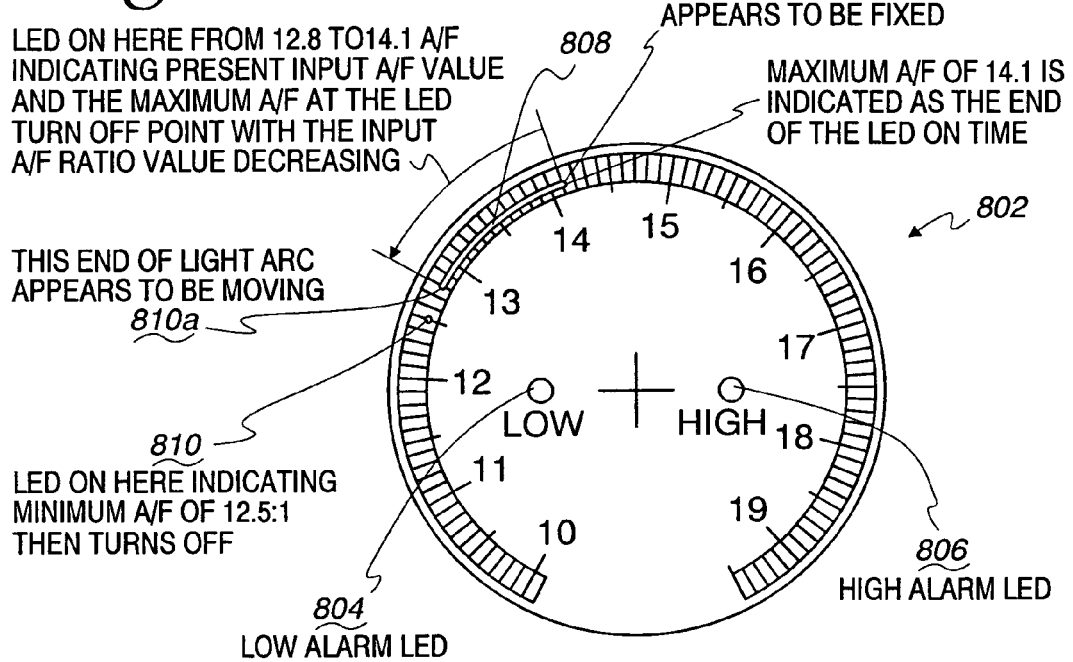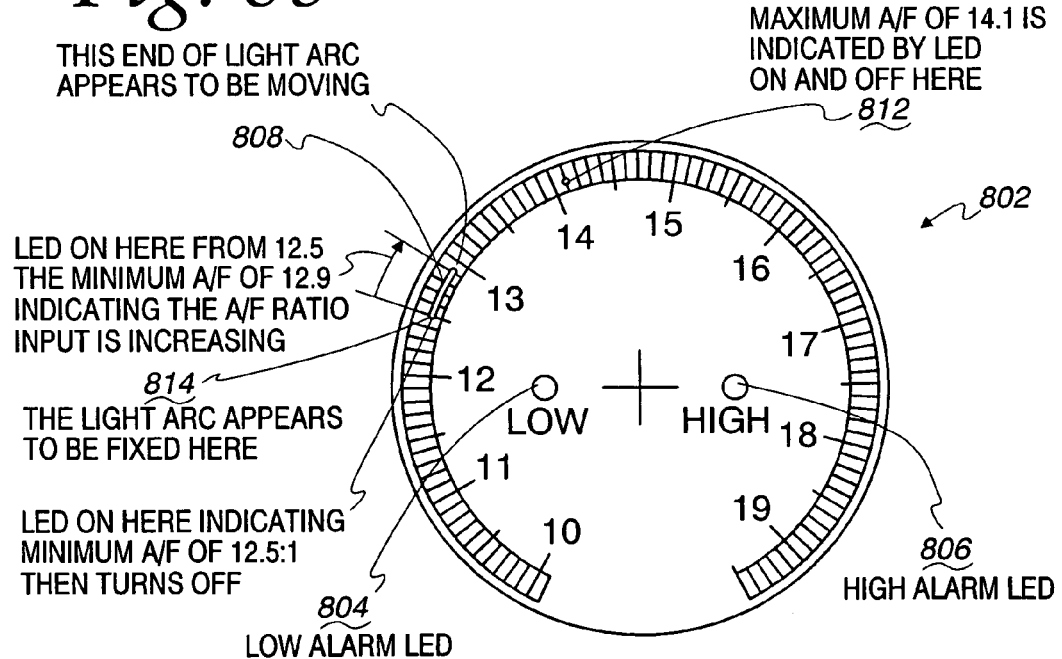

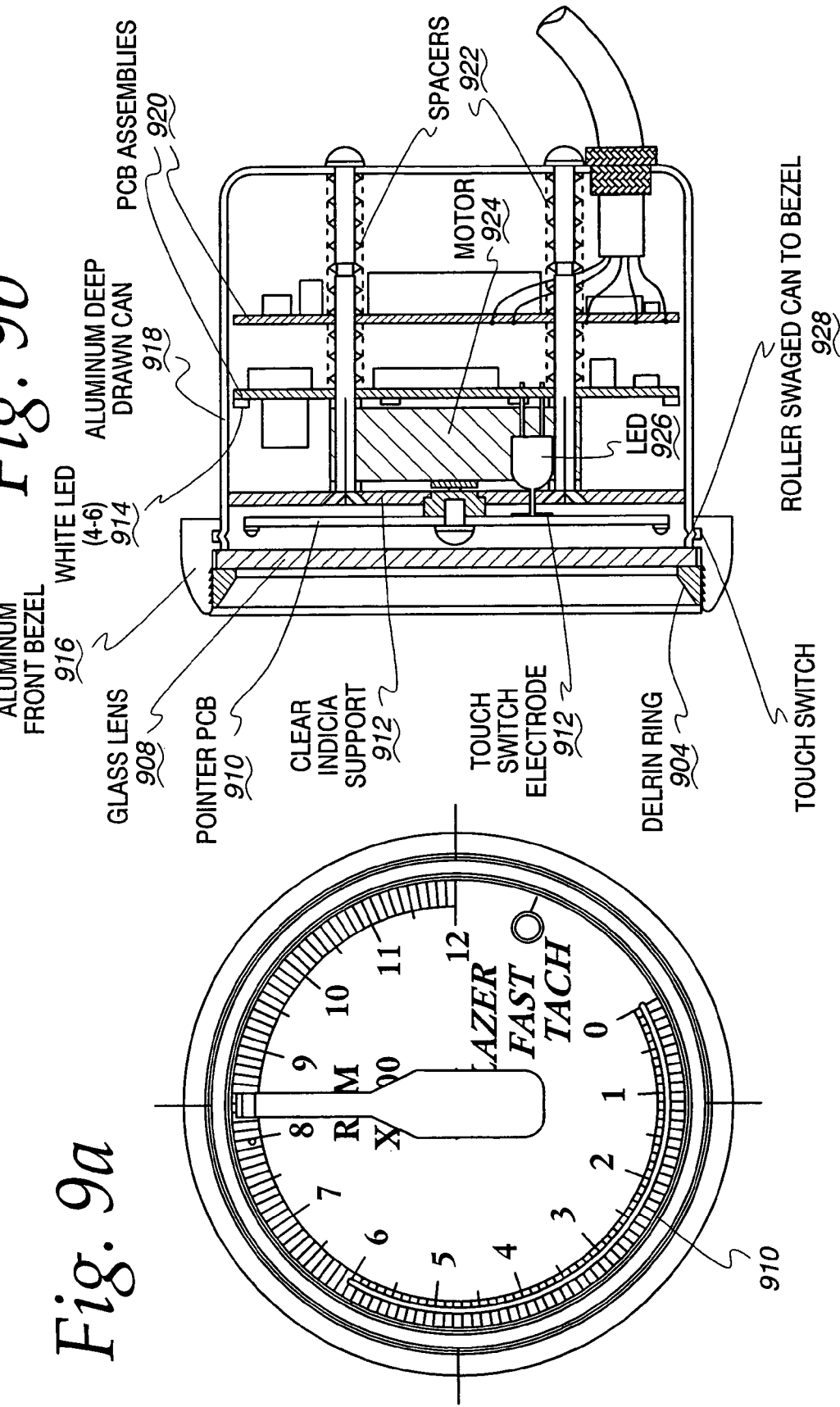

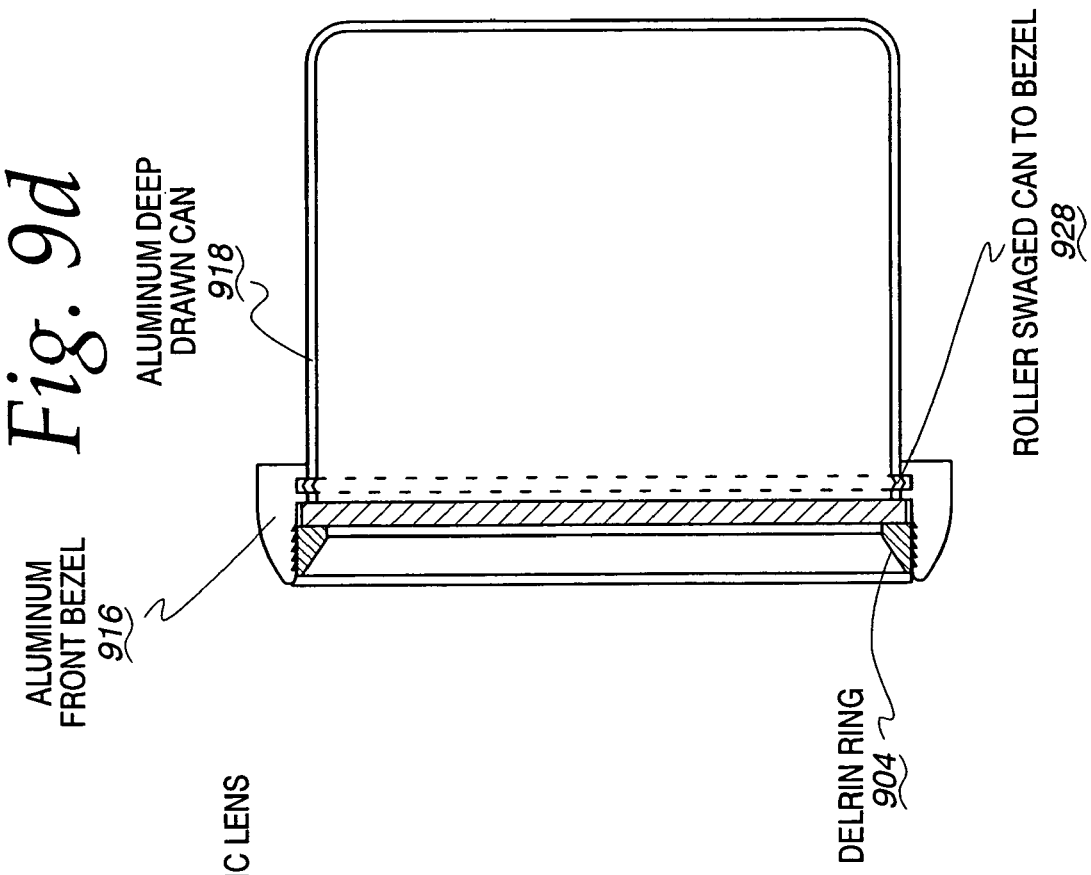
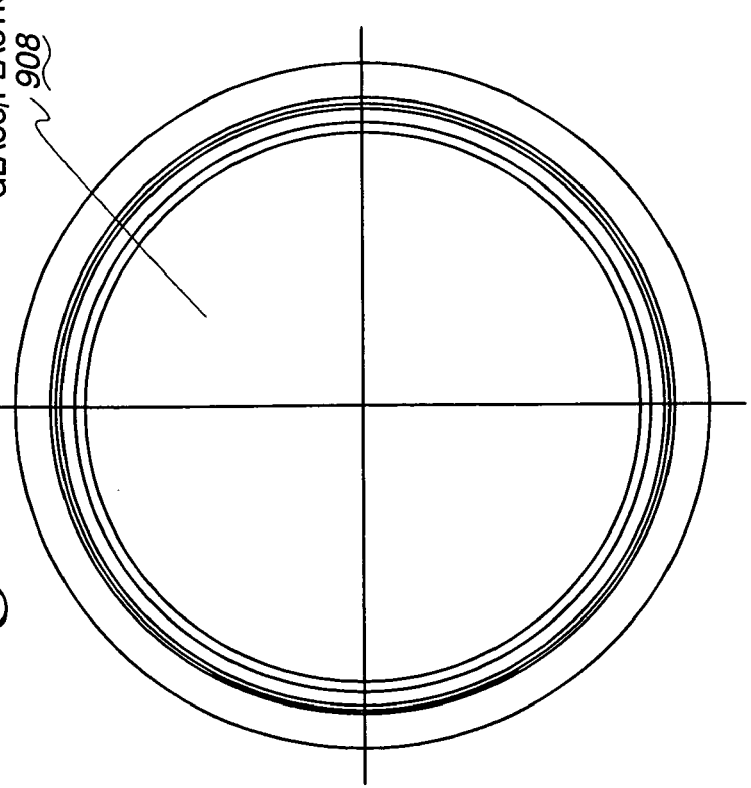

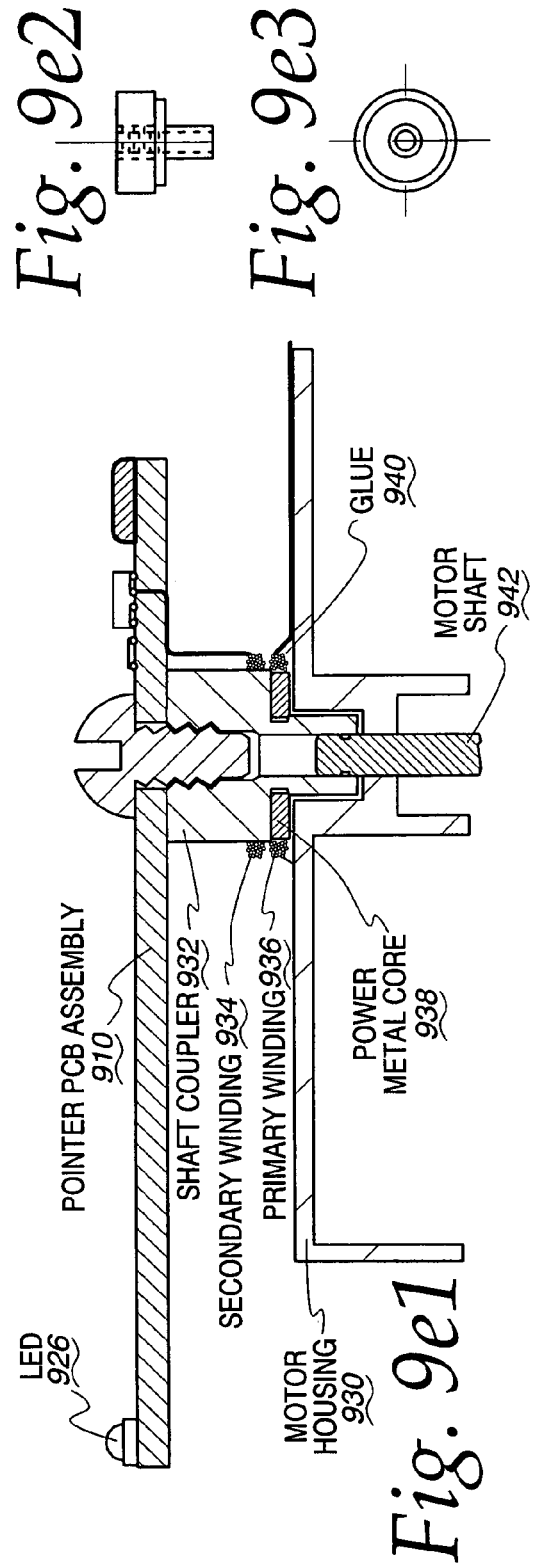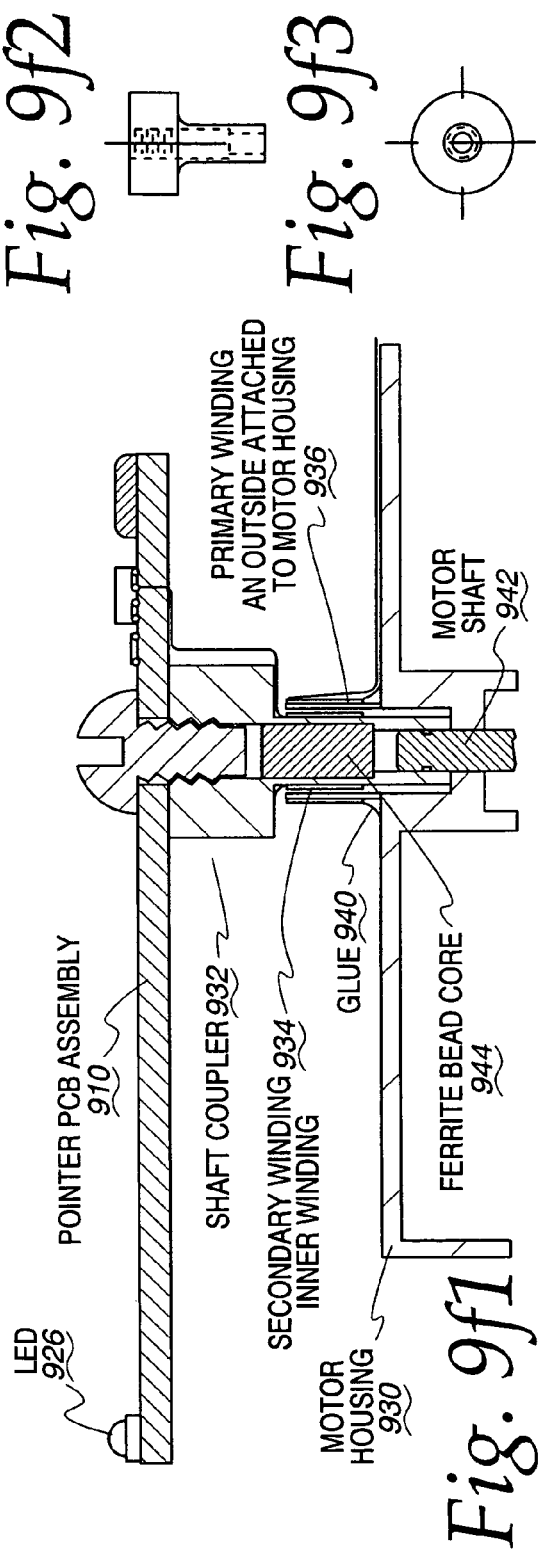

Fig. 10a1
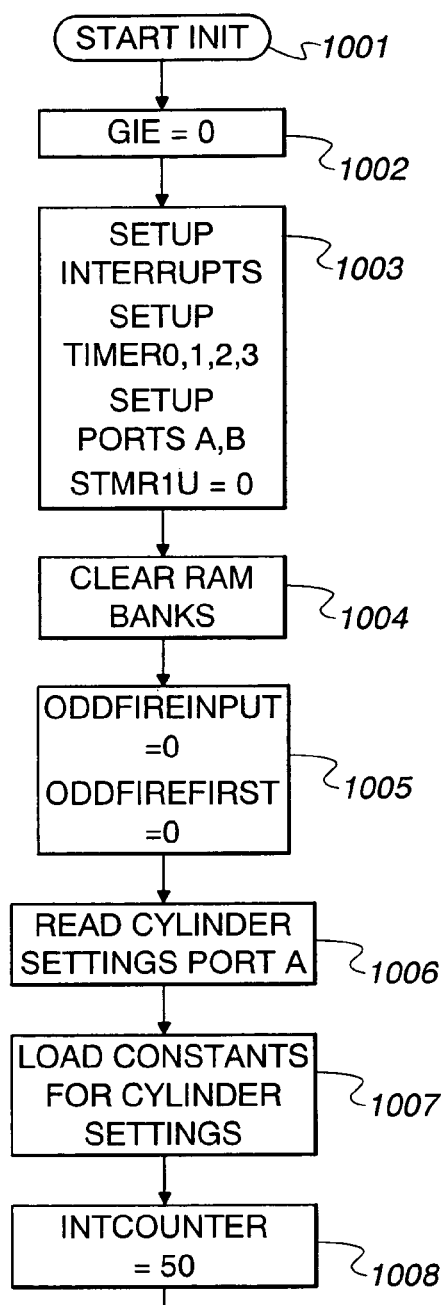
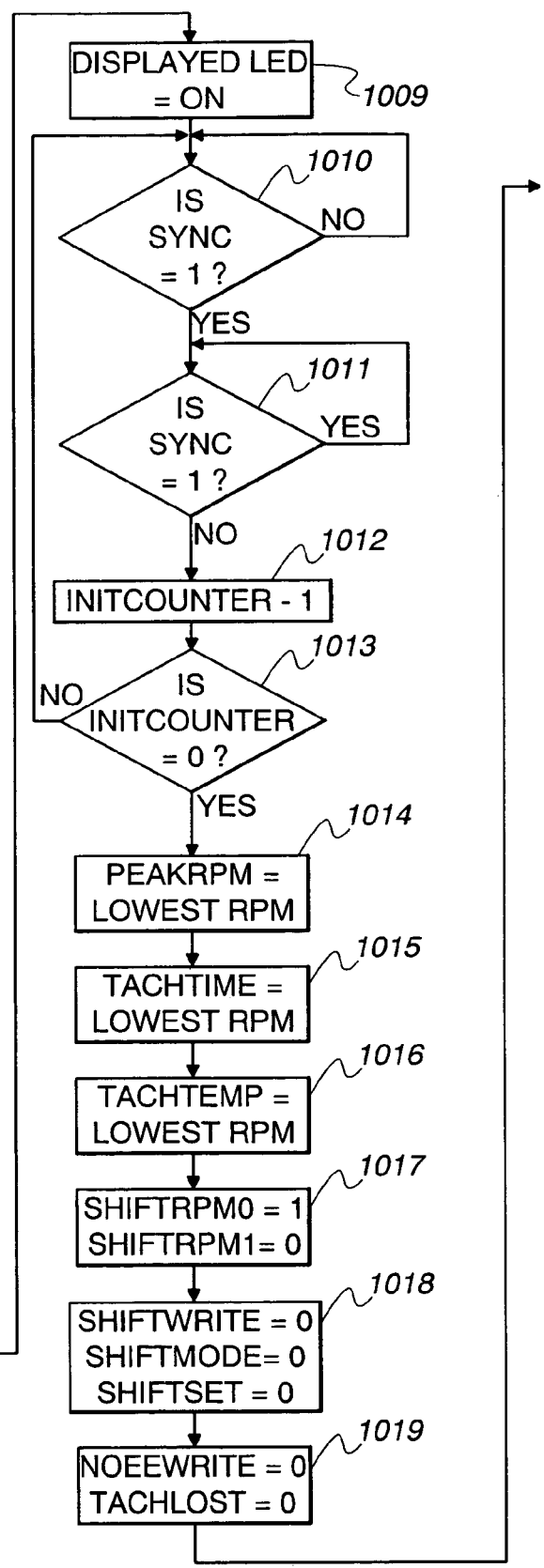

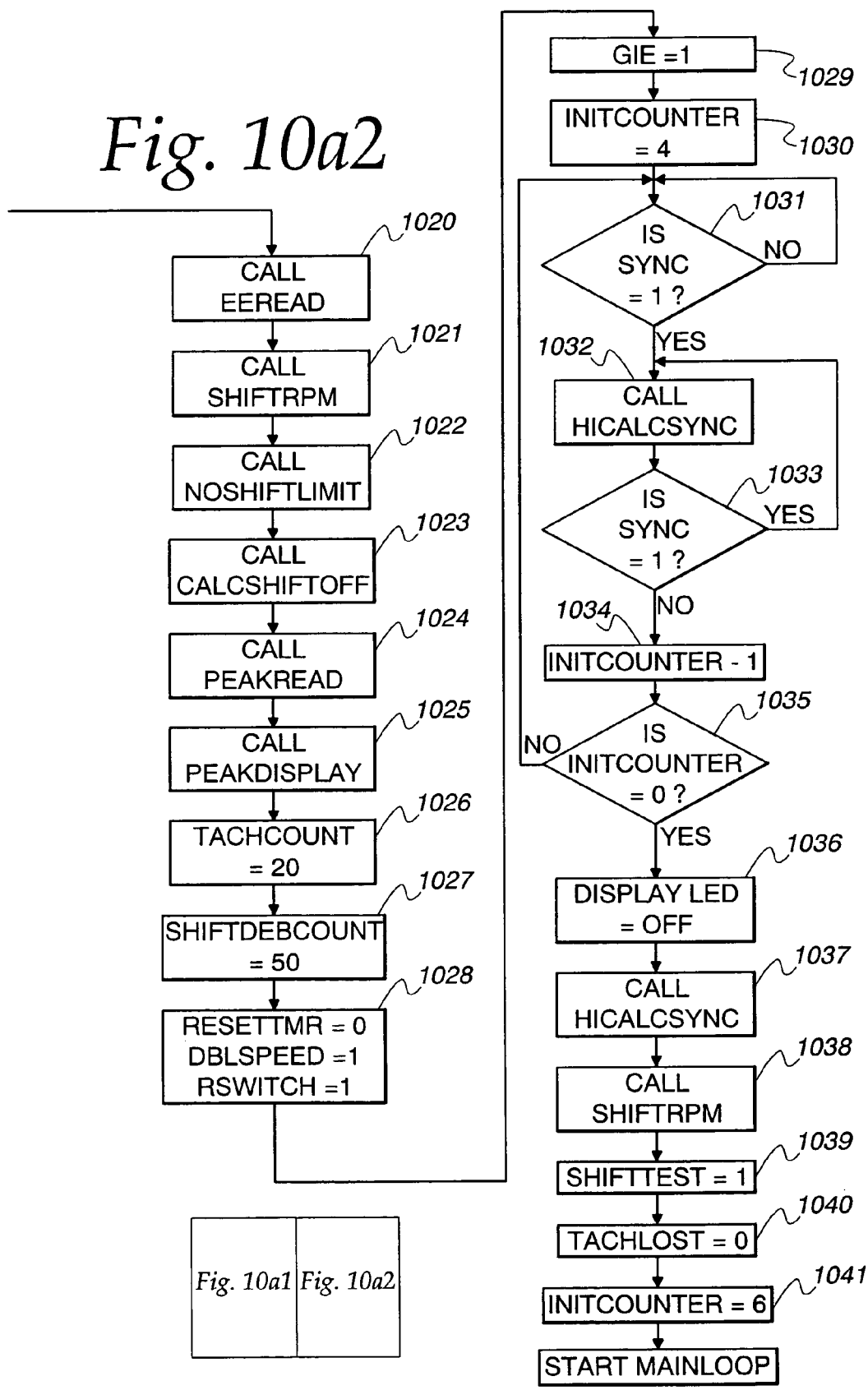
Fig. 10a2
Fig. 10a1 | Fig. 10a2

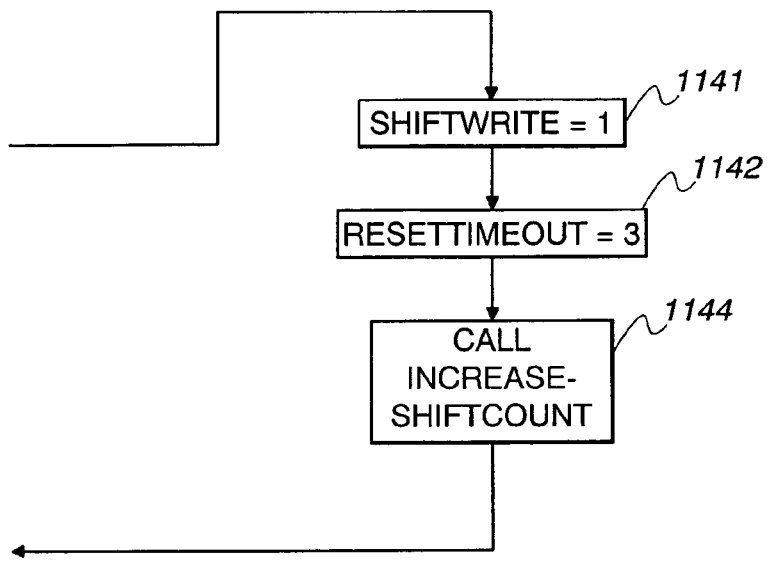
Fig. 10cb
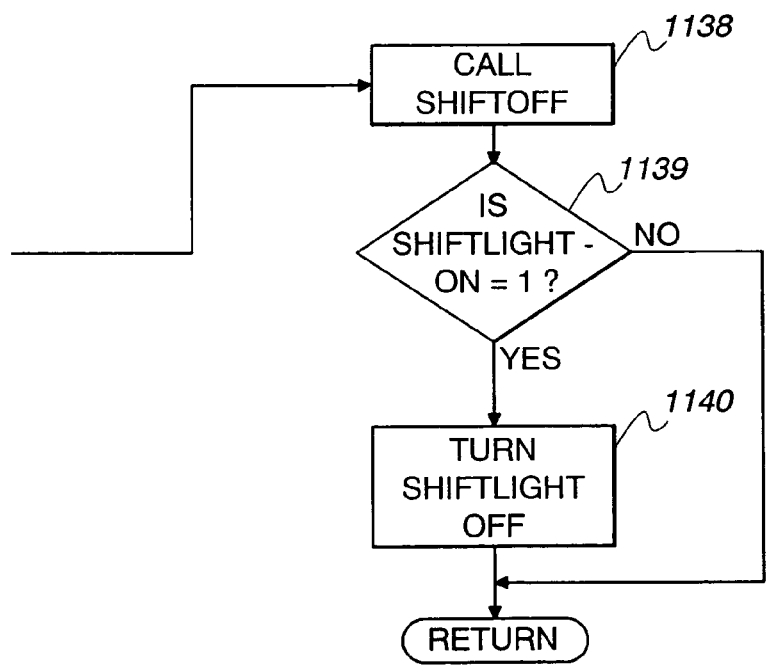
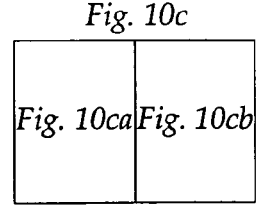
Fig. 10c
| Fig. 10ca | Fig. 10cb |

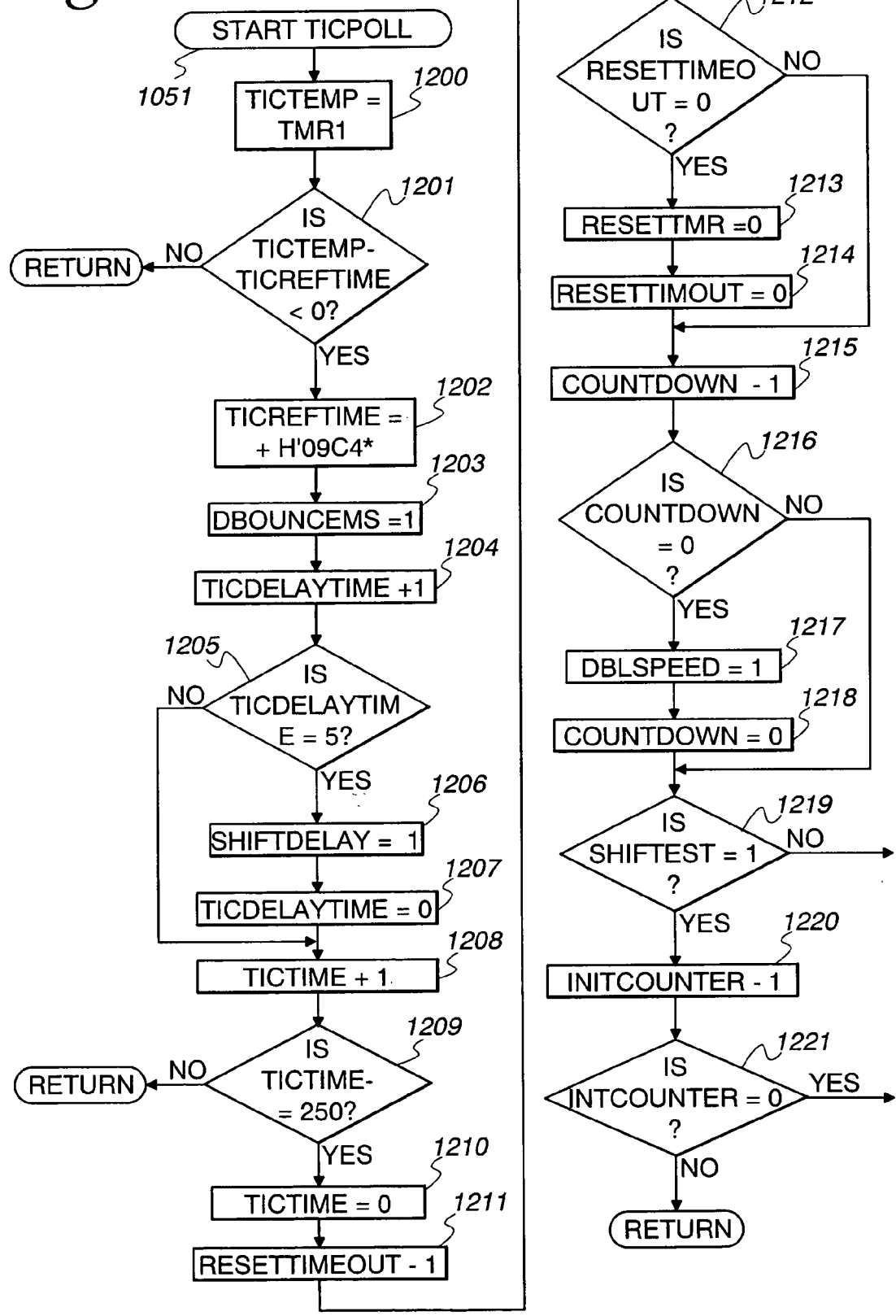
Fig. 10k1

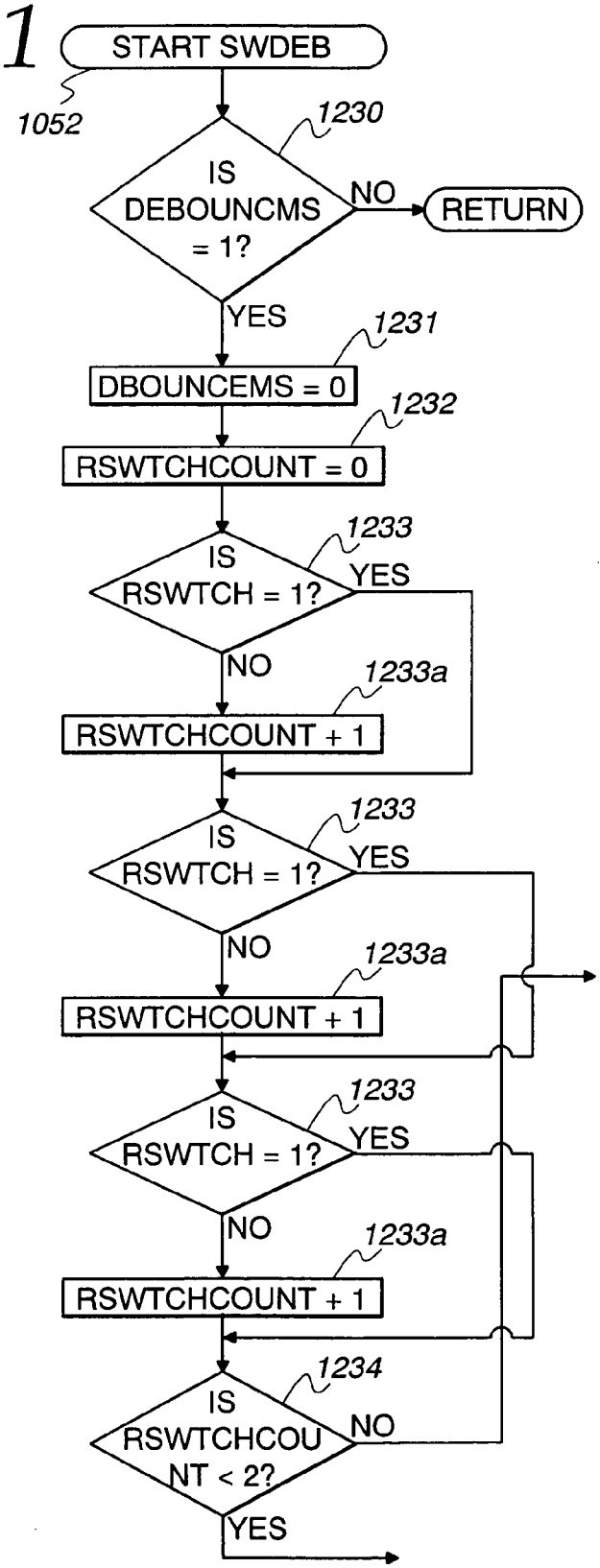
Fig. 10l1
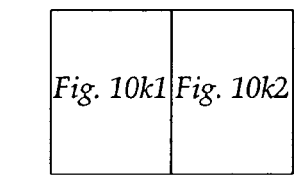
Fig. 10k2
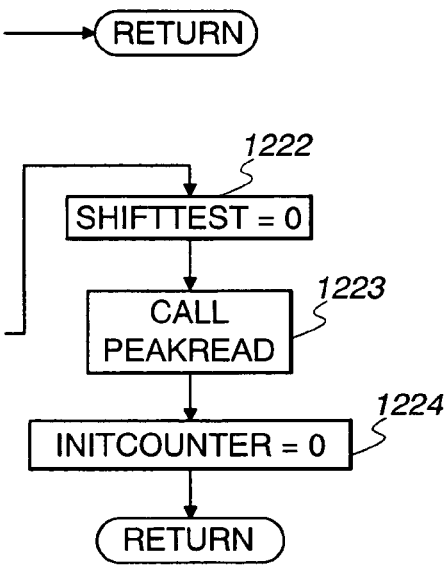

Fig. 1012
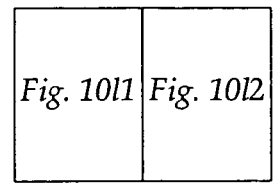
Fig. 101
| Fig. 1011 | Fig. 1012 |
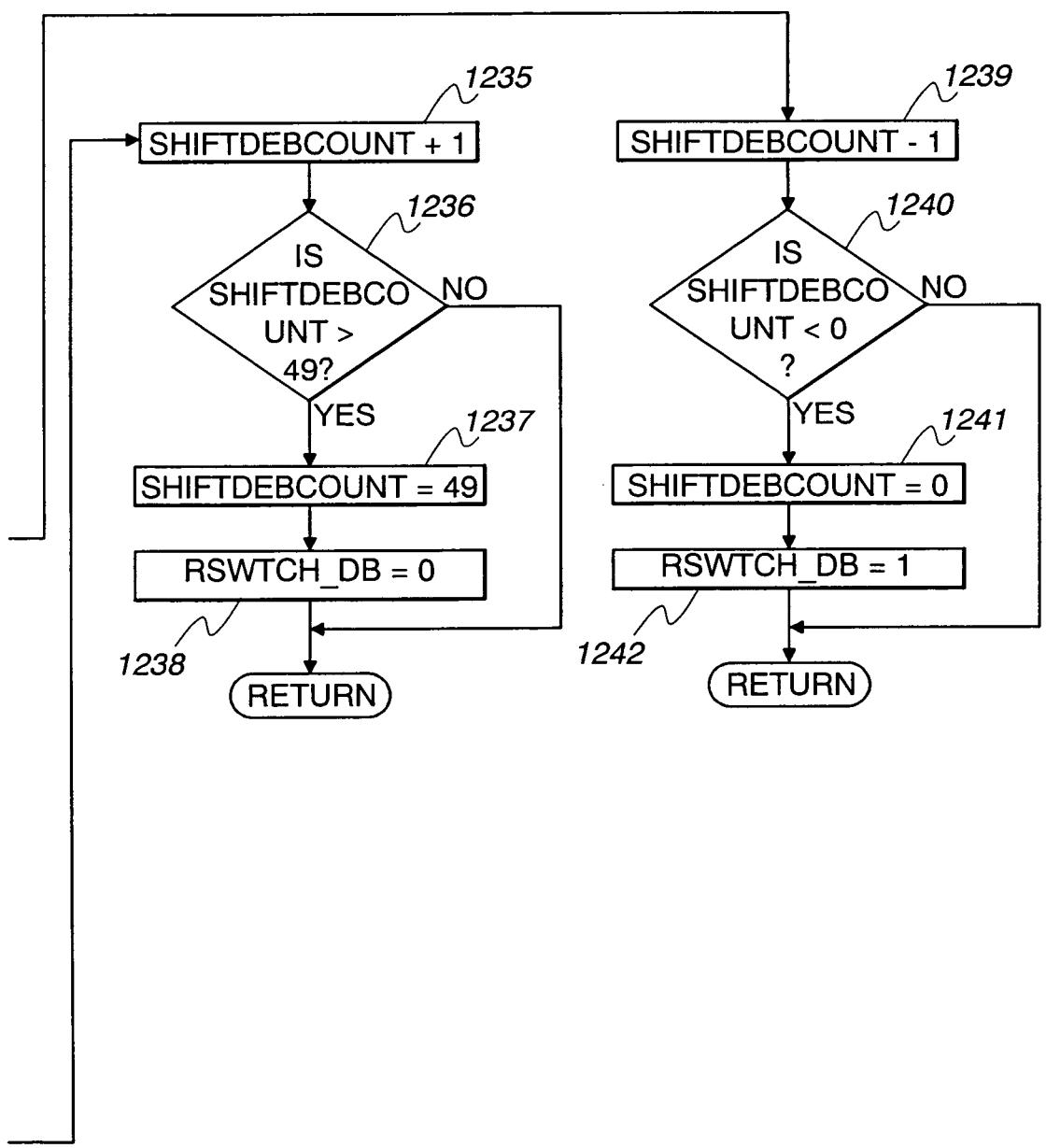

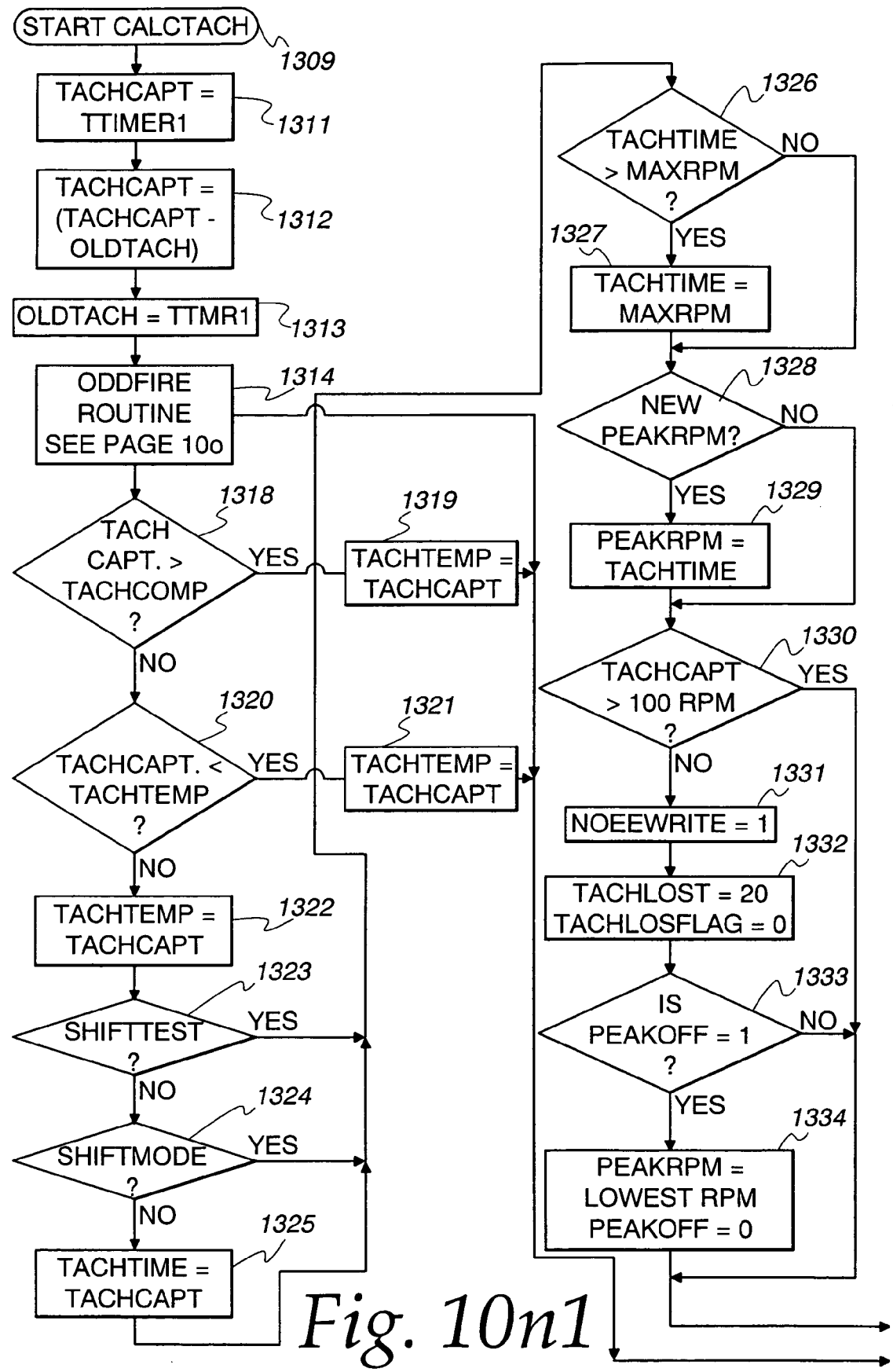
Fig. 10n1

Fig. 10n2
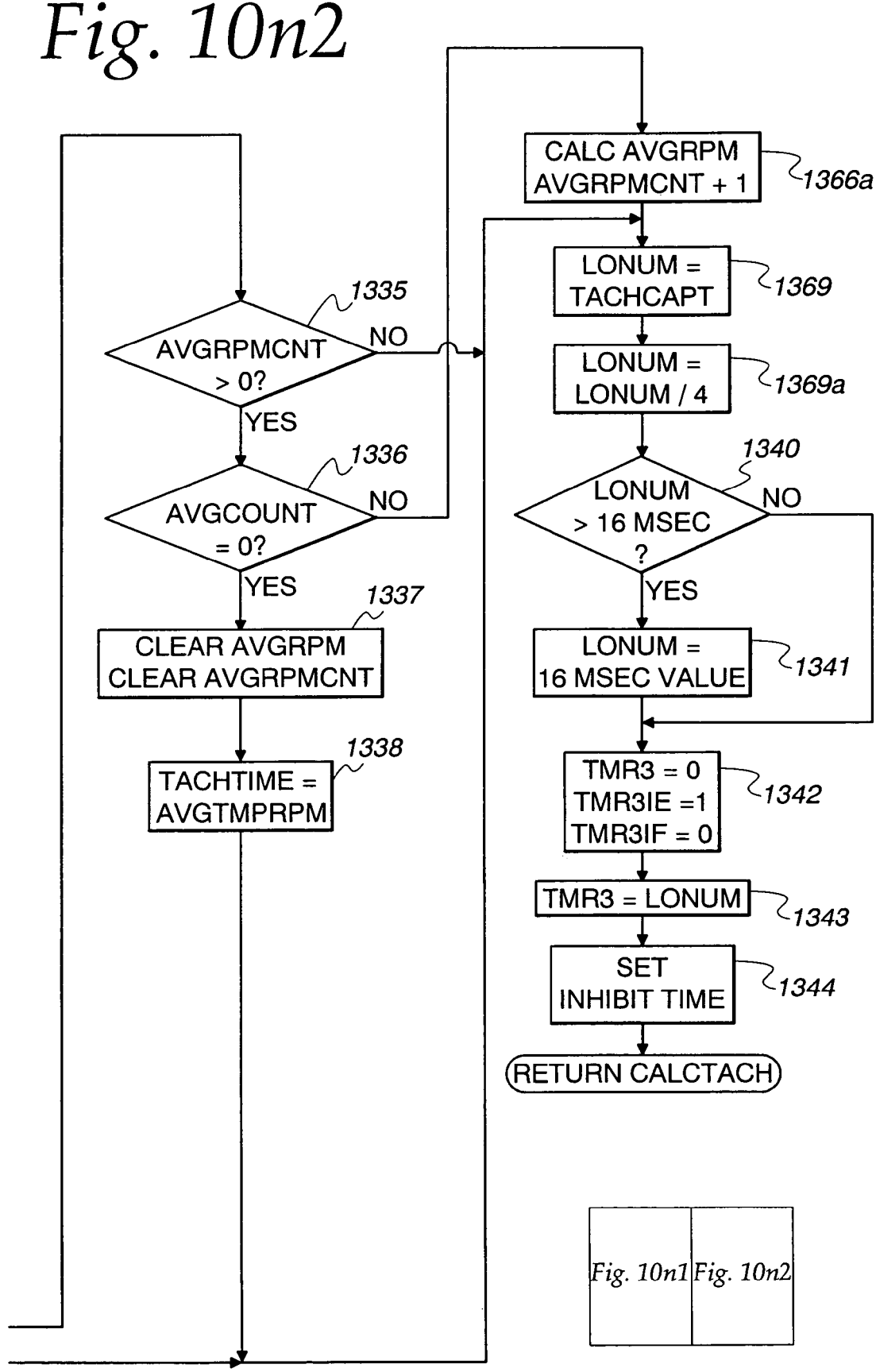

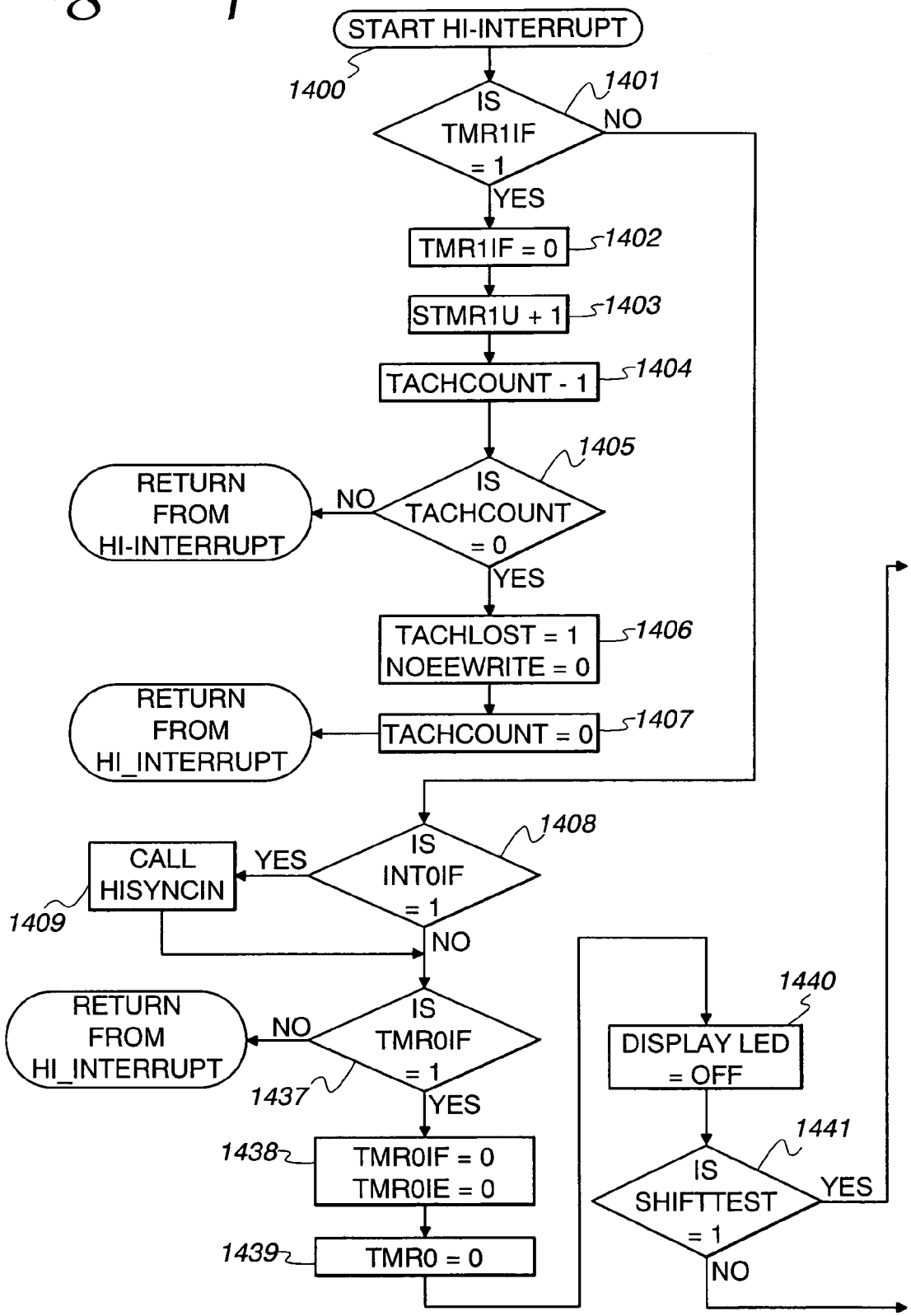
Fig. 10p1

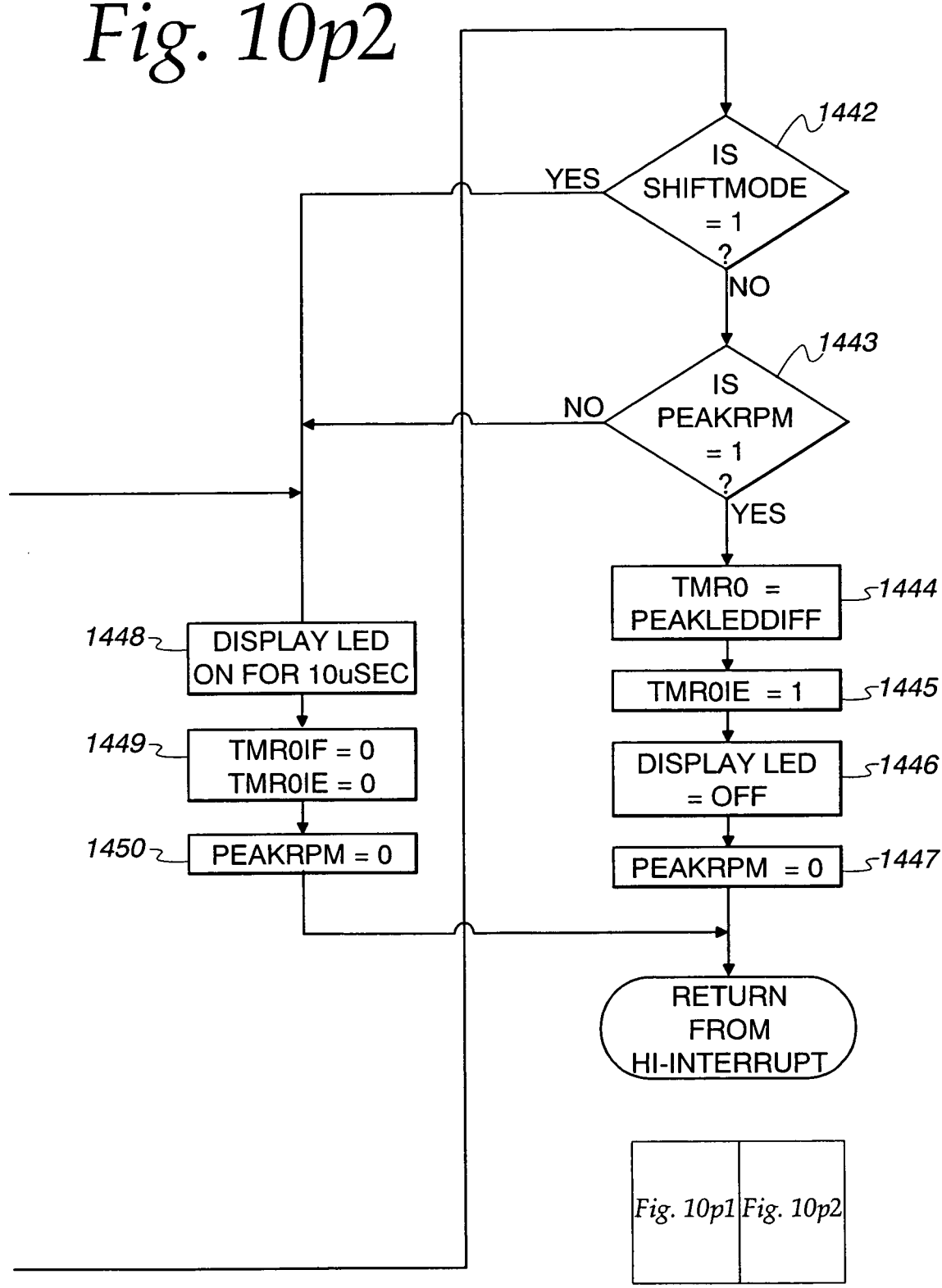
Fig. 10p2

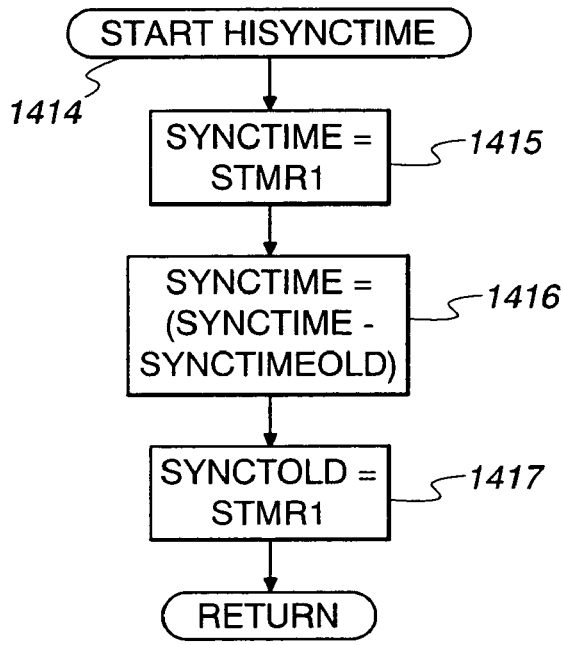
Fig. 10q
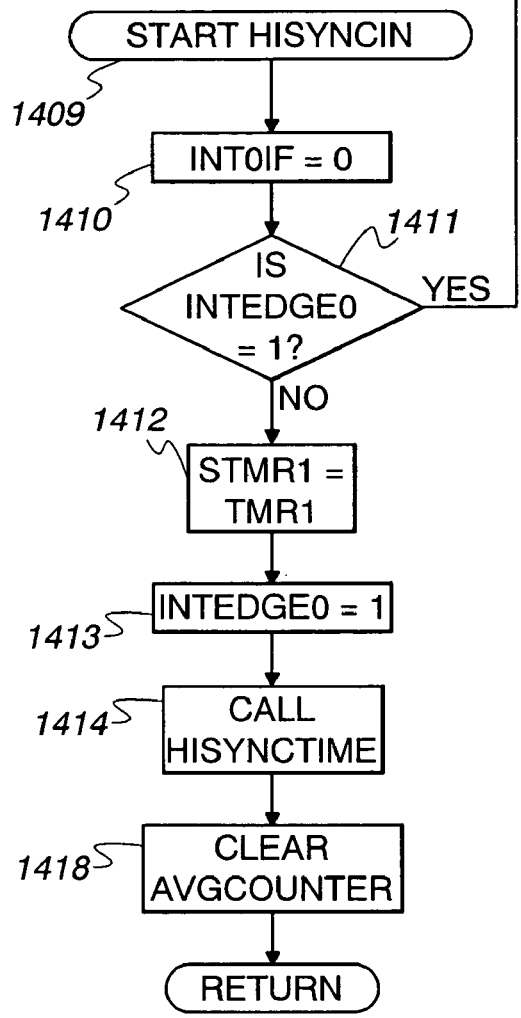
Fig. 10r1
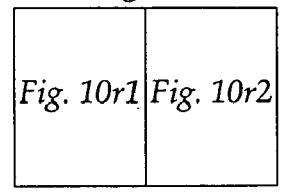
Fig. 10r

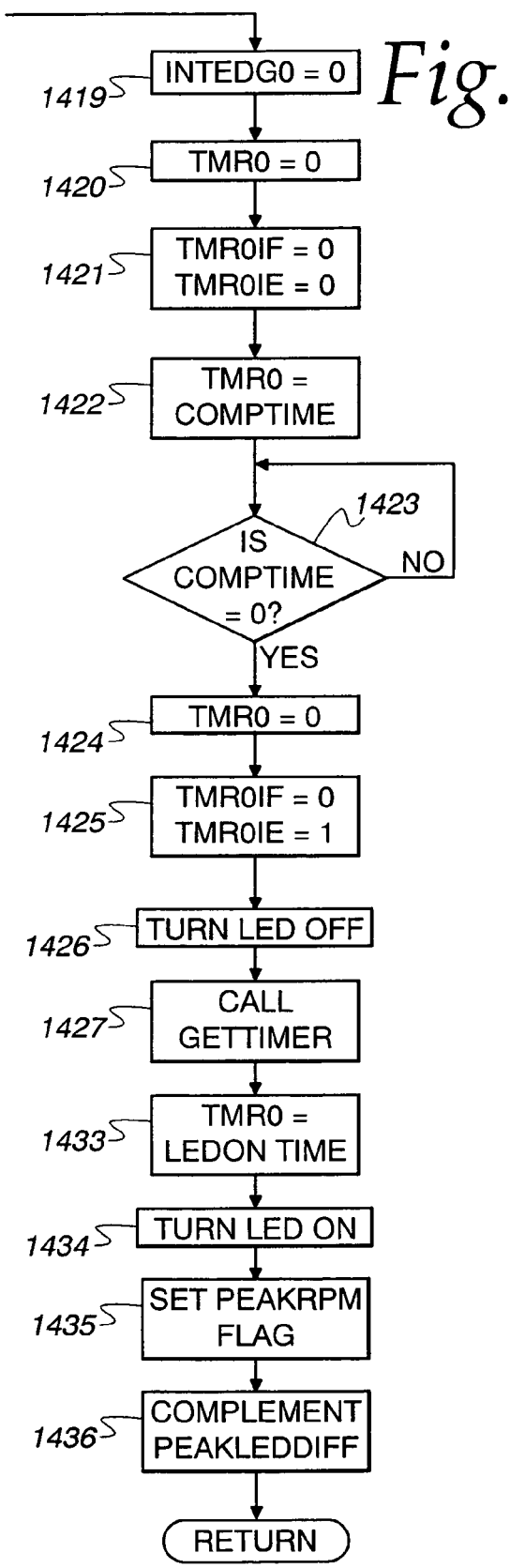
Fig. 10r2
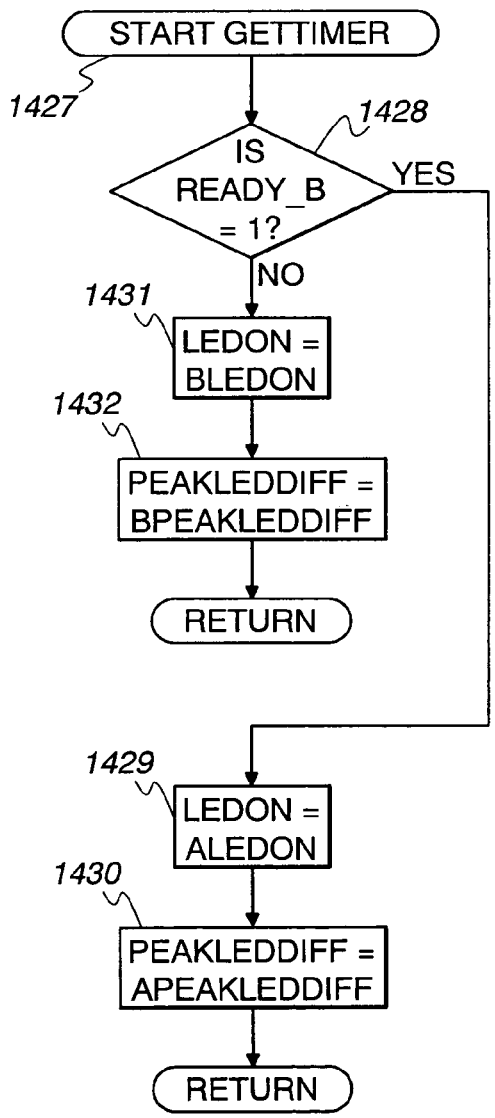
Fig. 10s

SYSTEM AND METHOD FOR PROVIDING A DISPLAY UTILIZING A FAST PHOTON INDICATOR

FIELD OF THE INVENTION

The invention relates to providing displays in vehicles. More specifically, it relates to providing tachometer and other measuring device displays to operators of these vehicles.

BACKGROUND OF THE INVENTION

The typical motors used for gauges in vehicles to indicate engine revolutions per minute (RPM) are of the cross-coil type and are sometimes referred to sine/cosine, air core, or D'Arsonval meters/motors. In addition, some gauges use a stepper motor to provide the drive force to position a pointer to indicate a reading to the vehicle operator.

In many of the previous systems, the pointer has a limited rotation angle due to the type of meter or motor used. Another limitation of previous systems is that the pointer often has a nonlinear position movement in relation to the input voltage. In some previous systems, lookup tables have been used to attempt to correct for this non-linearity while, in other systems, microprocessors have been employed in an attempt to calculate offset correction values.

Even with the use of correction tables and microprocessors, these previous systems can not indicate an accurate value for RPM or any measurement better than plus or minus one and one-half percent of the correct value across the full tachometer RPM range. This equates to over 180 RPM error at a 12,000-RPM full scale reading. Also, since this error is not constant and is much larger at the extreme ends of the angular rotation, the lowest and highest RPM values typically have the most display error.

Still another shortcoming of the air core meter is the acceleration capability of the air core meter to rapidly swing the pointer so that the RPM pointer does not lag behind the actual engine RPM. Many meter movements have limited position acceleration rates to avoid pointer jitter at low engine RPM when the input RPM data is at a low repetition rate.

In some previous systems a constant light source was used to illuminate the meter pointer. For example, in some previous systems, several light sources were embedded in a translucent material to conduct light to the center pointer shaft, which caused light to reflect along the pointer shaft. In other previous systems, rotating springs were connected to the pointer shaft to apply a power input to the pointer, which contained an embedded light source. Still other systems used a translucent material to mount both the light source and the drive circuit, thereby illuminating the faceplate and pointer. In yet other systems, multiple LEDs were used to backlight a tachometer or other gauge, which also illuminated the pointer in the center of the illuminated display.

However, in all of these previous systems, no control of the light source was provided. Moreover, the systems often had complex arrangements for providing and maintaining the light source and these arrangements were difficult and/or costly to construct and maintain.

Furthermore, in many previous systems, external switches were used for functions such as peak RPM reset and RPM switch function programming. However, these approaches led to complex devices requiring a cable from the tachometer to a switch module, mounts for the switch module, and frequent noise interference coupled into the external module or cable connecting the tachometer and switch module. Moreover, these mechanical switches were often subject to vibration, electrical and mechanical wear, and/or damage to the interconnecting cable or possible interference by the cable and other system components.

SUMMARY OF THE INVENTION

An indicating device for displaying information on a display is provided. Information such as engine RPM is provided in an analog-type format using light or photon output as the indicating mechanism. In one example, the output from a light emitting diode is used as an indicator that moves radially around the face of a graduated lens to indicate the quantity of the desired display units. The units displayed on the indicating device can be revolutions-per-minute (RPM) (for a tachometer display) but could be miles-per-hour (MPH), voltage units, current units, temperature units, pressure units, flow units or any units of measurement, which need to be displayed with a fast responding display that is easy to read in low or bright ambient light.

In many of these embodiments, an LED is rotated at a high rate of speed, typically 4000 to 6000 RPM. Higher speeds for even quicker update rates may also be used. The display appears as a solid arc shaped light beam floating behind the graduated lens. Since the LED is on for part of the revolution, every revolution, the update rate is a function of the time needed for the LED to complete one revolution.

In one example, at 5000 RPM, the time of one LED revolution is 12 milliseconds or 83.3 Hz. At this speed there is no flicker to the human eye. Since at above 30 Hz, the human eye will perceive no flicker. At an LED speed of 5000 RPM, the display is capable of indicating from zero to maximum RPM (or other chosen units) in less than 12 milliseconds.

In many of these embodiments, measured units of information, such as RPM, are indicated on a gauge face, such as the face of a tachometer, and displayed with high resolution, linearity, and accuracy. Better accuracy, better resolution and almost unlimited angular range of RPM indicia are provided with a moving pointer that rotates continuously at a high rate of speed. RPM data is displayed with substantially no jitter and requiring no filters to act upon the incoming RPM data. The RPM value is displayed with near perfect linearity from zero to maximum RPM.

Control of the pointer illumination is provided as an arc of light representative of engine RPM or other input data. The peak RPM may be continuously displayed as may the present engine operating RPM.

In others of these embodiments, a non-mechanical touch switch is used to selectively reset the peak displayed RPM, and program the RPM-Shift light turn-on RPM value. In these approaches, a microcontroller is used to measure simultaneous input data with high accuracy for RPM measurement, and provide pointer and RPM switch output control. Input power supply protection circuitry is also provided.

A non-contacting isolated drive voltage circuits may be provided for the rotating pointer LED and in an alternative approach, a light pipe/stationary LED pointer construction may be used. In many of these embodiments, a brushless fan motor is used to rotate the pointer at a constant RPM requiring imprecise speed regulation. The meter can display from center both clockwise and counter clockwise while the LED pointer is spinning only clockwise.

In still others of these embodiments, an Air/Fuel (A/F) meter can show data indicating a rich or lean condition and show both minimum and maximum A/F data simultaneously. Furthermore, a user can program high and low alarms indicating a too rich or too lean condition for both visual data on the meter and for controlling an external device.

BRIEF DESCRIPTION OF THE DRAWING

FIGS. 2a–f are schematics of a tachometer according to the present invention;

FIGS. 8a–b are faces of an air/fuel gauge according to principles of the present invention;

FIGS. 9a–h are various views of a tachometer assembly according to principles of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

Figure 1:
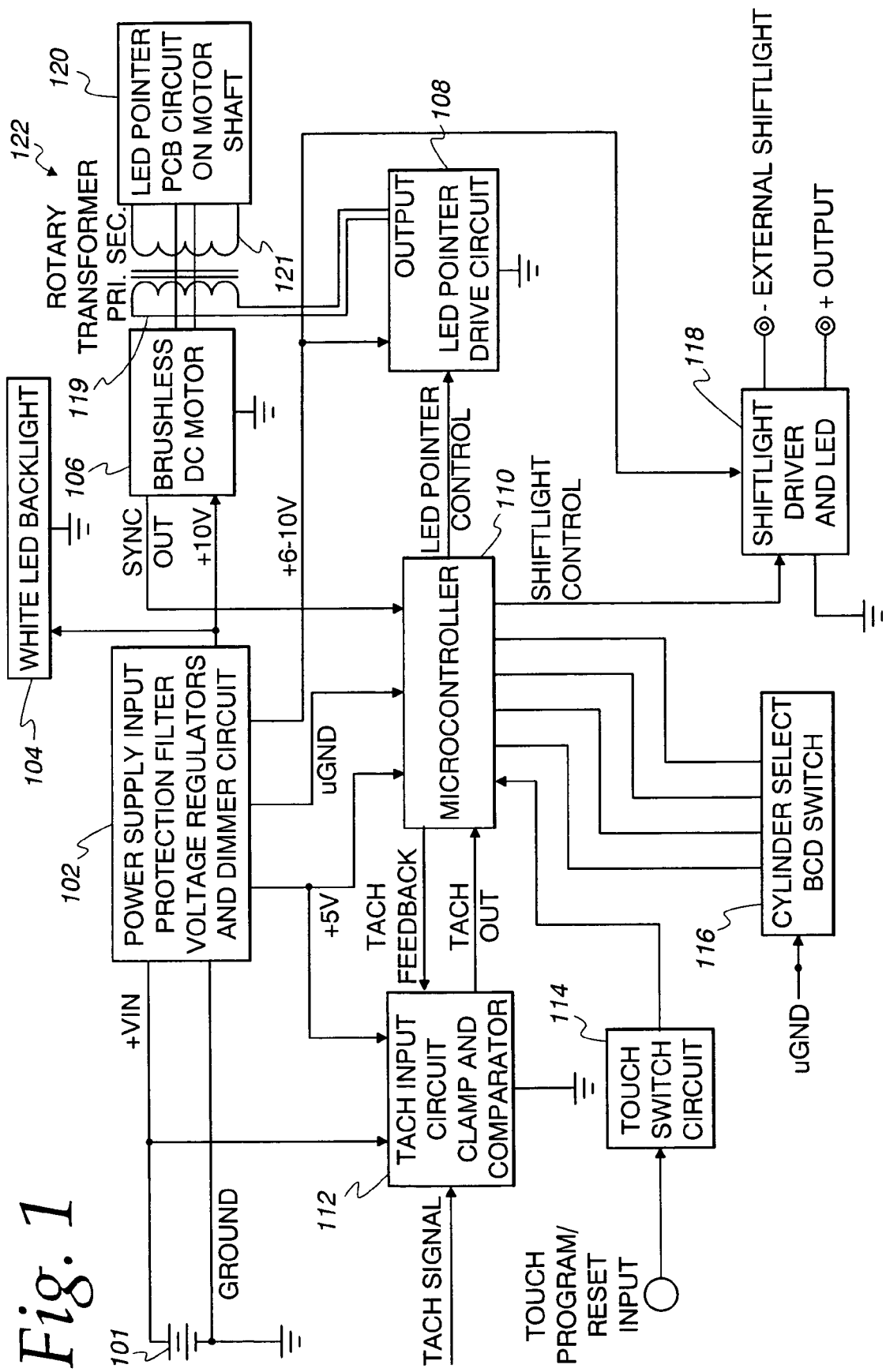
FIG. 1 is a block diagram of a system for providing a display using a fast photon pointer according to the present invention.

Referring now to FIG. 1, one example of a photon tachometer is described. Although described as being a tachometer, it will be understood that the device may be any other type of gauge or meter as well. The tachometer includes a power supply circuit 102, brushless motor 106, LED drive circuit 108, microcontroller 110, tachometer input circuit clamp and comparator 112, touch switch circuit 114, cylinder select BCD switch 116, shift light driver and LED 118, and LED pointer and PCB circuit on motor shaft 120.

In the present approaches, the interrelated analog functions of previous systems have been eliminated. The motor speed is loosely regulated and does not affect the accuracy of the displayed value or the peak displayed value. In this example, the motor speed control is simply regulated to a maximum voltage of 10 volts. The low cost brushless fan motor 106 upon which the pointer LED 120, rectifying diodes (not shown) and the secondary 121 of the rotary transformer 122 are affixed, is used in this approach.

The speed of the display motor 106 is measured for each revolution by an optically slotted switch, an optically reflective photosensor, such as a CNB10010RL sensor manufactured by Panasonic, or from the brush-less fan motor commutating hall-effect device. Preferably, this synchronizing signal is less than 50 degrees in duration to provide for proper interrupt processing by the microcontroller 110 and to allow an RPM indicated range covering an angular range of at least 300 degrees. The microcontroller 110 accepts interrupts from the display sync signal, timer interrupt, and the engine RPM input signal to control the pointer LED and shift light output switch. Since these signals can coincide with each other, the microcontroller 110 multiplexes the interrupt handling to ensure the sync signal and timer are always processed and the engine RPM interrupt is processed secondarily by using the captured time of the RPM input signal time period. Since the display speed is calculated every revolution, it does not matter if the motor speed is varying. The RPM display will always be displayed correctly with minimum error, which can only be seen with large instantaneous changes in motor speed. The inertial mass of the motor and pointer prevent large instantaneous changes in motor speed.

Power is supplied to the spinning LED pointer 120 on the motor shaft from the microcontroller 110 by the use of a rotary high frequency transformer 122. There are several approaches that can be used to supply this power such as using brushes and slip rings, or using a motor with a hollow shaft and mounting the LED stationary and using a light pipe, fiber optic or mirrors to guide the light to the desired location to be viewed.

The small rotary transformer 122 may be constructed of a ferrite bead retained in the motor shaft extension to which the PCB is mounted with the LED, diodes and secondary winding. The primary winding 119 of the transformer 122 is stationary and mounted to the motor frame surrounding the spinning secondary winding 121. The primary 119 is driven at about 6-Mhz in a preferred approach and induces a current flow in the LED of 15–25 milliamperes. In an alternate approach, a rotary transformer is constructed from a small powered metal core with a size of 0.350 inch outer diameter (O.D.) by 0.135 inner diameter (I.D.) by 0.050 inch thick, making an extremely thin rotary transformer less than 1/10 inch thick and under 1/2 inch O.D. In this example, the core is available from Magnetics Inc., part number 77030-AY-04.

The driver of the primary 119 may be a MOSFET driver such as the MC33152P from Motorola, Inc., or could be a discrete transistor bridge driver with push-pull arrangement. A 6 MHZ oscillator drives the MC33152P, which is gated on/off by the microcontroller, which is constructed from a MC14093 quad Schmitt-trigger NAND gate IC from ON-Semiconductor. Preferably, the transformer 122 is driven at a speed greater than 2 MHz to provide fast turn on of the LED and so that the oscillator can be shut down in less than 3 microseconds for accurate LED displayed RPM.

In an alternate approach, a rotating light pipe and stationary LED are used and results in a simple drive circuit for the LED. The microcontroller 110 can directly drive the LED positioned under the light pipe and focused with a small lens. This approach eliminates the rotary transformer 122, and the spinning printed circuit board (PCB) with the diodes, LED, resistor, capacitor and the gated oscillator and driver circuits. In addition, using this alternative approach, the stationary LED can be an ultra bright LED of 2,000–10,000-mcd vs. the small surface mount LED used on the spinning PCB.

Figure 3:
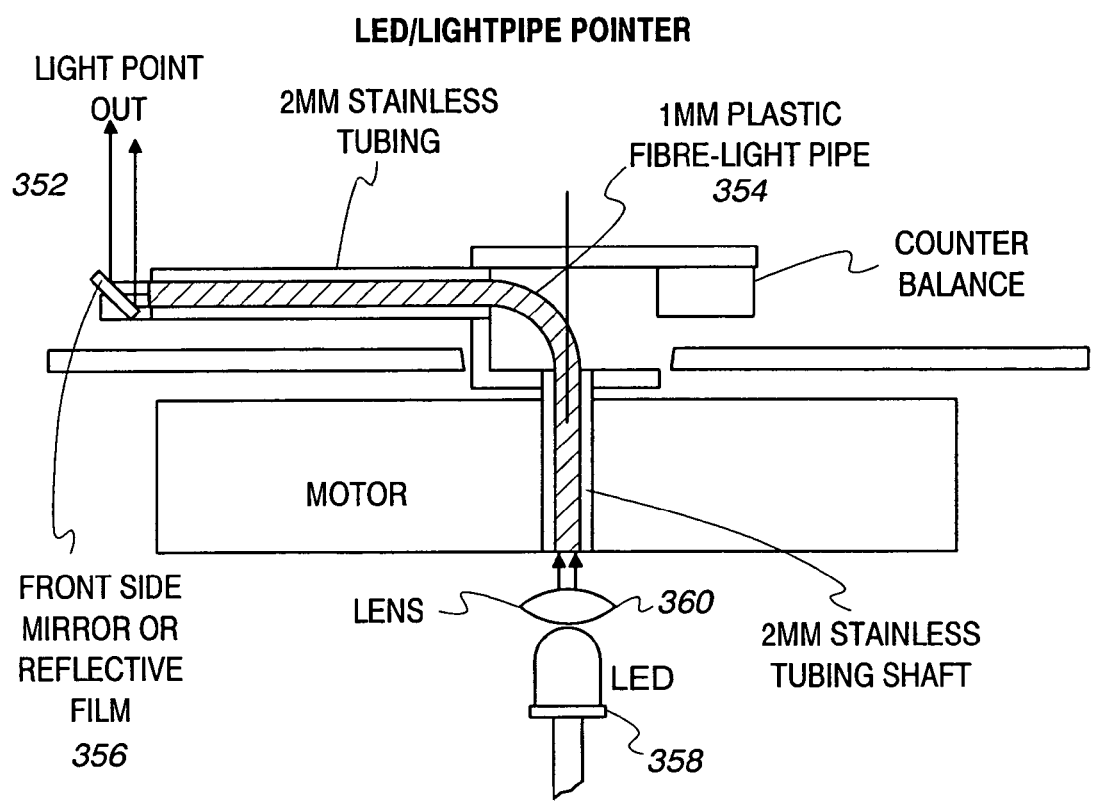
FIG. 3 is a block diagram of the use of a light pipe according to the present invention.

Referring now to FIG. 3, the construction of the light pipe pointer is described. A beam of light 352 exiting the light pipe 354 is reflected perpendicular by a mirror 356 to the tachometer face-plate displaying an arc of light just as the spinning LED would display. The light originates at the LED 358 and passes through a lens 360. Even with the attenuation of the light pipe output, since a much brighter LED is used, the display can be made equally or even brighter, if so desired, than the spinning LED pointer.

Referring again to FIG. 1, the microcontroller 110 also has a BCD switch 116 that allow the user to select the engine cylinder count of 1, 2, 4, 6, 8 cylinders or 720, 360, 180, 120, or 90 degrees input period. Other input selections could be made for other features or functions such as an odd fire tach input (e.g., the 90/150-degree V-6 engine or odd fire V10 engines) as well as 60 degrees for 12 cylinder engines. Other features could be incorporated by using the microcontroller 110.

The inputs of the microcontroller 110 include a tachometer input 112 of the engine RPM being displayed, sync input of the display, and the touch switch input to reset the peak hold RPM display and to display and set the RPM activated switch function.

The outputs of the microcontroller 110 include the LED driver 108 for the rotating RPM display pointer and the RPM activated switch output, which drives an internal LED and external load when the engine RPM equals or exceeds the programmed switch RPM at the tachometer input.

The power supply input circuit 102 consists of input protection, clamping, reverse polarity protection, filtering and regulation for the various circuit blocks. Since the tachometer must be capable of withstanding an incorrect battery potential or reverse battery potential, the power supply input circuit 102 consists of several protection devices to protect the internal circuit from both over voltage and reverse polarity at the power input terminals.

A 10-volt power supply 101 supplies a brushless fan motor 104, which draws as little as 50 milliamps. This also aids in moving heat from an LED pointer driver circuit 106 to the aluminum case. The fan motor 104 preferably includes a single white stripe (not shown), which can be a decal, silk-screened or other reflective material. This stripe is attached for the reflective photo sensor to sense the sync-signal of the fan motor position and RPM.

The motor 106 that rotates the pointer LED PCB assembly is preferably a small brushless fan motor such as a KDE1204PFB3-H from SUNON, which measures 40 mm square by 10 mm thick. It is not necessary to remove the fan fins for this application, but the motor can be modified by removing the blade assembly from the rotating hub to draw less than 50 milliamps at 5000 RPM. Other types of motors can be used and specifically designed to rotate the LED PCB assembly. In this example, mounted to the rotating motor hub is a small strip of opaque plastic, which is used to break the light beam of the optically slotted-switch used to indicate the display motor speed and zero RPM indication reference to the microcontroller. This plastic strip typically produces a sync signal of less than 50 degrees of motor rotation angle. The optical slotted switch maybe of a type such as the QVA11134QT from QT Optoelectronics, which contains an LED separated from a phototransistor.

In another example, the Panasonic CNB10010RL reflective photosensor is used with a reflective film attached directly to the rotating motor hub. With the reflective photo sensor indicating the pointer position and motor speed the motor is mounted only 1 mm above the photo sensor. This approach provides a lower profile motor sync pickup device. The sync signal device could be a Hall effect, magneto resistive device, magnetic pickup or similar speed sensing device known to those skilled in the art. The sync signal may be obtained from the motor control circuit, which contains a Hall effect device for commutation of the motor current. The motor sync signal is connected to the microcontroller interrupt (e.g., on change pin 13 of a PIC16F84A microprocessor or pin-36 of a PIC18F458 microprocessor) via a 10K–15K-ohm resistor to the collector of the phototransistor. The phototransistor emitter is connected to ground so that when the light beam from the LED (adjacent to the phototransistor) illuminates the phototransistor, the phototransistor is biased on and pulls the collector terminal to near zero volts.

The microcontroller 110 senses the voltage level change, which causes an interrupt to occur to process the sync signal. This signal may be processed using a voltage comparator to square up the phototransistor signal for faster rise and fall edges which are more precisely processed by the microcontroller 110. Likewise, when the plastic strip interrupts the light beam from the LED to the phototransistor, the phototransistor is biased off and the collector voltage rises to near +5 volts. This again causes a microcontroller interrupt to be processed, indicating the beginning of the reset period. The end of the reset period is when the microcontroller 110 begins a display cycle beginning at the zero RPM graduations on the tachometer face. The rotating display blinks a small dot at zero RPM if the engine RPM signal is not present, indicating power-on to the tachometer. Once the engine tachometer signal is present the tachometer displays the current engine RPM by illuminating the display LED from zero RPM to the current engine RPM. An arc of light begins at zero and extends to the present engine RPM. The peak engine RPM is constantly being stored and displayed also as a dot of light at the peak engine RPM on the display. In one example, if the engine accelerates to 5000 RPM for an instant then return to idle or 1000 RPM, the tachometer displays an arc of light from zero to 1000 RPM and a dot of light at the 5000-RPM graduation on the tachometer face. This dot of light, indicating the peak engine RPM, remains on the display until the tachometer is powered off or until the reset/RPM programming touch switch is pressed to reset the peak engine RPM or until the engine RPM exceeds the previously stored peak RPM, which would then locate the dot of light at the new peak RPM. Also, at power on with no tachometer input signal, the last peak RPM is also displayed, indicating the last peak RPM before power was removed.

The tachometer input circuit 112 accepts a wide range of input signal amplitudes while providing a precise jitter free output for the microcontroller 110. A tachometer signal may come from an ignition device source such that it has an amplitude of near zero to positive battery voltage levels, or it could come directly from an ignition coil terminal resulting in a signal with an amplitude near zero volts and as high as 400 volts peak with a ringing waveform due to current limiting HEI type coil drivers or normal coil primary ring out after the ignition spark has ceased flowing.

As mentioned, two external interrupt sources are connected to the microcontroller 110: the display motor sync input and the engine RPM tachometer signal. The tachometer input signal is de-bounced using an input R-C filter and adjustable inhibit period which is calculated to be ¼ of the tachometer input period provided by the microcontroller 110. This rejects noise extremely well while being able to track an engine RPM change of greater than 2:1 of the tachometer input period. The other inputs, cylinder select switches and the touch reset/RPM programming switch are polled in the main routine so as not to interfere with interrupt servicing.

The rotary transformer 122 is used to convert the microcontroller output signal to drive the rotating LED display for the tachometer indicator. This signal must be delivered from the stationary drive circuit to a rotating circuit on the motor shaft. Preferably, there should not be any physical contact between the rotary transformer primary winding and the secondary winding. In one approach, the primary of the rotary transformer is a small coil constructed of 20 turns of 36 gage magnet wire wound on a thin coil form about ¼ inch inside diameter and measuring about ¼ inch tall. This primary winding is fixed to the motor frame and is stationary. The rotary transformer secondary is wound over the nylon coil form which contains a small ferrite bead, which is commonly used to suppress high frequency noise, such as a EXC-L351350 from Panasonic, which measures 5 mm long by 3.5 mm diameter by 1.3 mm inside diameter. The nylon coil form also provides the mount to the motor shaft and the mount for the LED display printed circuit board that contains the 4 rectifying diodes, a 220-pf capacitor, a 36-ohm resistor and the surface mount LED. The outside diameter of the secondary winding is about 3/16 inch so that there is an air gap of about 1/32 inch between the secondary winding and the primary coil form. Both windings are about ¼ inch tall and overlap one another when assembled. As the primary winding is excited with the 5–6-mhz drive current a current is induced in the secondary winding, which is full wave rectified and applied to the LED to produce about 15–30 milliamps of forward LED current, enough current to drive the LED to produce at least 100 mcd of photon or light output. Since the LED has a 25-degree focused divergent beam, it appears very bright to the observer's eyes from several feet distance even when viewed in bright daylight.

The surface mount LED may be a type such as a super red output SSL-LXA228SRC-TR31 from LUMEX, which has an output of 170-mcd at 20 milliamps with a viewing angle of 25 degrees. The use of the new blue surface mount LED from LiteOn, LTST-C930CBKT, is available with a 25-degree viewing angle and produces a light output that is very intense, at 180-mcd, but has less fringing or star effect, which makes a much better accurate dot of light for use in the photon tachometer. It is very important that the LED rotating can be turned off very fast otherwise the light beam appears smeared and the peak RPM dot would be too wide. The LED and drive circuit used in this tachometer are capable of turn-on and turn-off times typically less than 2 microseconds.

The present approaches also use multiple white light emitting diodes 104 for back ground illumination. Four of these white LED's emit about 2500 to 10000 mcd at less than 40 milliamps current draw for an extremely efficient cool light source with an extremely long life compared to tungsten filament type bulbs and are also very immune to vibration that can shorten the life of filament type bulbs. This light is used to illuminate the white tachometer faceplate numerals and marker lines so they can be seen in low light. These white LED's may be a type such as SL905WCE from Sloan Corporation, which are rated at 1200-mcd at 30 milliamps and provide a 45-degree viewing angle or such as the LW E67C-U1V1-3C5D from Osram with a 120-degree viewing angle and up to 2500-mcd outputs. These have a forward voltage drop of about 3.6 volts so they are connected as two series pairs and are connected to the +10.1 volt dc supply. They are biased at about 15–20 milliamps each for sufficient light output.

The microcontroller 110 performs several functions in the photon tachometer. The microcontroller 110 processes the tach input signal and generates a tach feedback signal and controlling the tach interrupt input. The other inputs used by the microcontroller are from the motor sync signal for position and motor speed information, BCD switch input to allow the user to program the tachometer for a range of engine cylinder counts from 1 cylinder to 8 cylinder and code space available for 10 cylinder, 12 cylinder as well as odd fire engines if so desired. The BCD switch has 10 positions for user cylinder counts but a 16-position switch could also be used for a larger number of input choices. Another input is the Shiftlight/Reset peak Rpm switch input. This single input has several functions to allow the user to set the desired RPM turn on speed for the shiftlight, to inspect the present stored shiftlight RPM and reset the present peak RPM indicia. The touch sensitive switch connected to the Shiftlight/reset input has several modes of operation. When this switch is touched, once and released the tachometer LED pointer will display the current shiftlight turn on RPM value and reset the peak RPM indicia. If the switch is touched and held, after about 2 seconds the present shiftlight RPM will be reset to the lowest value, about 500 RPM and the peak RPM indicia will be reset. If the switch is touched and released and touched again within 2 seconds the current shiftlight RPM will begin to increment and will continue to until released. When the shiftlight indicia are incrementing, it begins at a slow rate and the rate will increase after 2 seconds. If the shiftlight indicia is increasing at the faster rate and the switch is momentarily released and again pressed, the shiftlight indicia will again increment slowly then after 2 seconds at a faster rate. When the shiftlight is programmed for over 6000 RPM the indicia only increments at single rate. Two seconds after the switch is released after an edit of the shiftlight RPM the new value is stored in EEPROM in the microcontroller 110 and the tachometer LED pointer resumes displaying the current engine RPM. Other operating arrangements and sequences may also be used.

The LED pointer 120 is an isolated circuit that is mounted on the fan motor shaft and is constantly spinning around at 5000 RPM. This is a unique way of operating a pointing device for indicating a value on the face of a tachometer or any other gauge to display measured value for visual indication using photons or light output as the pointing device. The pointer 120 is invisible except for the arc of light emitted. The LED pointer 120 is only on, or illuminated for a limited rotation angle corresponding to the value on the tachometer faceplate.

Referring now to FIGS. 2a–c and 2d–f, examples of tachometer circuits are described. The circuit of FIGS. 2a–c uses a PIC18F458 microprocessor while the circuit of FIGS. 2d–f uses a PIC18F1320 microprocessor. It will be understood that many of the elements and the functions of these elements are the same in both circuits and, therefore, only the elements of FIGS. 2a–c will be described in detail. It will also be understood that these circuits can be modified to provide a A/F gauge or other types of display devices and that the exact type of components and the values of components used may be adjusted to optimize performance as known to those skilled in the art.

In the case of an A/F gauge, most of the circuit is the same as for the tachometer, but instead of a tachometer input signal, the input signal is typically a 0–5 volt DC signal from a wide band oxygen sensor that has a linearized output voltage that represents oxygen air/fuel ratio with a typical range of less than 10:1 to more than 18:1 A/F ratio. A typical oxygen sensor amplifier can be used from Innovate Motorsports, the LM-1, or Dynojet Research Inc., the Wide Band Commander, which has an output DC voltage scaled to represent the A/F ratio.

The tachometer circuit is configured in two sections. The first section consists of the power supply for the motor and rotary transformer drive, and a microcontroller 222 with the input and output circuits. The second section consists of the motor and motor shaft mounted circuits.

The power supply input circuit consists of input protection, clamping, reverse polarity protection, filtering and regulation for the various circuit blocks. The battery input is connected to a polyfuse input device 202, such as a Raychem RXE030, which serves to limit any fault current at the input which could be caused to flow when the battery is connected in reverse or if the input voltage applied is greater than the break over voltage of a voltage surge clamping device 204, which maybe a type such as a P0300EC from Teccor Electronics.

When the input voltage applied to the battery and ground terminals is reversed, a current flows through the anode of diode 206 and through the polyfuse 202, only limited by the impedance of the polyfuse 202. The initial resistance of the polyfuse 202 is only several ohms, but as the polyfuse 202 quickly heats, the resistance of the polyfuse 202 increases until the polyfuse 202 can only sustain a few milliamps of current flow, thereby protecting the tachometer and wiring from a reverse battery connection. When the reverse voltage is removed from the input terminals, the resistance of the polyfuse 202 decreases, allowing the normal current to flow when the battery voltage is connected correctly to the input terminals.

The diode 206 may be a silicon rectifier such as a GP15K from General Semiconductor, Inc. This diode limits the reverse voltage across the tachometer input circuit to less than one volt typically providing protection to the input capacitors and voltage regulators. Since diode 206 is connected in shunt across the input terminals, it does not cause a forward voltage drop as it would if it were connected in series with the input to protect against reverse polarity. This lack of the typical 0.7 volt forward diode drop with the diode 206 in the shunt connection results in lower operating input voltage and reduces the input power losses due to no dissipation of the diode 206 in normal operation.

The sidactor device 204 is a voltage-clamping device that is normally open circuited across the input terminals. When the input voltage rises above a trigger threshold voltage, it will turn on resulting in a forward or reverse clamping voltage of under 2 volts typically and is capable of surge currents over 50 amps. Since the diode 206 limits the maximum reverse voltage to less than 1 volt typically, the sidactor 204 is only required to clamp positive voltage surges. When a large voltage greater then the device 204 turns on, voltage is applied across the input power terminals, the sidactor 204 turns on and causes a large current to flow from the input voltage source through the sidactor 204 and the polyfuse 202. This large current is of very limited duration as the resistance of the polyfuse 202 quickly increases and the current falls below the holding current of the sidactor 204, which then resets to a nonconductive state, which then allows the polyfuse 202 to reset to its low resistance state after the over-voltage surge has subsided. The typical turn on voltage of the P0300EC device is about 29 volts, which is the maximum voltage that will be applied to the input power supply components.

The power supply input is filtered by a 220-microfarad capacitor 208, and then filtered by the common mode choke 210, located on the power and ground input terminals. The power is then applied to a second filter capacitor 212, which, in this example, has a value of 220-microfarads, and a 1-microfarad tantalum capacitor 214 before being applied to the +5 volt low drop out voltage regulator 216. The regulator 216 is a LDO regulator such as a MIC2950-BZ05 from Micrel Electronics or an LP2950ACZ-5.0 from National Semiconductor. The output of the 5 volt regulator 216 is filtered by the 10-microfarad tantalum capacitor 218 and 0.1-microfarad capacitor 220 before supplying the microcontroller 222 and op-amps 224a and 224b.

The microcontroller 222 has additional power supply bypass capacitors 226, 228, 230, and 232 located close to the input supply terminals. The power input is also supplied to the adjustable voltage regulator 234 that is biased for a regulated output of 10 to 10.2 volts typically. Resistors 236 and 238 set the feedback to the regulator 234 for the 10-volt output. This adjustable voltage regulator 234 is a type such as an LM317 from National Semiconductor. The 10 volt regulated supply is connected to the white LED backlights, the shift light LED, the brushless fan motor, and the LED pointer driver circuit. The input voltage is also connected to a tach-input pull-up resistor 240, which in this example is a 470-ohm resistor.

The power supply may be arranged for a battery input of the voltage range of 12 to 18 volts as would be used in typical automobiles and motorcycles. An integrated circuit regulator like the LM2930 or an LM317 adjustable output type, which can be set for a regulated 10 volt DC output, regulates the battery voltage. In one example, an LM2930 8 volt regulator is used and includes 3 each 1N4148 signal silicon diodes in the ground lead of the LM2930 to ground. These diodes provide a ground reference for the voltage regulator of 2.1 volts above ground so that the output is regulated at 10.1 volts output.

The LM317 adjustable regulator 234 is used to set and provide the regulated output voltage. This 10.1 volt regulated potential is applied to the display motor positive terminal 233, and to a MC33152P dual MOSFET driver 295 that drives the primary side of the rotary transformer 319 mounted on the display motor frame. The input battery voltage is applied to the MIC2950-5 low dropout voltage regulator 216, which supplies a very accurate +5 volt to the microcontroller 222, which in this example is a PIC18F458, the reflective photo sensor LED and phototransistor, and the control switches connected to the microcontroller 222. Using the MIC2950-5 LDO 216 allows the microcontroller 222 to function down to about 5.5 volt DC battery potential. The photon tachometer maintains accurate RPM display below 9 volts input.

A common mode choke is connected in the power supply input leads to suppress high frequency noise from being passed to or from the tachometer circuitry. Sufficient power supply filtering is provided by two 220 or 330-microfarad electrolytic capacitors, one connected before and one connected after the common mode choke at the input of the voltage regulators.

The 10-volt supply is connected to the white LED backlight via current limiting resistors 242, 244, and 246, which have values of 200-ohms and limit the LED current to about 15-milliamps. The white LEDs 260, 250, 252, 254, 256, and 258 are a type such as an LW E67C-U1V1-3C5D from Osram, which emits over 2000-mcd and has an output angle of 120 degrees. The use of white LEDs lowers the input current requirement verses incandescent bulbs as well as operates with almost no heat being generated and being more resistant to vibration.

The 10-volt supplies a brushless fan motor 106, which draws as little as 50 milliamps, and also aids in moving heat from an LED pointer driver circuit 106 to the aluminum case. The fan motor 106 in the preferred embodiment has a single white stripe, which can be a decal, silk-screened or other reflective material attached for a reflective photo sensor 260 to sense the sync-signal of the fan motor position and RPM. When the white reflective stripe passes over the sensor 260, which in one example is a reflective photosensor such as a CNB10010RL from Panasonic. The light from the LED of the sensor 260 is reflected in to the photo transistor in the same package which biases the photo transistor on pulling the collector terminal connected to the 15K-ohm resistor 262 to near ground potential. The collector terminal of the sensor 260 is also connected to the input of the op-amp 224b at pin-5 via resistor 224c, the non-inverting input. The inverting input of op amp 224b (pin-6) is biased at ½ supply, or 2.5 volts by resistor pair 224e and 224f When the input at pin-5 drops below the reference of 2.5 volts at pin-6 the output of op amp 224b at pin-7 swings to near zero volts output and is sensed at the interrupt pin (pin 36) of the microcontroller 222. Hysteresis is provided from the input to the output of the op-amp 223b by the resistor 224d connected from the output at pin 7 of op-amp 224b to the noninverting input pin 5 of op-amp 224b. The feedback resistor 224d keeps the output edges from bouncing when the output changes state even though the input synch signal may not have a fast rise time at the input of op-amp 224b.

The op-amps 224a and 224b are used as low speed comparators for both the sync input and the tach-signal input circuits. These op-amps 224a and 224b are, for example, medium speed devices having a voltage slew rate of 13-volts per microsecond such as the MC33072AP from On-Semiconductor.

Figure 4:
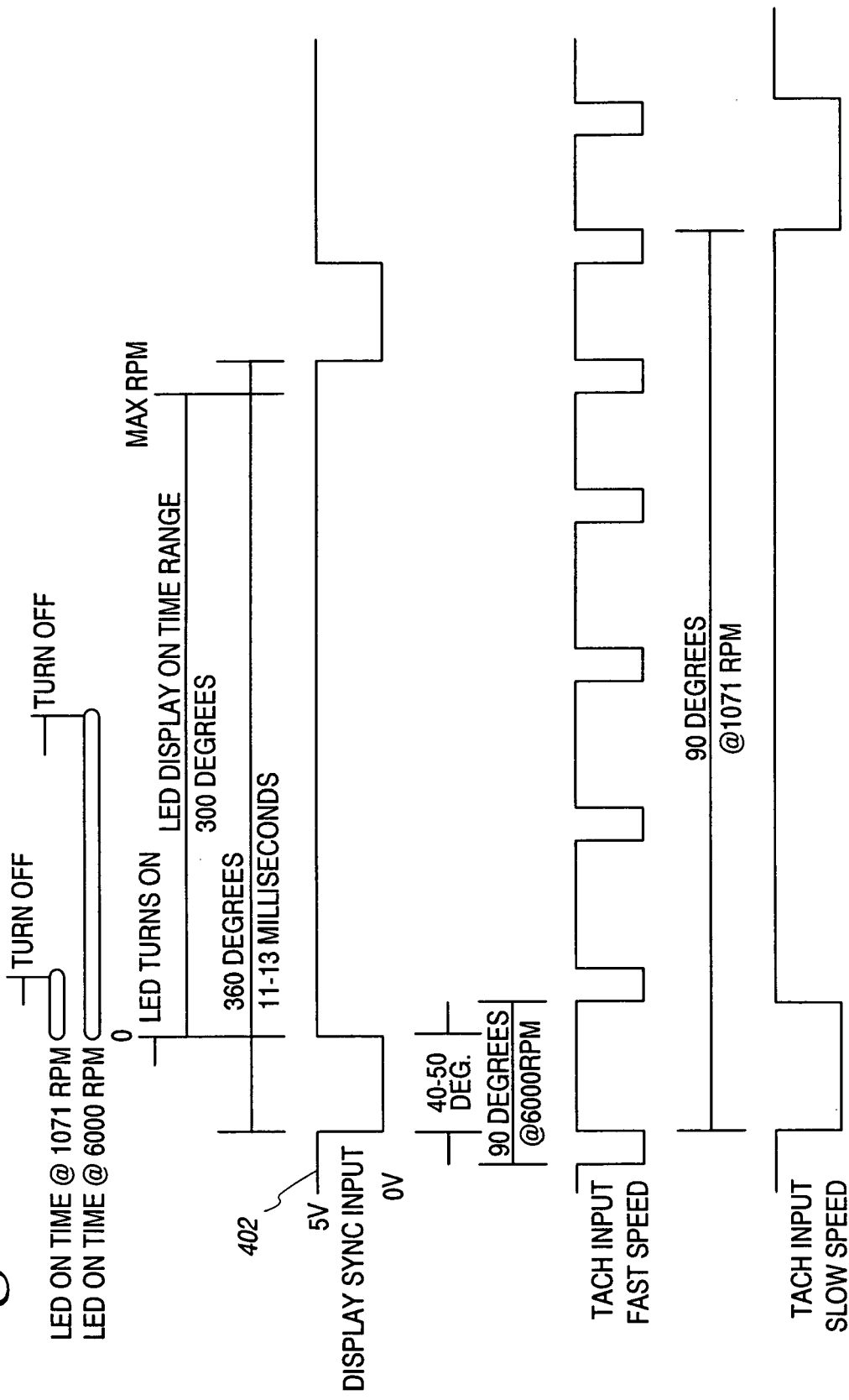
FIG. 4 is a timing chart of the operation of a tachometer according to the present invention.

Referring now to FIG. 4, a sync signal 402 is showed being applied to the microcontroller, and preferably includes a duration of 40–50 degrees. The timing of the LED pointer turn-on is at the end of the sync input period, which is located at the zero indicia on the faceplate of the tachometer. The diagram illustrates an LED on time at 1071 RPM and another LED on time at 6000 RPM. The tachometer input of a fast speed of 6000 RPM is illustrated along with the tachometer input at a slower speed of 1071 RPM.

Referring again to FIGS. 2a–f, the tach-input is connected to an input RFC choke 265 to attenuate the high frequency component of the input signal before being applied to the input circuitry. For a low amplitude tach-input signal under 100 volt peak, the path of the signal flows through resistor 240, 470-ohm resistor and through diode 282, an 1N4148 diode to the input of op-amp 224a at pin-2, inverting input. When the tach-input signal is near ground potential, the current from resistor 240 is shunted to near ground through diode 283 and the RFC 265. The non-inverting input of the op-amp 224a, pin-3, is connected to a reference voltage of 2.5 volts via the divider resistors pair 264 and 266, which are 2K-ohm resistors connected to +5 volts and ground. Also connected to the inverting input at pin-2 of the op amp 224a is a feedback signal from the microcontroller at pin-33, which is connected through diode 268 and resistor 270, a 4.7K-ohm resistor. The feedback signal provides a ¼ period inhibit time for noise immunity at the comparator input after the trigger edge of the tach-input signal has been processed by the microcontroller 222.

The tach-input circuit uses a positive feedback loop connected around the op-amp 224a from output pin-1 to the non-inverting input pin-3, but this may not be reliable enough alone when using a high amplitude tach-input signal from an ignition coil primary. When the tach-input signal at pin-2 of the op-amp 224a, configured as a voltage comparator, rises above the reference voltage of 2.5 volts, the op-amp output at pin-1 goes low, and this is connected to two pins of the microcontroller, pins-19 and 37.

Pin-19 of the microcontroller 222 is the timer capture/compare input, which is used to capture the tach-input period with high accuracy. The second pin-37 of the microcontroller 222 is connected to the tach-input and is used as the interrupt input pin. Since the PIC18F458 microcontroller 222 uses both low and high priority interrupts, the low priority interrupt level is assigned to this interrupt input pin. The microcontroller 222 does not have to service the tach-input interrupt instantly to measure the tach-period because it is stored in the capture timer until the interrupt routine gets around to read the interrupt and reset it. In this way, the timing for controlling the LED pointer of the tachometer does not sacrifice any accuracy while measuring the tach-period precisely.

As soon as the tach-input trigger edge has been debounced and found valid, the low going edge of the tach-input at the microcontroller input, the ¼ period output at pin-33 of the microcontroller goes high, and this biases the inverting input pin-2 of the op-amp 224a over 4 volts. This biasing ensures that the output of the op-amp, pin-1, stays low for ¼ tach-period, regardless of the duration of the actual tach-input signal. Some hardware debouncing is also incorporated at the input pin-2 of op-amp 224a. When the tach-input signal goes high at pin-2, it is clamped by the zener diode 284, a 5.1-volt zener, and capacitor 285 capacitor charges to this voltage. When the tach-input signal goes low at the input, the diode 282 prevents the capacitor from discharging from the input terminal. Capacitor 285 is discharged by resistor 286, a 47K-ohm resistor, which holds the input pin-2 high for about 700 microseconds to allow for points-type debounce if the input trigger has noise or a bouncing signal.

When the tach-input signal is a high amplitude signal, as would be expected when the tach-input is connected to an ignition coil primary, the path of the input signal is automatically altered for this signal. This altering begins when the tach-input signal reaches an amplitude to break down the zener diode, diode 287, and reverse conduction current flows through the RFC 265, diode 287, the 10K resistor 288, through diode 289 to pin-2 of op amp 224a.

Figure 5:
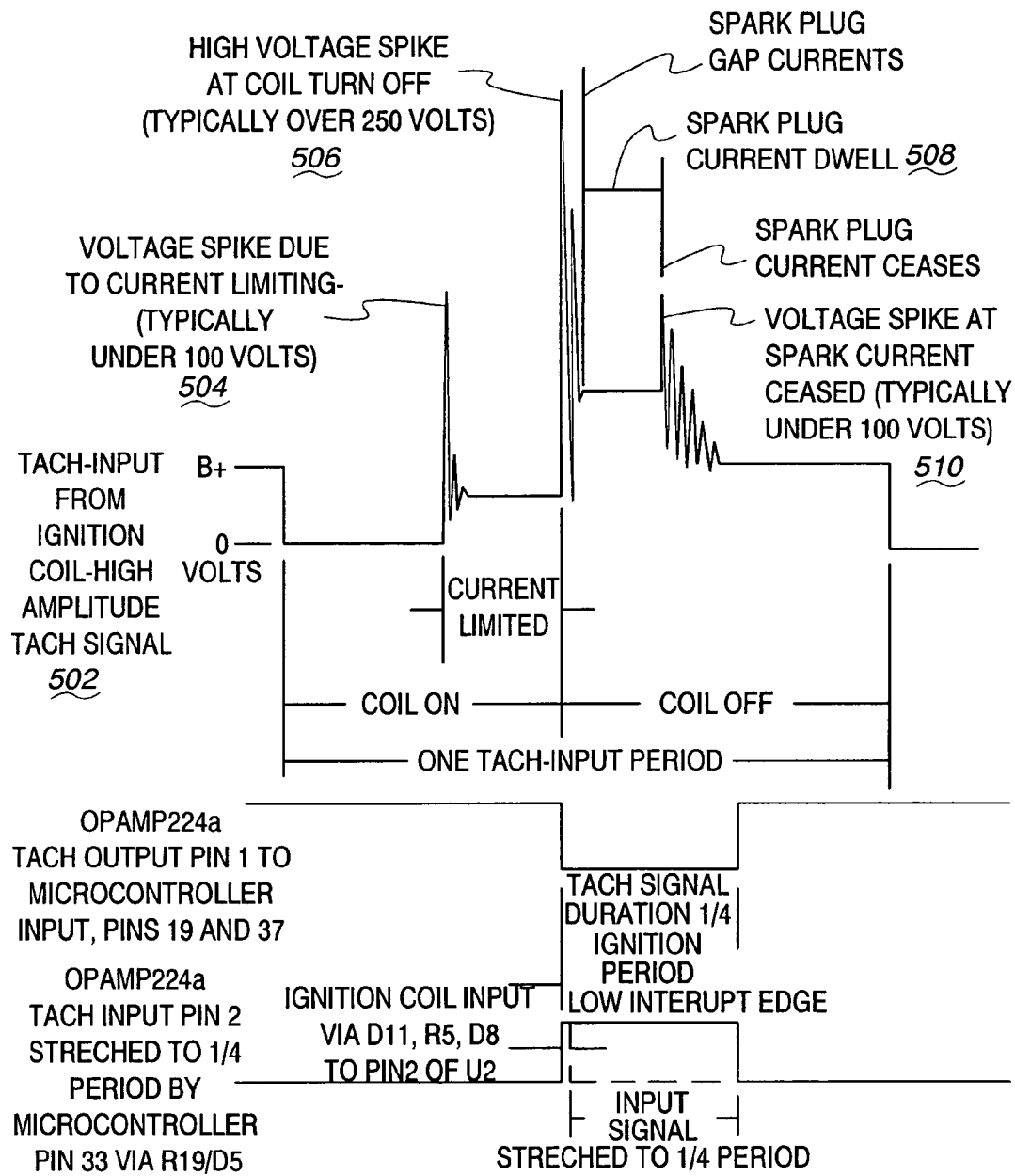
FIG. 5 is another timing chart illustrating further aspects of a tachometer according to the present invention.

Referring now to FIG. 5, the voltage waveforms for the ignition coil derived tach-input signal are described. A tach input signal 502 from an ignition coil provides a high amplitude tach signal. The diagram illustrates a voltage spike 504, due to current limiting, a high voltage spike 506 at coil turn off, a spark plug current dwell period 508, and a voltage spike 510, which occurs when the spark current ceases. The diagram also shows the voltage at op amp 224a pins 1 and 2.

Current also flows through another path diode 290 to the gate of MOSFET 291 and charging capacitor 292. When the bias on the gate of MOSFET 291 reaches about 3 volts, MOSFET 291 turns on and the on resistance of the MOSFET 291 drops to pull the voltage at the junction of the anode of diode 283 and the anode of diode 282 to near ground, thus preventing resistor 240 from biasing the input pin-2 of the op amp 224a. This mode of operation now inhibits the low input amplitude signal path from providing the tach-signal to the op-amp 224*a*.

The only path for the tach-input signal is delivered via the reverse biasing of the 100 volt zener diode 287 through the current limiting resistor 288, a 10K-ohm, and diode 289 to input pin-2 of op amp 224*a*. The zener diode 284 then clamps the input at pin-2 of the op-amp 224*a* and clamps the input of the gate pin of MOSFET 291 via the cathode of diode 289 being clamped, resulting in the maximum gate voltage of MOSFET 291 of 5.8 volts. As long as the high amplitude tach-input signal is reapplied to the input, the MOSFET 291 will stay biased on and will remain so due to the long discharge time of capacitor 294 via resistor 293, a 1M-ohm resistor. Under low amplitude tach-input, the MOSFET 291 stays off and has no interaction on the operation of the low amplitude tach-signal path. The tach feedback provided by the microcontroller 222 via pin-33 is very important during coil operated tach-input.

The ignition coil input signal must be ignored for low amplitude inputs signals even near 100 volts. This is because if an HEI current limited ignition is driving the ignition coil, it may cause very high input signal levels as the ignition is put into current limit before the coil is turned off to produce the spark. This noise voltage is ignored but when the coil is turned off, the voltage rises to over 250 volts, typically up to 400 volts on some systems. It is only this high amplitude signal that is the correct trigger signal for the tach-input period. The ignition coil signal is of very short duration, from 5–20 microseconds typically, and rings several times after the spark current begins flowing across the plug gap and rings again after the spark current ceases flowing but at a lower amplitude. This small duration is stretched by the ¼ period tach feedback signal from the microcontroller 222, which masks out the ringing and provides a clean long signal to the microcontroller input as well as keeping the hardware debounce capacitor charged, capacitor 285, until the tach feedback signal turns off. This method of feedback prevents erratic tachometer operation and prevents storing false peak RPM measurements. During the ¼ period tach feedback, the tach-input interrupt pin-37 of the microcontroller 222 is disabled also.

As mentioned previously, there are two external interrupt sources connected to the microcontroller 222, the display motor sync input and the engine RPM tachometer signal. The tachometer input signal is de-bounced using an input R-C filter and adjustable inhibit period which is calculated to be ¼ of the tachometer input period provided by the microcontroller 222. This rejects noise extremely well while being able to track an engine RPM change of greater than 2:1 of the tachometer input period. The RPM input period is captured using the capture timer in the PIC18F458 microcontroller 222 for extremely accurate measurement of the RPM period. The other inputs, cylinder select switches and the touch reset/RPM programming switch are polled in the Main routine (described elsewhere in this specification) so as not to interfere with interrupt servicing. The microcontroller 222 may be connected to a low voltage reset IC such as a LX7001 from Linfinity to provide a power on reset or brownout reset of the microcontroller 222 if the +5 volt supply is below about 4.6 volts. When the PIC18F458 microcontroller 222 is used, the reset IC is not required because of the internal brownout reset of the microcontroller 222.

The microcontroller 222 controls the rotating LED display via output pin-18 of the 18F458, when this output is high, the NPN transistor connected to this pin is biased on, which causes the input of NAND gate 294*a* at pins-8 and 9 to be low, causing pin-10 and pin-6 to go high, allowing the NAND oscillator to operate which drives the MC33152P driver 295. The oscillator signal at the NAND output pin-4 is connected to a NAND inverter 294*c*, gate pins-1 and 2, whose output pin-3 is connected to the MC33152P driver 295 input pin 2, while the oscillator non-inverted signal is connected to the second driver input pin-4. This connection drives the two driver IC pins out of phase causing one output to be high while the other output is low and vice versa. This drive technique results in driving the primary of the rotary transformer 319 to + and −10 volts amplitude. A 0.001-microfarad capacitor 296 connected between the driver output pin-7 and the rotary transformer primary lead prevents the transformer 319 from being driven into saturation and blocks DC voltage from being applied across the transformer input leads. The 33-ohm resistor in series with the transformer primary and the MC33152P limits the maximum output current to 310-milliamps. The impedance of the rotary transformer 319 and the frequency of 6-mhz oscillator drive requires that the coupling capacitor be about 0.001-microfarad to fully drive the rotary transformer for maximum output drive current to the rotating LED display.

The rotary transformer 319 is used in this embodiment to convert the microcontroller output signal to drive the rotating LED display for the tachometer indicator. This signal must be delivered from the stationary drive circuit to a rotating circuit on the motor shaft. Preferably, there should not be any physical contact between the rotary transformer primary and the secondary windings. In one approach, the primary of the rotary transformer 319 is a small coil constructed of 20 turns of 36 gage magnet wire wound on a thin coil form about ¼ inch inside diameter and measuring about ¼ inch tall. This primary winding is fixed to the motor frame and is stationary. The rotary transformer secondary may be wound over the nylon coil form which contains a small ferrite bead, which is commonly used to suppress high frequency noise, such as a EXC-L351350 from Panasonic, which measures 5 mm long by 3.5 mm diameter by 1.3 mm inside diameter. The nylon coil form also provides the mount to the motor shaft and the mount for the LED display printed circuit board 298 that contains the 4 rectifying diodes, a 220-pf capacitor, a 36-ohm resistor and the surface mount LED.

The outside diameter of the secondary winding is about ³⁄₁₆ inch so that there is an air gap of about ¹⁄₃₂ inch between the secondary winding and the primary coil form. Both windings are about ¼ inch tall and overlap one another when assembled. As the primary winding is excited with the 5–6-mhz drive current a current is induced in the secondary winding, which is full wave rectified and applied to the LED to produce about 15–30 milliamps of forward LED current, enough current to drive the LED to produce at least 100 mcd of photon or light output. Since the LED has a 25-degree focused divergent beam, it appears very bright to the observer's eyes from several feet distance even when viewed in bright daylight. The surface mount LED may be a type such as a super red output SSL-LXA228SRC-TR31 from LUMEX, which has an output of 170-mcd at 20 milliamps with a viewing angle of 25 degrees. The use of the blue surface mount LED from LiteOn, LTST-C930CBKT, is available with a 25-degree viewing angle and produces a light output that is very intense, at 180-mcd, but has less fringing or star effect, which makes a much better accurate dot of light for use in the photon tachometer. The LED excitation drive signal is turned off very quickly; otherwise, the light beam appears smeared and the peak RPM dot would be too wide. The LED and drive circuit used in this tachometer are capable of turn-on and turn-off times typically less than 2 microseconds.

The LED 305 used to indicate the programmable RPM switch is typically a 8000-mcd or greater output red LED, such as the RL5-R8030, from www.superbrightleds.com. This LED turns on when the engine RPM is greater or equal to the programmed RPM switch value. This LED is mounted behind the tachometer faceplate and is viewed through the front lens. The drive circuit consists of a smart power MOSFET transistor 299a connected to the microcontroller 222 via a 2K-ohm resistor. The microcontroller 222 drives the gate of the output power MOSFET 299a connected to the RPM switch LED cathode via a 390-ohm current limiting resistor 301. The MOSFET drain terminal is available externally to drive up to a 3-ampere load. A protection diode 303 is connected anti-parallel across the RPM switch LED 305, such as a 1N4004 from General Semiconductor. This diode prevents large reverse bias voltages from being applied across the RPM switch LED 305, which could result if an inductive load were connected to the MOSFET drain terminal and the battery. The LED anode is connected to the +10.1 volt supply. The power MOSFET may be a type such as a VNP14N04 from ST-Microelectronics. This device is current limited, self-clamping from inductive kickback voltages and over-temperature protected.

Another prevention and debounce routine in the microcontroller is used to reject noise at the tach-input of the microcontroller 222. This is a routine that compares the present tach period RPM measurement captured to the previous tach period measurement. If the present tach-input period ever exceeds the previous period by more that 2 times the present tach period is declared invalid because of the impossibility of an engine accelerating over 2 times in one ignition period and the tachometer display is maintained at the previous RPM indication until the next valid tach period. A typical Pro-Stock racing engine cannot accelerate at over 1.5 times from one ignition period to the next from any speed above idle.

As described above, the microcontroller 222 provides several functions in the photon tachometer. The function previously described is processing the tach input signal and generating a tach feedback signal and controlling the tach interrupt input. The other inputs used by the microcontroller 222 are from the motor sync signal for position and motor speed information, BCD switch input to allow the user to program the tachometer for a range of engine cylinder counts from 1 cylinder to 8 cylinder and code space available for 10 cylinder, 12 cylinder as well as odd fire engines if so desired. The BCD switch has 10 positions for user cylinder counts but a 16-position switch could also be used for a larger number of input choices.

Another input is the Shiftlight/Reset peak Rpm switch input 3091. This single input has several functions to allow the user to set the desired RPM turn on speed for the shiftlight, to inspect the present stored shiftlight RPM and reset the present peak RPM indicia. The touch sensitive switch connected to the Shiftlight/reset input 3091 has several modes of operation. When this switch is touched once and released the tachometer LED pointer will display the current shiftlight turn on RPM value and reset the peak RPM indicia. If the switch is touched and held, after about 2 seconds the present shiftlight RPM will be reset to the lowest value, about 500 RPM and the peak RPM indicia will be reset. If the switch is touched and released and touched again within 2 seconds the current shiftlight RPM will begin to increment and will continue to until released. When the shiftlight indicia is incrementing it begins at a slow rate and the rate will increase after 2 seconds. If the shiftlight indicia is increasing at the faster rate and the switch is momentarily released and again pressed, the shiftlight indicia will again increment slowly then after 2 seconds at a faster rate. When the shiftlight is programmed for over 6000 RPM the indicia only increments at single rate. Two seconds after the switch is released after an edit of the shiftlight RPM the new value is stored in EEPROM in the microcontroller and the tachometer LED pointer resumes displaying the current engine RPM.

The Sync input 309 generated by sensing the motor/LED pointer position is input to the input interrupt pin-36 of the microcontroller 222 from op amp 224b pin-7. As seen in FIG. 4, the synch signal is desired to be about 40–50 degrees in duration, but could be smaller or larger for several reasons. The sync signal serves as the position reference for the zero indicia of the tachometer, which is the position the LED pointer, is turned on. The LED pointer control signal is output on pin-18 of the microcontroller 222 on the rising edge of the sync signal at zero RPM indicia. The LED pointer drive signal is connected to resistor 311, a 10K-ohm resistor that biases the base of transistor 313 on, which then turns on to clamp the collector terminal to near ground potential and also pins-8 and 9 of the Schmitt-trigger dual input NAND gate 294a, a CD4093BCN QUAD dual input NAND gate from Fairchild Semiconductor. When the input pins-8 and 9 of NAND gate 294a are clamped to ground pin-10 of NAND gate 294a goes to +5 volts and biases pin-6 of NAND gate 294b, which serves to allow oscillation to begin from the NAND gate at pin-4 of NAND gate 294b. The feedback resistor 315, a 1.5K-ohm resistor, provided between pins-4 and 5 of NAND gate 294b, provides feedback to charge and discharge the capacitor 317, a 47-picofarad capacitor, connected to the input pin-5 of NAND gate 294b. The Schmitt-trigger inputs of the NAND gate 294b provide hysteresis so that the input triggers the output at two separate input voltages, the low threshold and high threshold voltages. These two thresholds are positioned symmetrically around ½ VDD supply or about 2 volts low threshold and 3 volts high threshold at VDD=5 volts. This gated oscillator oscillates at about 5–6 megahertz at the output pin-4 and is inverted by another NAND gate at pin 3 by the signal connected to the NAND gate 294c inputs at pins-1 and 2. The outputs from the oscillator are 180 degrees out of phase with each other and are connected to the MOSFET driver IC 295, a device such as a MC33152 from ON-Semiconductor or any similar MOSFET driver could be used with sufficient current drive and operating speed.

The oscillator outputs are connected to pins-2 and 4 input pins of the driver 295. The output pin-7 of driver 295 is connected to a 0.001-microfarad capacitor 296 to block any DC voltage from the primary winding of the rotary transformer 122. The other end of the primary winding of the transformer 319 is connected to the other driver output through a current limiting resistor 297, a 33-ohm resistor, to keep the maximum current drive to an acceptable level to the rotary transformer that provides excitation drive voltage to the LED pointer by the secondary winding of the rotary transformer 122.

As long as the oscillator is biased on, the LED pointer will be illuminated indicating an arc of light from zero to the present RPM indicia. The microcontroller 222 keeps the LED pointer on from the zero indicia up to the current RPM of the tach-input value or the shift light RPM value depending on which mode is operative. Once the highest RPM is displayed, the microcontroller 222 turns off the LED pointer. This must take place very quickly to avoid smearing the end range of the LED pointer. The turn off typically occurs in less than 3-microseconds, which is less than about 4 RPM of the LED pointer travel. When the microcontroller 222 turns off (via the transistor 313, a NPN type such as a 2N2222 or P100 from National Semiconductor), the oscillations cease and the drive output will provide +10 volts to one lead of the primary of the transformer 319 and zero volts to the other lead of the primary of the transformer 319. The DC voltage is blocked by the series capacitor 296 so that the LED drive voltage ceases instantly. The LED pointer circuit 298 has only a very small filter across the Schottky diode bridge 327, a 220-picofarad capacitor, which will discharge below the forward LED bias voltage in less than a microsecond.

Figure 2A:
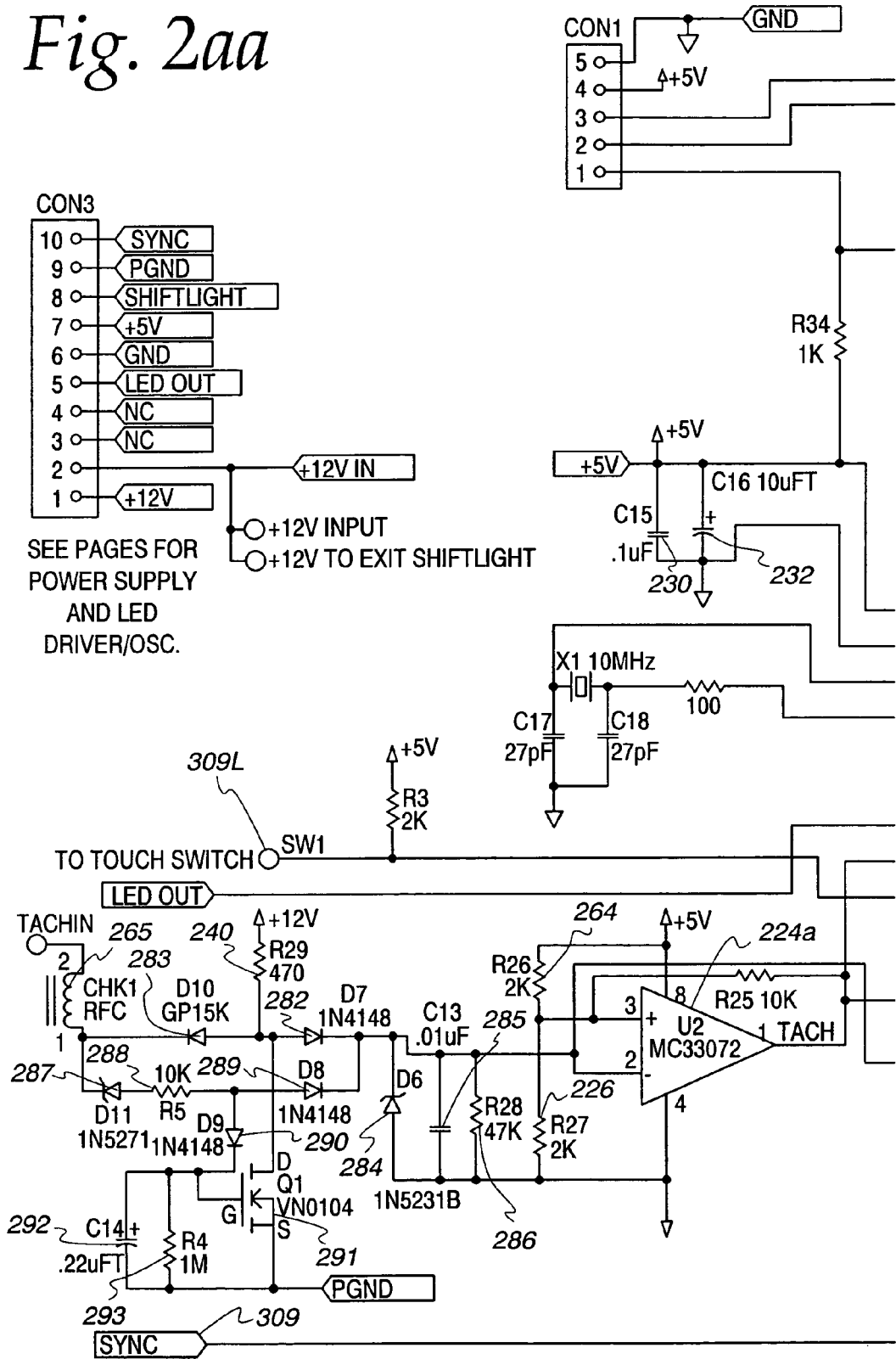
Figure 2A:
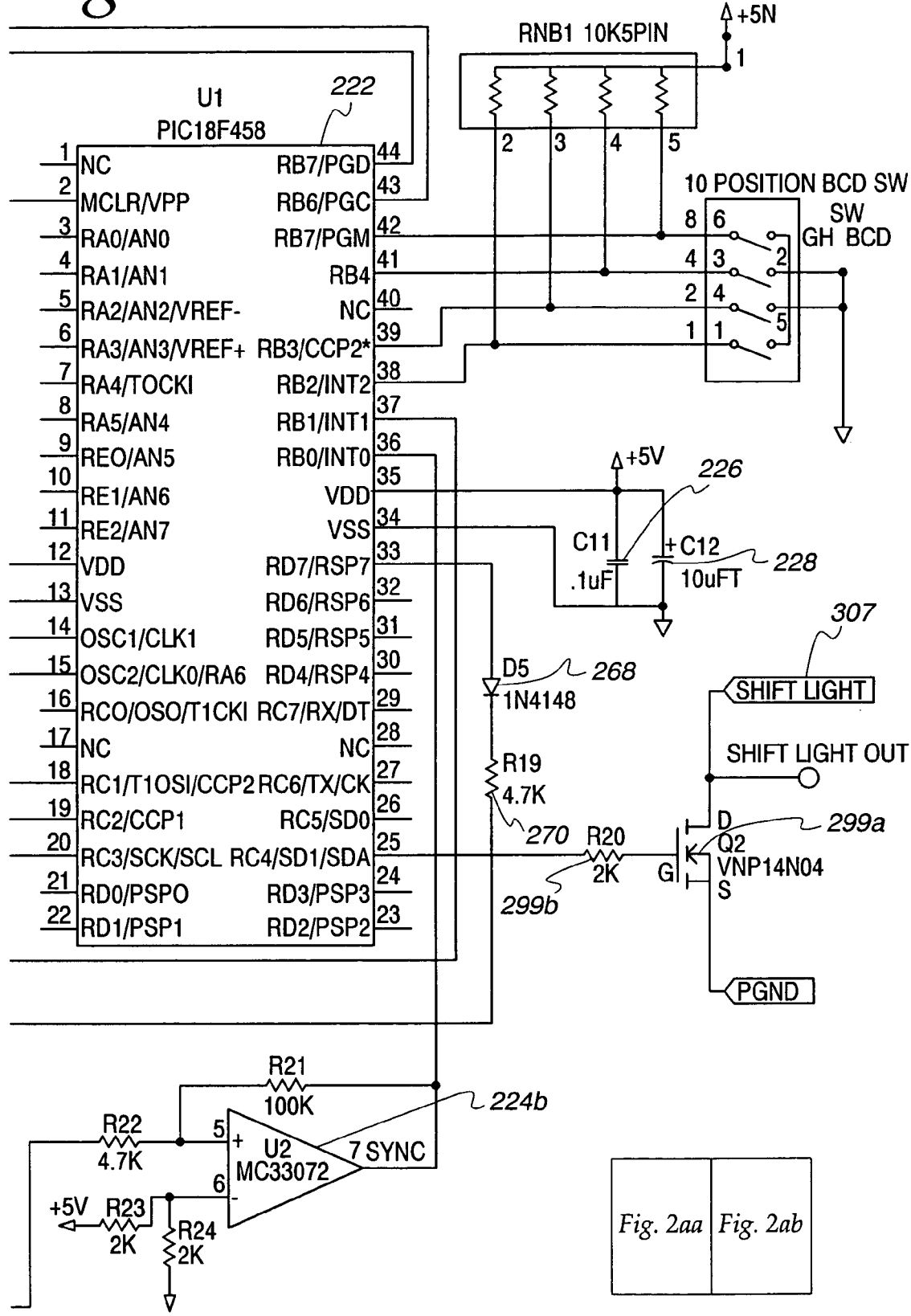
Figure 2B:
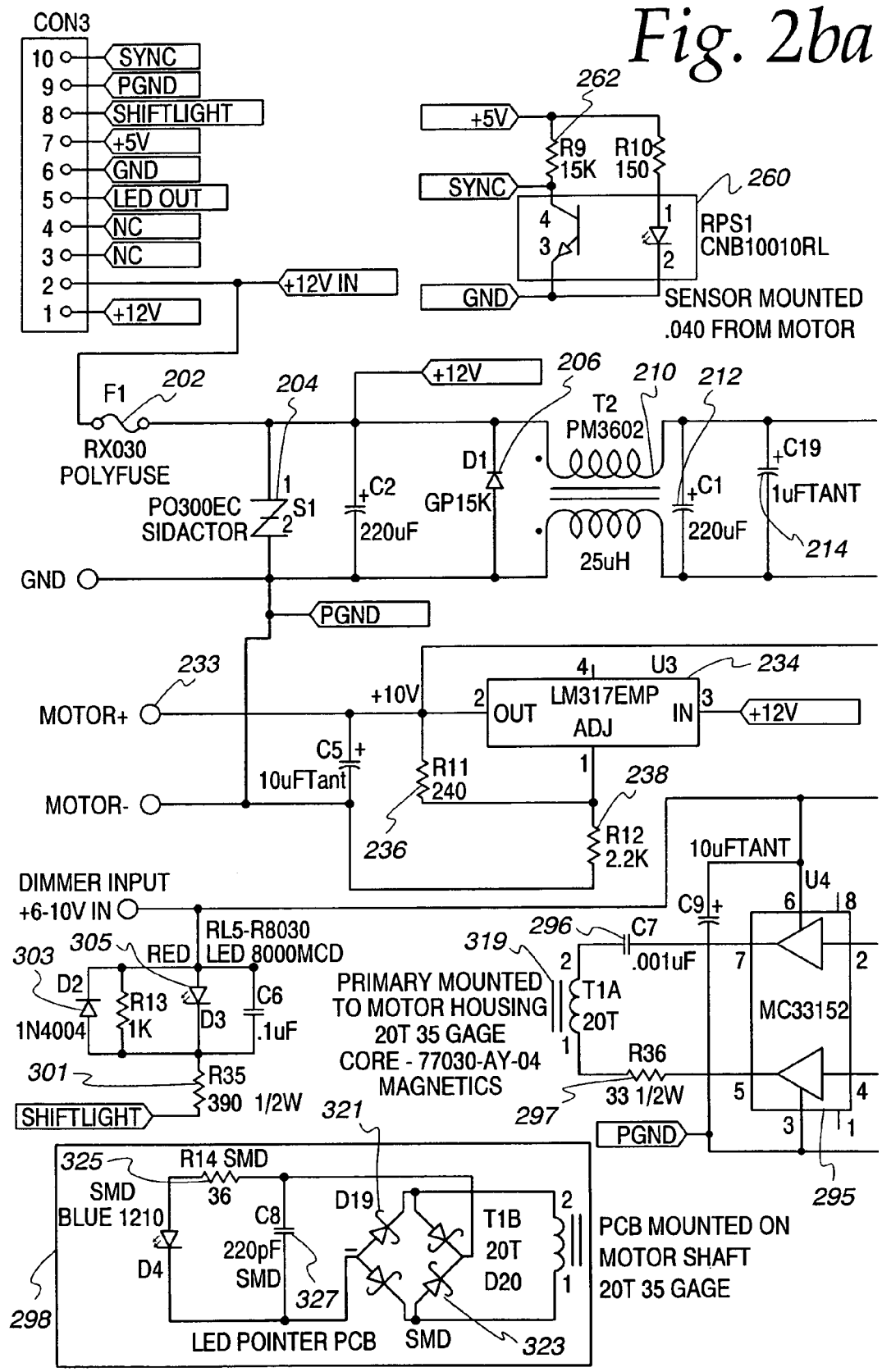
Figure 2B:
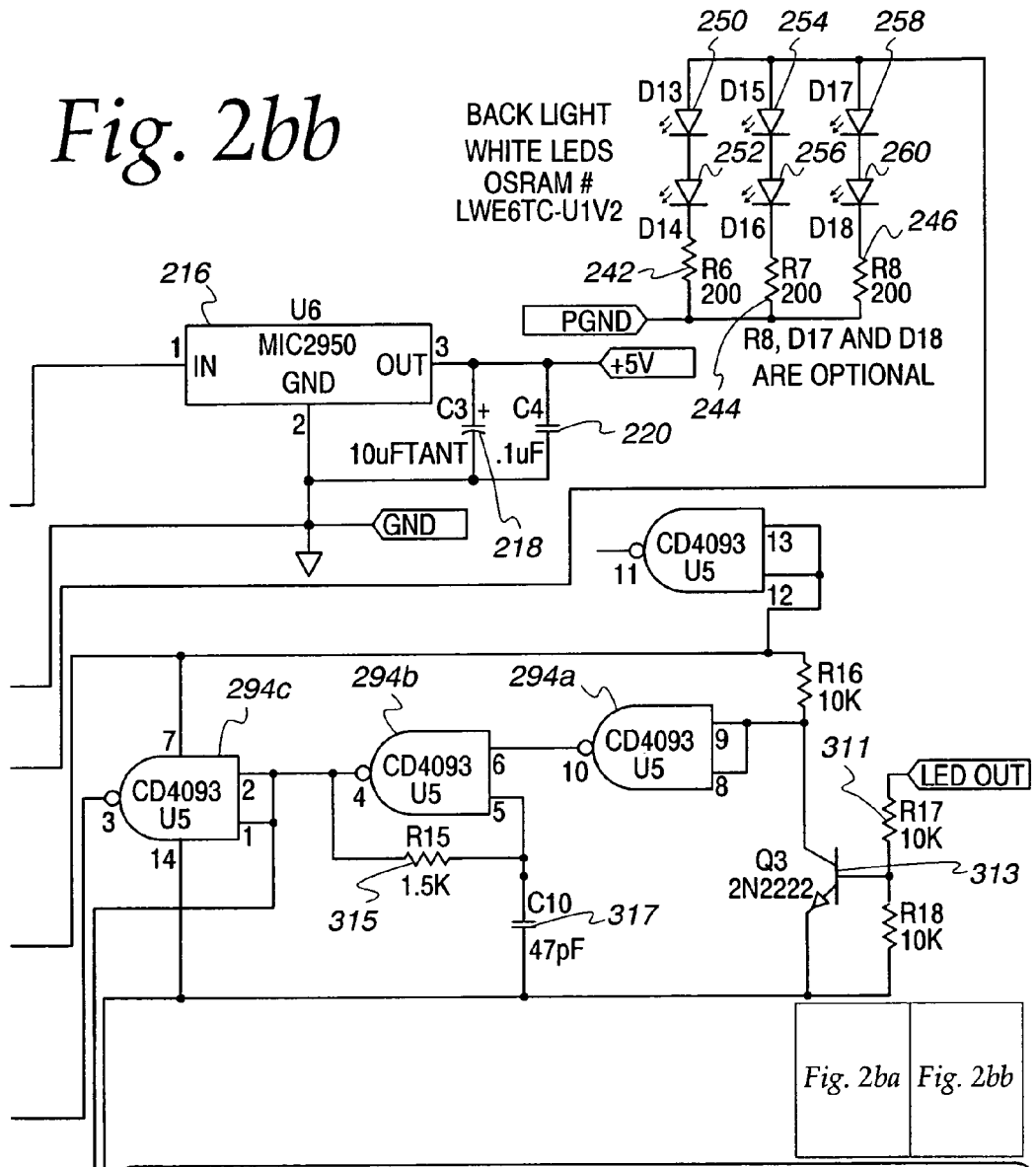
Figure 2C:
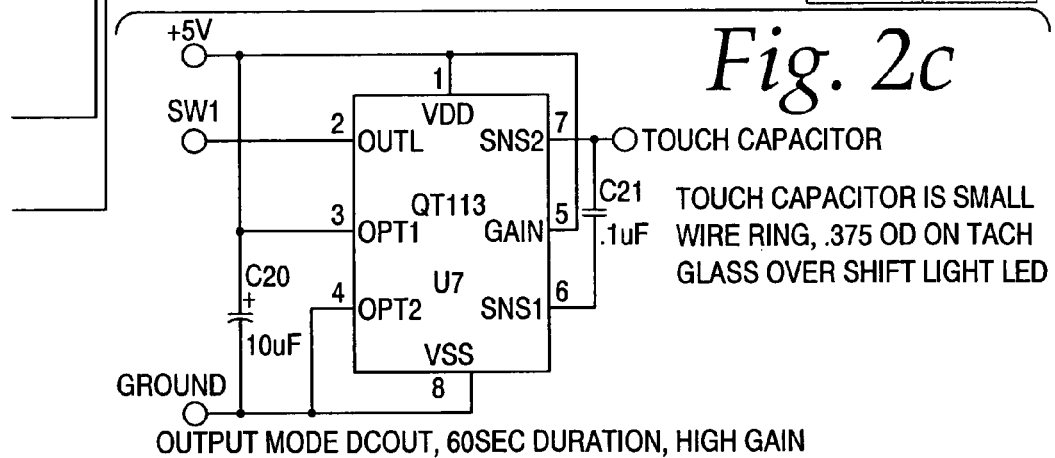
Figure 2D:
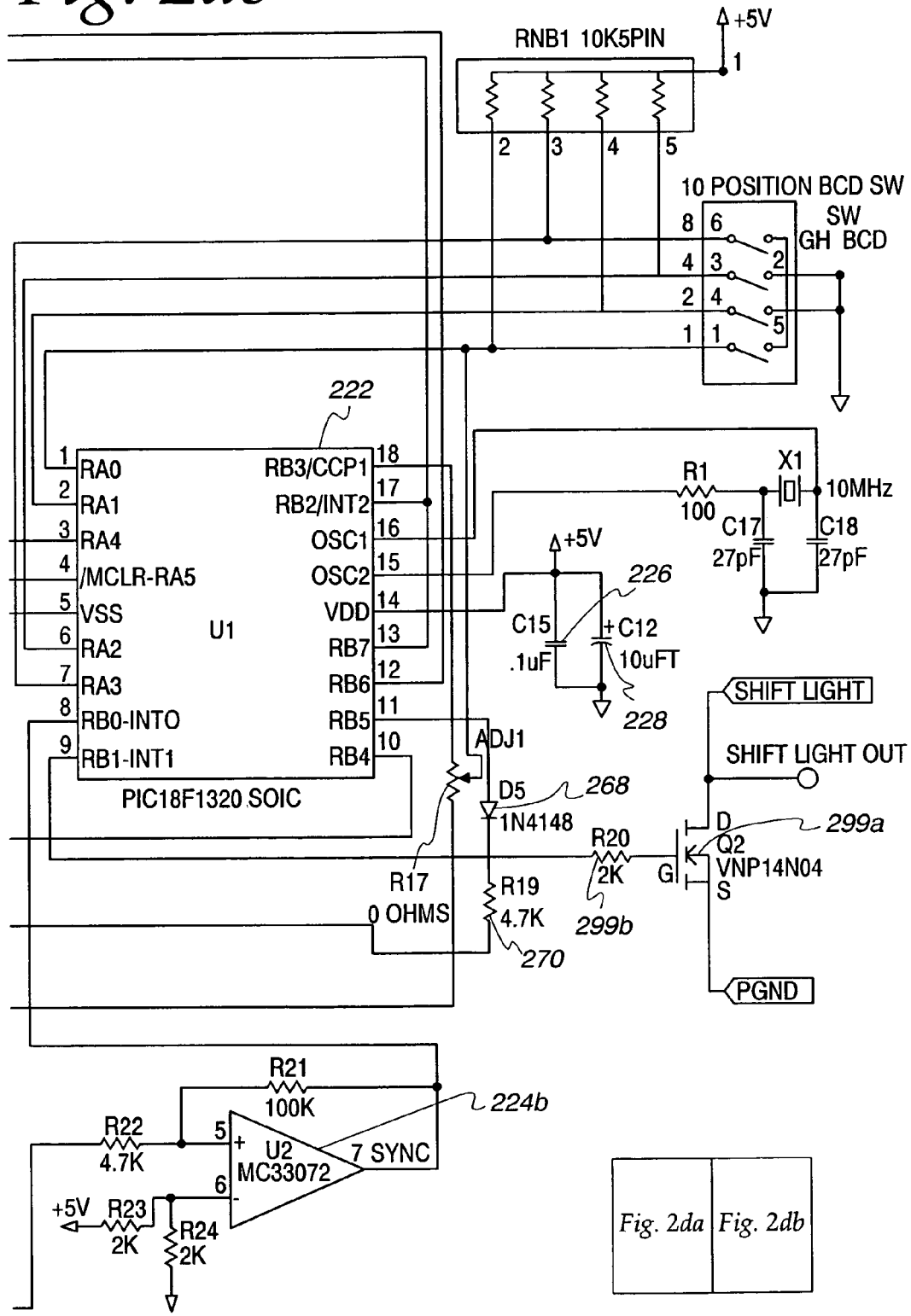
Figure 2E:
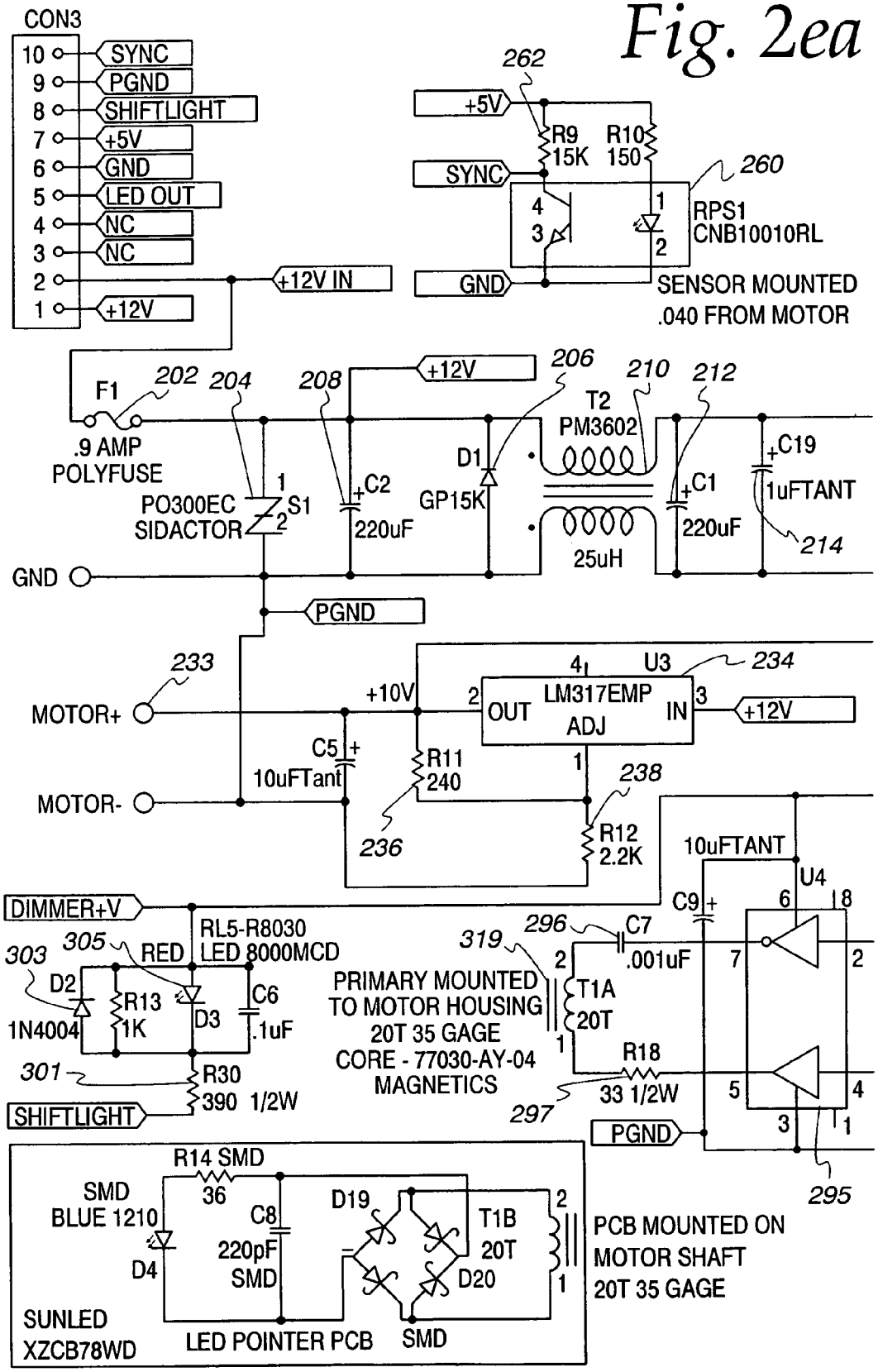

Furthermore, a circuit 309a may be used for the auto dimming of the LED pointer, the shift light LED, and the back light LEDs. The output from the adjustable voltage regulator supplies power to the MC33152 driver IC and to the shift light LED as shown in FIG. 2f and FIG. 2b. The output voltage should be adjusted to provide about 6 volts minimum at full dark conditions and about 10 volts at full ambient light conditions. Selecting the value of resistors 309b, 309e, and 309h first under no light will set the minimum output voltage for minimum LED intensity of both the LED pointer and the shift light. Then, by selecting the value of a first resistor under full light conditions, the maximum output for maximum LED output may be set, in this case, about 10–11 volts. A photo diode's D1 sensitivity to light is set by resistors 309e and 309h. The voltage developed across zener diode 309h is applied to adjust the terminal of the adjustable voltage regulator 309c, which increases the voltage at the output of the regulator 309a as the light input is increased. The zener diode 309f clamps the voltage regulator output to a maximum of about 11 volts. A capacitor 309g functions to slow the response of the output voltage change to change in input light. This gives the display pointer smoother gradual changes in intensity with quickly changing light levels. The user has some control of the intensity by partially covering the opening to the photodiode; the intensity of the LEDs can be decreased at any ambient light level.

The LED pointer operation is initiated when the driver oscillator is enabled and the rotary transformer is exited at the 3–6 megahertz frequency applied to the primary winding. The rotary transformer's primary winding is attached to the fan motor housing in very close proximity to the secondary winding attached to the motor shaft that is spinning without touching the motor frame or primary winding.

The magnetic field developed by the rotary transformer primary is coupled across the narrow air gap between the primary and secondary windings. This magnetic coupling induces a current flow through the secondary winding, which is full wave rectified by the Schottky diode bridge 321 and 323, and the dc current is then applied across the LED to forward bias the LED on. The 36-ohm resistor 325 limits the maximum LED drive current, while allowing the voltage output of the diode bridge of a potential of about 4.8–5 volts dc, driving about 15–30 milliamps through the pointer LED. In this case, the rotary transformer provides about 80-milliwatts of power to the LED pointer. This may be provided by the small rotary transformer, which can be made using a ferrite bead core such as a EXC-ELSA39 or EXC-ELSA35 from Panasonic.

Figure 9G:
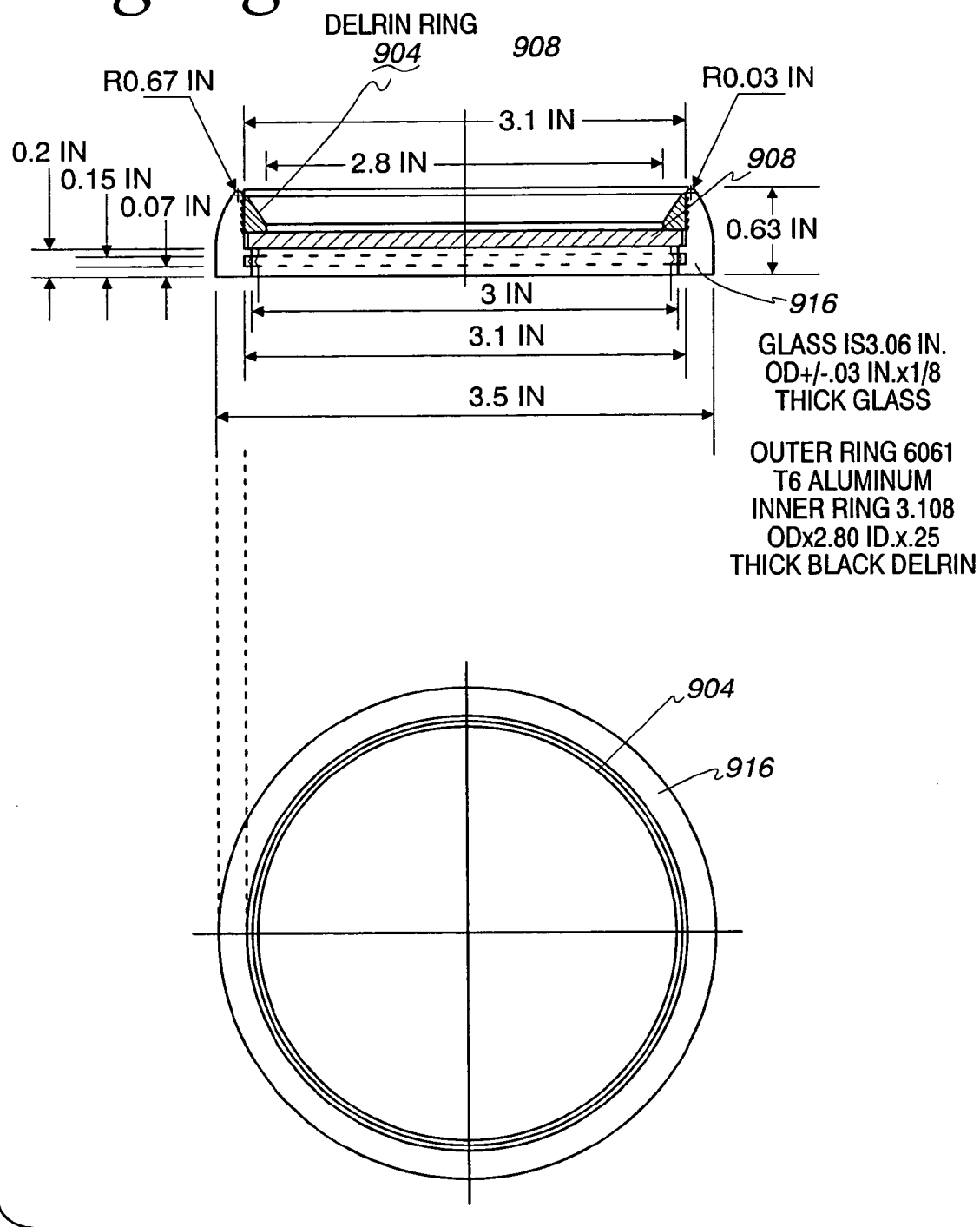
Figure 9H:
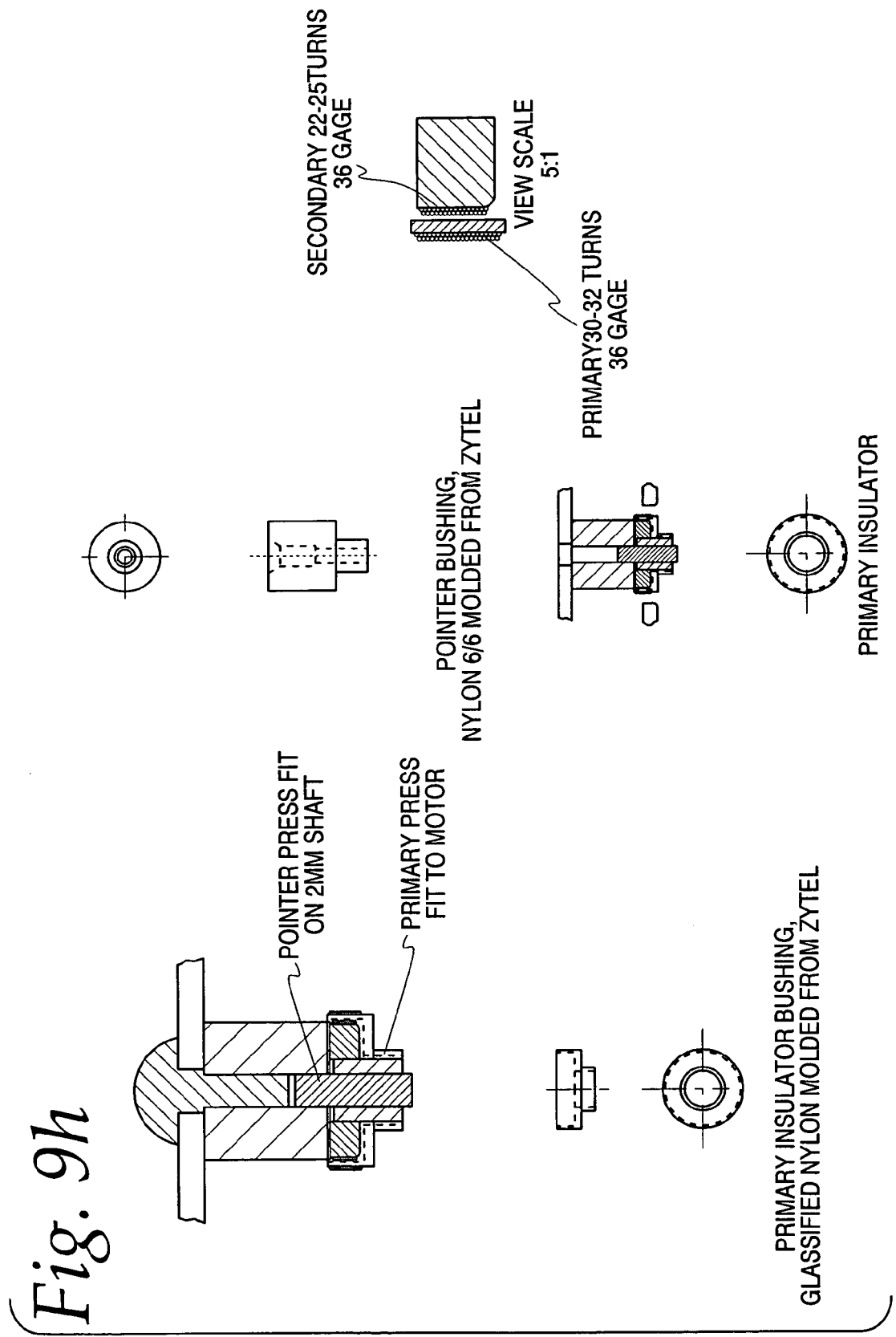

Providing a shorter rotary transformer with simplified shaft coupling is the 77030-AY-04 powdered metal core from Magnetics, or may be a molyperm core such as a M0804T125. The Magnetics core allows the shaft coupler to pass through the core and contains the primary winding on its circumference. This winding and core are only about 0.400 inches diameter and 0.075 inches thick when wound with 20-turns of 36-gauge magnet wire. The inner diameter allows a shaft coupler O.D. of 0.125 inches. The shaft coupler is made from an insulating non-magnetic material such as nylon or Zytel. The shaft coupler has the LED pointer PCB attached and the secondary winding, which is wound directly on the shoulder below the PCB. This pointer PCB/shaft coupler assembly is then press fitted to the end of the fan motor shaft passing through the primary core and positions the secondary winding within 0.005–0.008 inches above the primary winding. The shaft coupler may have the Magnetics core installed on the shoulder and the winding wound directly over the core for a very close coupling as seen in FIG. 9h.

The microcontroller 222 also has an output for controlling the shift light at pin-25 of the microcontroller 222. When the tach-input RPM is measured to be equal or greater than the programmed shift light RPM value, the output pin-25 of the microcontroller 222 goes to +5 volts and drives the smart power MOSFET Q2 gate through resistor 299b, a 2K-ohm resistor. When the gate of transistor 299a is biased at +5 volts the transistor 299a turns on to sink current from the drain terminal to ground at the source terminal. The drain terminal of the transistor 299a can be connected to an external load such as an external LED, incandescent bulb, solenoid or other load, which would switch on when the RPM input exceeds the programmed RPM value.

The touch switch function is performed by the integrated circuit 309i such as a QT113 or QT113H from Quantum Research Group. The integrated circuit 309i preferably has no moving parts or exposed electrodes. The integrated circuit 309i provides functions such as allowing a user to view a preset shiftlight value as an arc of light at a programmed shiftlight value; resetting a peak RPM value; and allowing the user to reset the shiftlight value. This integrated circuit is a digital capacitance device capable of detecting proximity, or touch, which can sense through non-metallic surfaces. It continuously self-calibrates and requires a single external capacitor. Capacitor 309j sets the reference touch electrode capacitance that is also connected to the small diameter electrode at the gauge lens 702. Capacitor 309k is the supply bypass capacitor on the 5 volt supply across the VDD and VSS power supply leads of the integrated circuit 309i. When the user touches the lens above the electrode, the output from integrated circuit 309i changes state at pin 20 of the microcontroller 222 or pin 3 of microcontroller 222. The microcontroller 222 polls this pin to sense when the user touches this switch to reset the peak display value and/or to program or view the shiftlight value. The integrated circuit 309i also has a heartbeat feature on an output that the user may monitor that the integrated circuit 309i is functioning properly. The heartbeat signal must be debounced by the microcontroller 222 so as not to cause a false touch being sensed. The debounce routine is described elsewhere in the application.

Superior and improved resolution and RPM display accuracy are provided by the photon tachometer. This is a result of the linear constant speed of the LED pointer and the high speed throughput of 10 MIPS operation of the microcontroller, in this example, the PIC18F458. At an internal clock speed of 40-mHz the majority of the instructions run at 100-nanoseconds per instruction. The microcontroller has an internal phase lock loop oscillator to multiply the external 10-mHz crystal to 40-mHz internal. At this speed the ability to capture the tachometer input signal and measure this time period is extremely accurate, typically within +/−100-nanoseconds.

In addition, the internal timer with +/−100-nanosecond resolution controls the on time period for the LED pointer. The only inaccuracies are a result of the latency to process the high interrupt of approximately 4–5 clock cycles or 400–500-nanoseconds for a typical LED on time period resulting in +/−300-nanoseconds resolution. The LED pointer resolution and accuracy is relative to the resolution of the microcontroller timer and interrupt controls. Given a LED pointer rotational speed of 5000 RPM, this gives one revolution of the pointer every 12-milliseconds. If the zero to maximum tachometer RPM indication of 12,000 RPM is indicated on the face of the tachometer over 300 degrees angle, as in FIG. 1A, the 12,000 RPM will be divided by the time of rotation for 300 degrees. This equates to 300 degrees is 83.3333% of 360 degrees and thus 0.83333 times 12-millisecond revolution time=9.99999-milliseconds for the LED pointer to revolve from zero to 12,000 RPM or 300 degrees of rotation at a motor speed of 5000 RPM. Since the LED is moving at a constant velocity, the RPM indication is a linear function of the RPM display. This is the reason 100 RPM can be displayed with the same high accuracy as 6,000, or 12,000 RPM or any speed from zero to maximum value.

The resolution of the RPM display is relative to the LED pointer time over the 300 degree rotation angle in the time period of 9.99999-milliseconds, or given in terms of time per RPM, is 0.0099999999 seconds divided by 12,000 RPM=800-nanoseconds per RPM displayed. Since the resolution of the microcontroller is about +/−300-nanoseconds, this gives a possible RPM display resolution of better than 1 RPM (800 nanoseconds/RPM). This display far exceeds the resolution of any previous tachometer or any gauge using previous approaches to move a pointer to indicate a value with precision. The precision tachometer air core driver from ON-Semi, part number CS4192 has only 0.35% resolution and +/−1.2% accuracy. The photon tachometer has better than +/−0.00001% or 1 part in 12,000 resolution and equates to better than 0.0002% or +/−2 RPM accuracy at 12,000 RPM.

Figure 7:
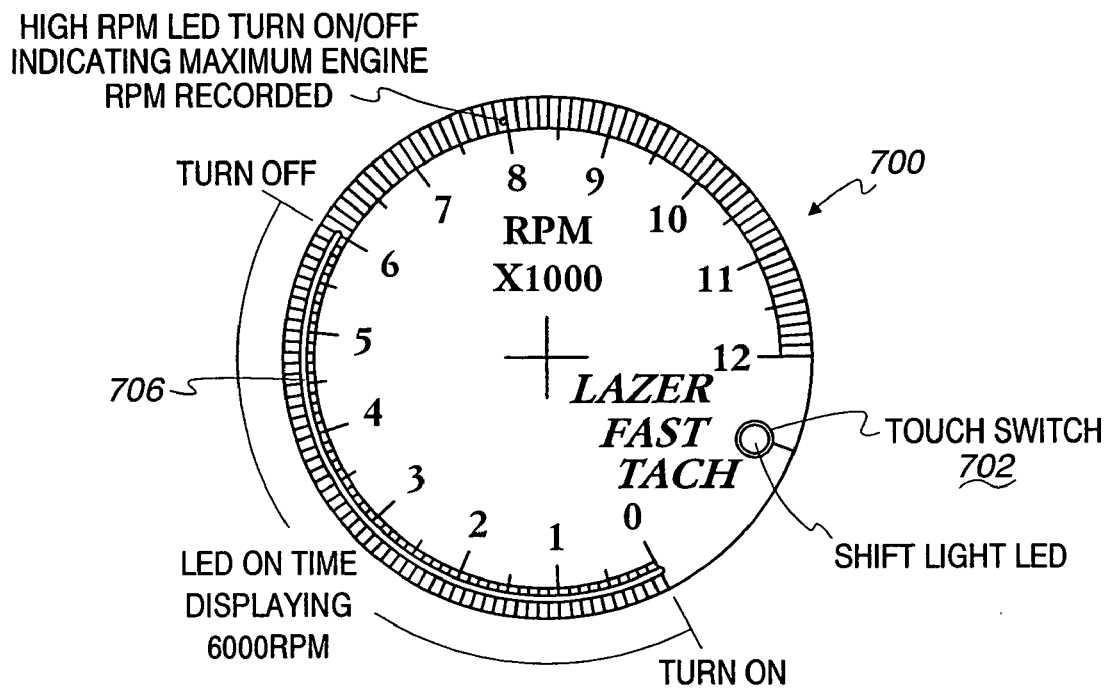
FIG. 7 is a tachometer face according to the present invention.

Referring now to FIG. 7, one example of a tachometer face 700 is described. The face 700 includes RPM readings, a touch switch 702, and a shift light LED 702. The display shows an arc of light 706. In this case, the rotating LED 706 is displaying 6000 RPM. The LED is turned on at 0 RPM and turned off at 6000 RPM indicating the present RPM value of the input tach signal. The maximum RPM recorded is display as a dot of light near 8000 RPM in the display of FIG. 7.

Figure 6:
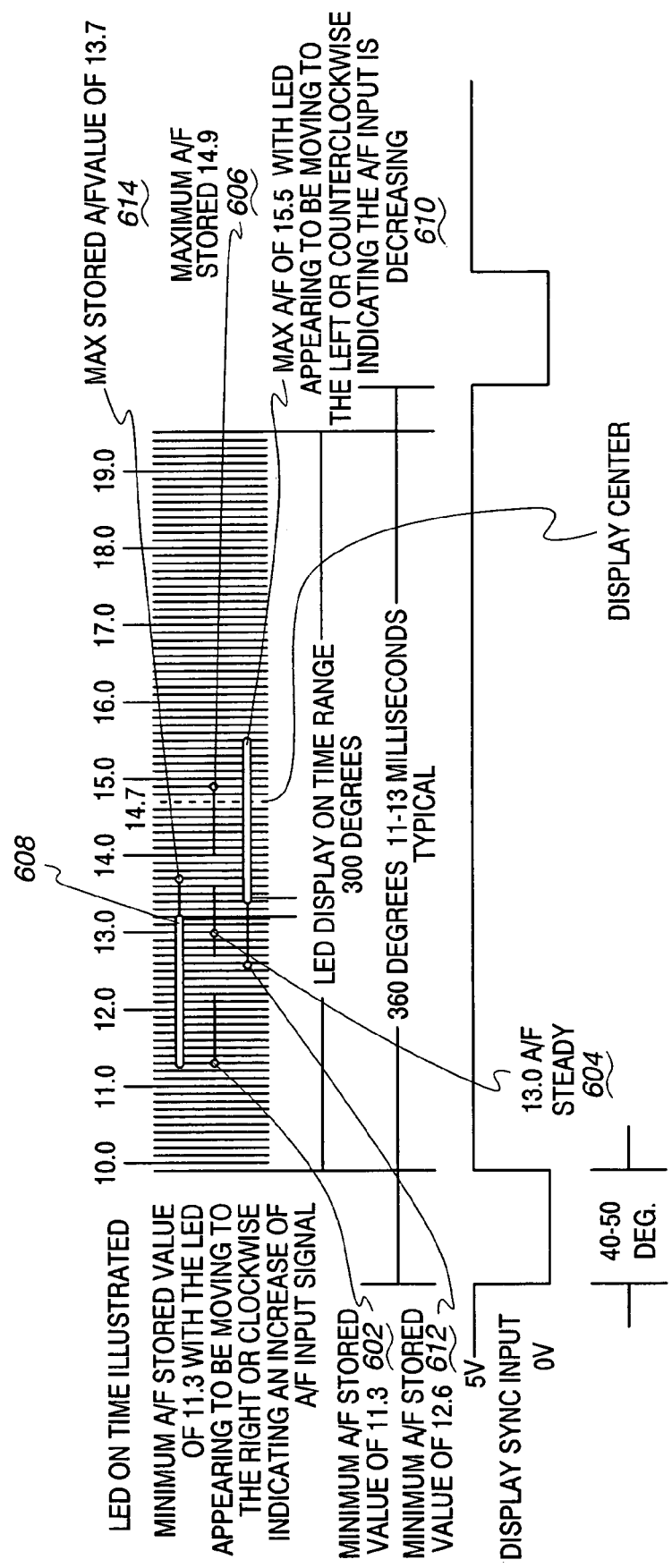
FIG. 6 is a timing diagram of an air/fuel gauge according to principles of the present invention.

As discussed above, one type of gauge that can be used in the present approaches is an A/F gauge. Referring now to FIG. 6, one example of the operation of an A/F gauge is discussed. In this example, an Air/Fuel ratio meter indicates the values of air/fuel ratios from the minimum and maximum stored A/F values on the gauge face. When the A/F ratio is at 14.7:1 or stoichiometric, the LED is on for short time at the center of the gauge. When the A/F ratio input value decreases, indicating a Rich condition, the LED stays on from the maximum A/F stored value or last value displayed in the last second to the present input value creating an arc of light. If the A/F ratio input value increases it indicates a leaner condition and the LED is on beginning at the minimum stored A/F value or last value displayed in the last second then stays on creating an arc of light up to the present input value where the LED then turns off. Both the lowest and highest A/F ratios are displayed on the gauge as dots of light. When the A/F input value has stabilized, the trail of the light arc diminishes so that the present value changes from an arc of light to a dot of light at the present input value, which takes place from less than a second to over a second or more of time. The minimum and maximum A/F ratio values are stored in EEPROM until the gauge is reset. The user can also program an alarm output function similar to the RPM activated switch in the tachometer. The user can select the maximum Lean and minimum Rich A/F ratio values that are stored in EEPROM. When the input A/F ratio values exceed the programmed limits an output transistor is turned on to illuminate an external alarm and an internal alarm LED within the A/F gauge.

In FIG. 6, three examples are shown indicating a steady input A/F value as three dots of light, a decreasing and increasing A/F input as well. With a steady A/F input the LED is shown turned on for a few microseconds to display the lowest point 602, highest point 606 and present input values 604 as dots of light on the gauge. The LED is turned on much longer to show the current input A/F ratio as the arc of light 608 or 610 moves in the direction of the change in the A/F input value relative to the A/F ratio being rich or lean. In these cases, a minimum value 612 or maximum value 614. The typical range of 9.9 to 19.5 with a center of 14.7 stoichiometric span illustrated is 300 degrees, but could be of any value less than 300 degrees.

Even though the LED pointer is spinning in one direction, typically clockwise, the LED will appear to begin turning on at either the maximum or minimum stored values or the last displayed value in the last second of operation and then appear to move toward the present or changing input value, moving counterclockwise to indicate a rich A/F ratio input condition or moving in a clockwise direction indicating a lean A/F ratio input condition. In the present approaches, the LED can be made to appear to move in any direction on the face of the meter or gauge to indicate increasing or decreasing input data even though the LED pointer always spins in one direction only at constant speed. Gauges may be built to indicate the input data on the gauge face in clockwise, counterclockwise and both directions if so desired on a single gauge with the LED spinning at constant speed in one direction of rotation.

Referring now to FIGS. 8a–b, examples of faces 802 of an air/fuel gauge are described. The faces of FIGS. 8a and 8b include a high alarm LED 804 and a low alarm LED 806, which are activated when the reading rises above or falls below certain values. Each of the faces 802 also includes an arc of light 808.

Referring to FIG. 8a, the arc of light 808 is where the rotating LED is on from 12.8 to 14.1 A/F and indicates the present input value and the maximum A/F at the LED turn off point with the input A/F ratio value decreasing and moving in the direction of the arrow. At point 810a, the end of the light arc 808 appears to be moving towards 810. A dot of light 810 indicates a minimum A/F of 12.5:1 and then the LED turns off.

Referring to FIG. 8b, the arc of light 808 is on from 12.5 (the minimum A/F) to 12.9 indicating that the A/F ratio is increasing and moving in the direction of the arrow. The maximum A/F is indicated at point 812. The arc of light 808 appears to be fixed at point 814, where the LED is on indicating the minimum A/F of 12.5.

Referring now to FIGS. 9a–h, diagrams illustrating the housing of the tachometer are described. The power supply, microcontroller, and input/output circuits may be mounted remotely from the tachometer housing and connected to the tachometer housing with a single 8-pin connector. This allows a much smaller tachometer housing, which could contain the display motor, the optical-slotted sync switch/reflective photosensor, the RPM switch LED, and the rotary transformer and the shaft-mounted display LED and rotary transformer circuitry. All of the tachometer circuitry could also be mounted in the same housing for a unified tachometer. By remotely mounting the microcontroller portion of the tachometer circuitry, the user has easier access to the cylinder select switches, and the wiring for power input and signal input and output wires. Loose wires with or without a connector or a terminal strip can be used for electrical connections to the tachometer. The dual PCB circuit topology could be further reduced to a single PCB using surface mount components and construction.

The gauge has a plastic or glass lens 908, which may be backside printed with gauge indicia. An aluminum front Bezel 916 has a roller swaging at point 928 to an aluminum deep draw can 918. A Delrin or Zytel ring 904 is pressed into the Bezel 916 to retain the lens 908. A motor 924 turns the LED Pointer PCB. PCB assemblies 920 provide power to the motor 924 and process the motor synch signals 309, tach input signals at 265 and output LED drive signals 307 and at 311. Spacers 922 are provided to provide spacing between components. A motor shaft 942 and shaft coupler 932 couple the motor to the PCB assembly 910. As shown in FIG. 9e, a primary winding 936 (having a powder metal core 938) and secondary winding 934 may be connected to the motor housing 930 by glue 940. As shown in FIG. 9f, the primary winding 936 (having a ferrite bead core 944) is attached on the outside of the housing 930 and secondary winding 934 is an inner winding attached at the shaft coupler 932.

The shaft coupler is made from an insulating non-magnetic material such as nylon or Zytel. The shaft coupler has the LED pointer PCB attached and the secondary winding 934, which is wound directly on the shoulder below the PCB. This pointer PCB/shaft coupler assembly is then press fitted to the end of the fan motor shaft passing through the primary core and positions the secondary within 0.005–0.008 inch above the primary winding. The secondary winding 934 may be wound directly over the magnetic core and then may be surrounded by the outer primary winding 936 mounted to the motor case as shown in FIG. 9h.

Figure 10B:
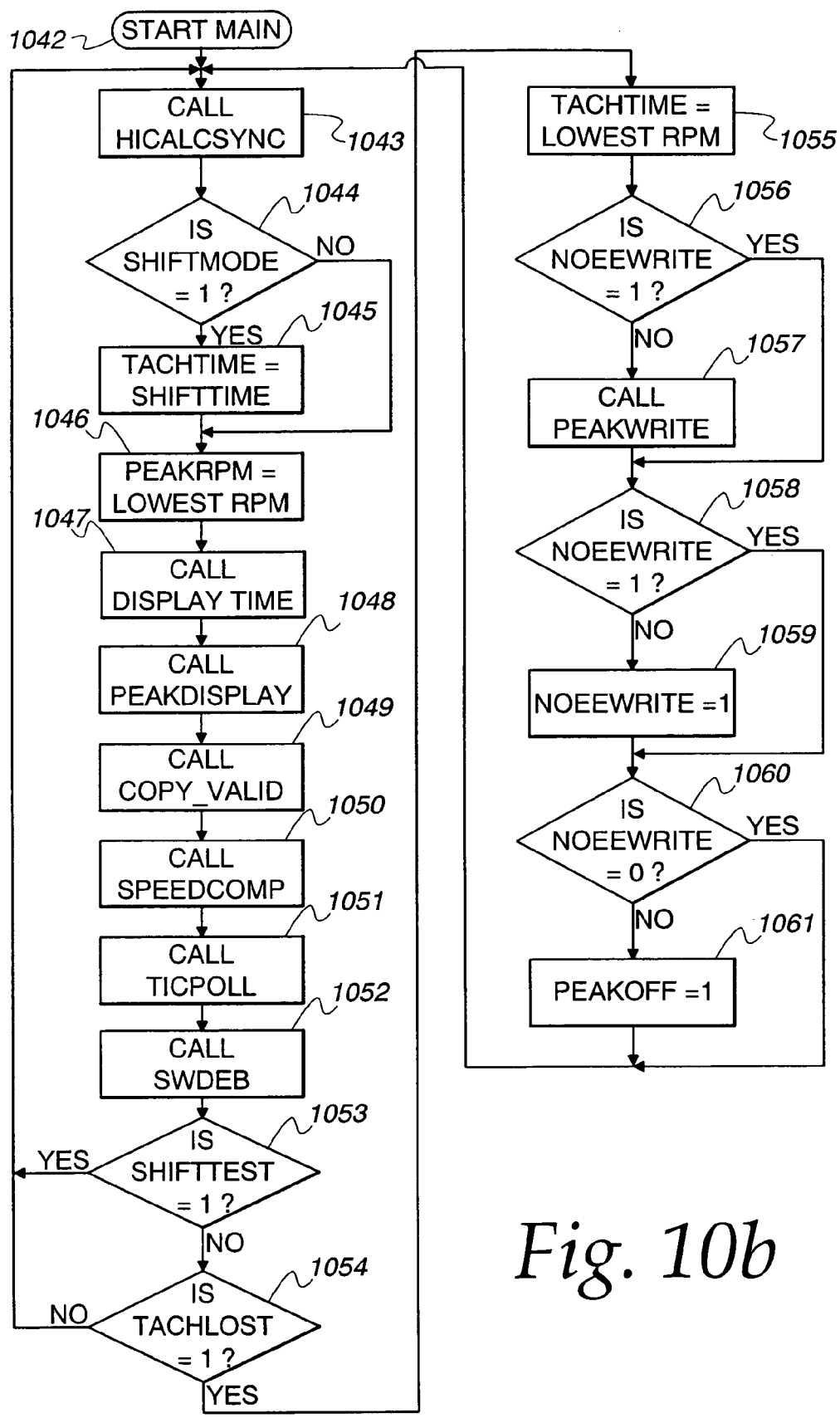
FIGS. 10a–10aa are flowcharts showing one example of the software used with the hardware of FIGS. 2a–f according to the present invention.
Figure 10C:
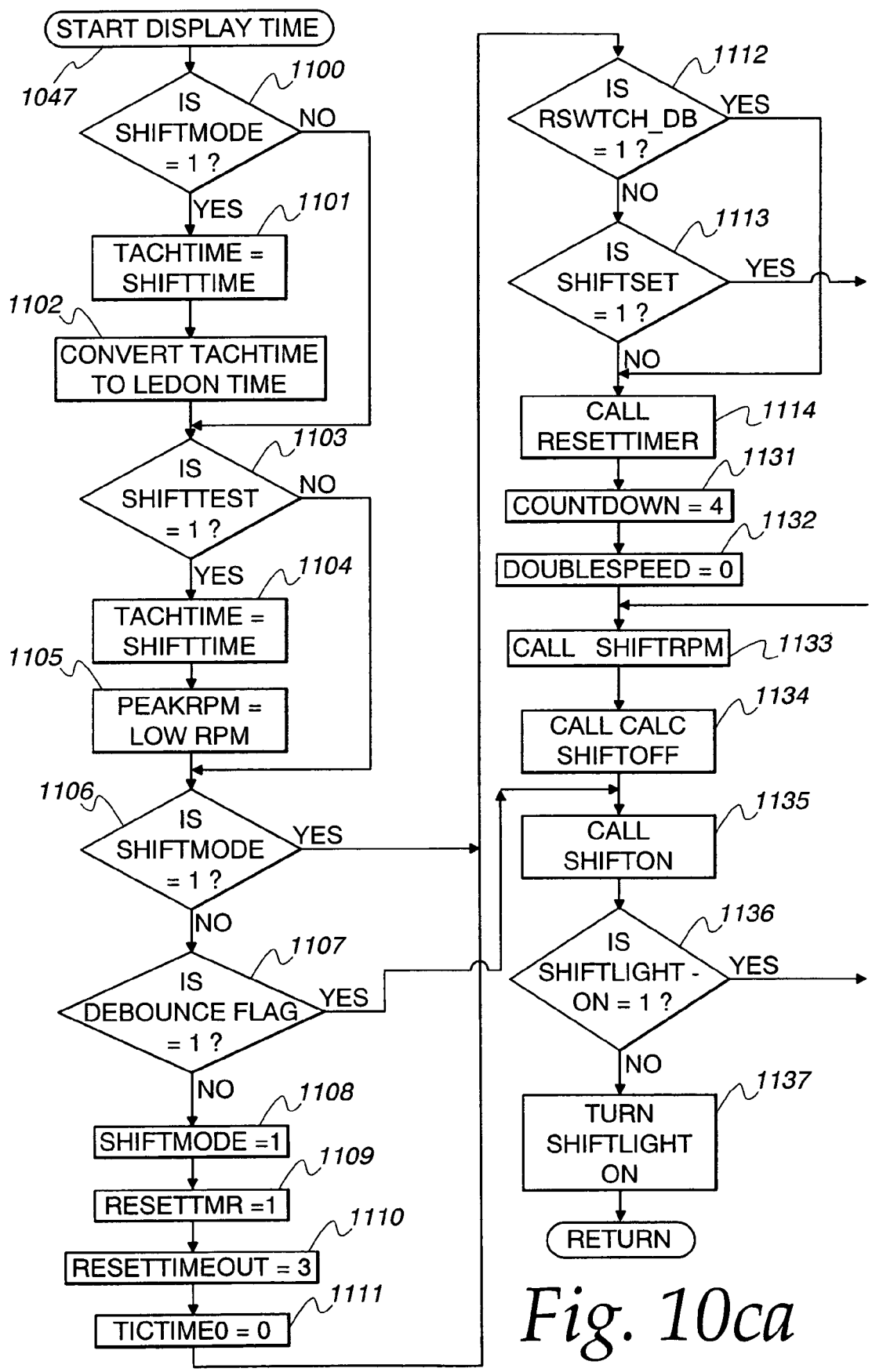
Figure 10D:
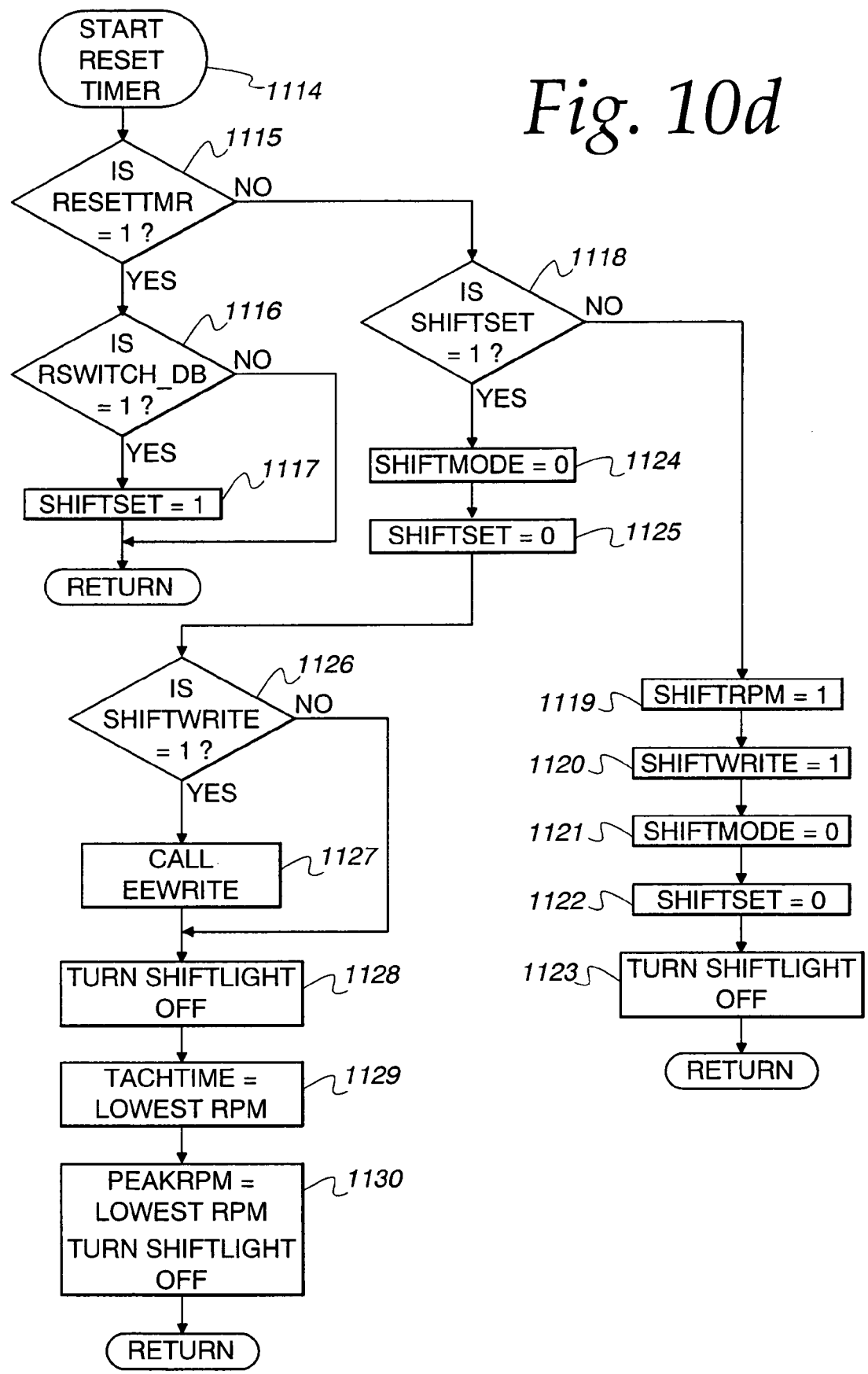
Figure 10E:
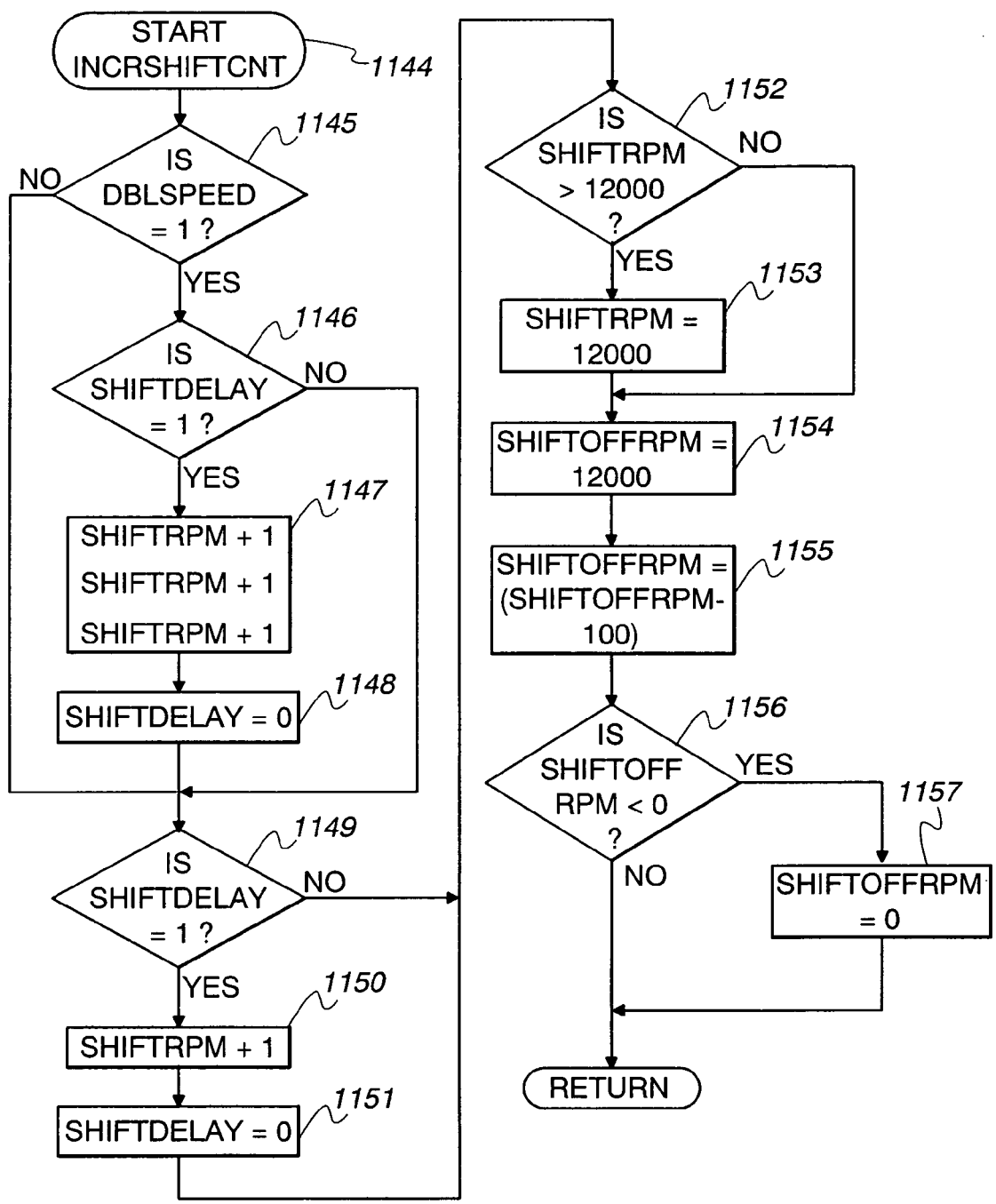
Figure 10F:
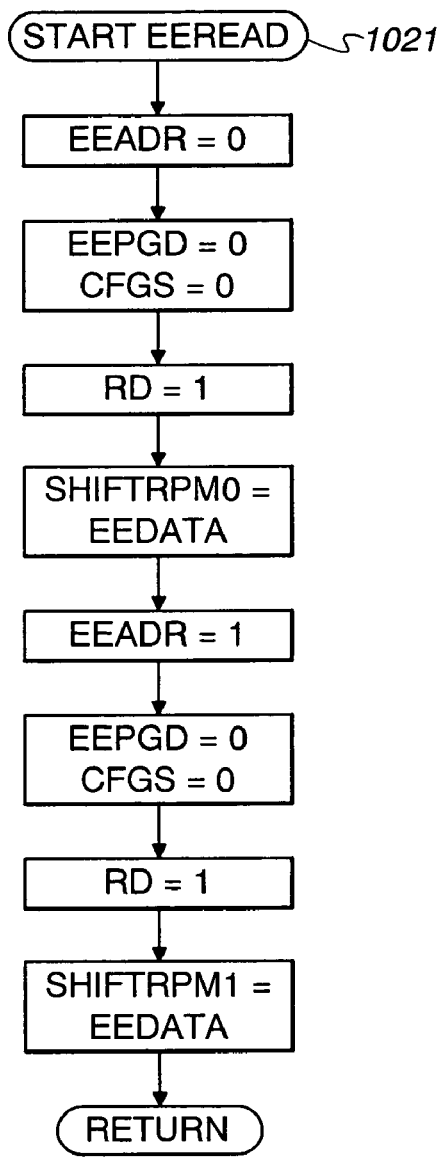
Figure 10G:
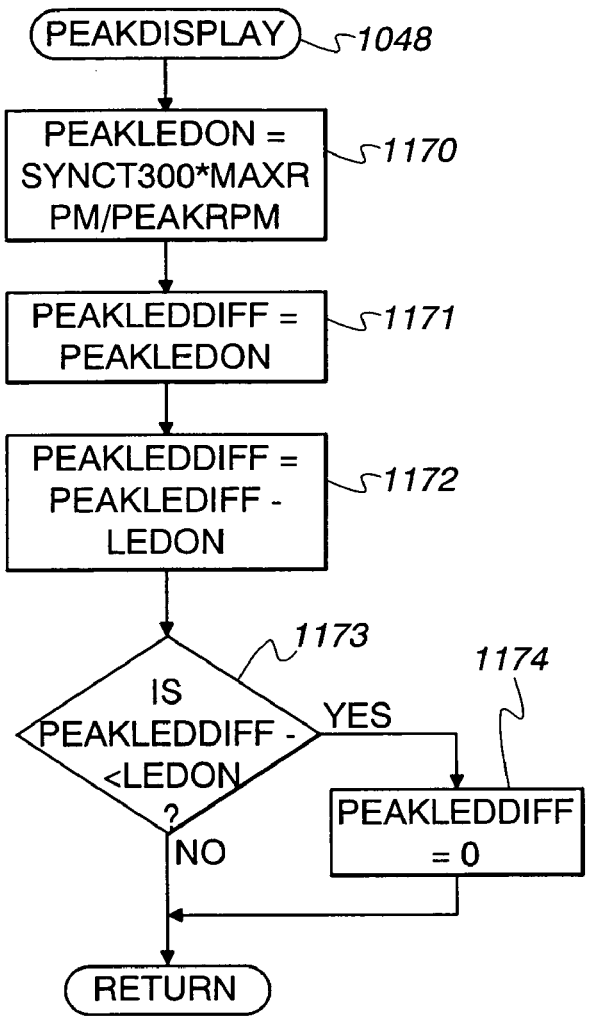
Figure 10H:
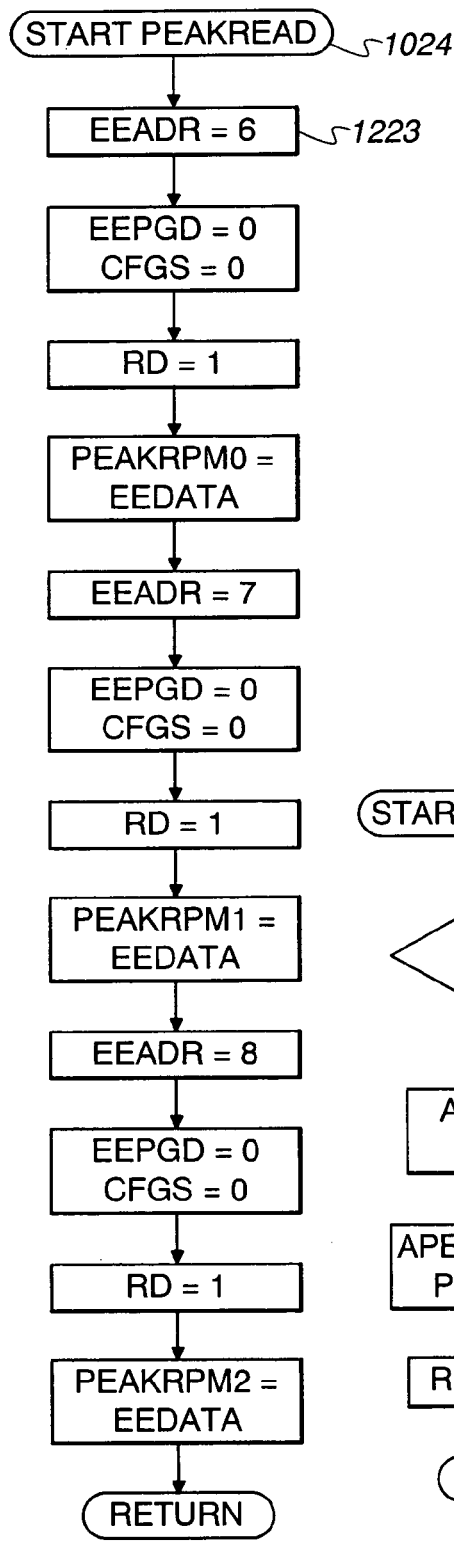
Figure 10I:
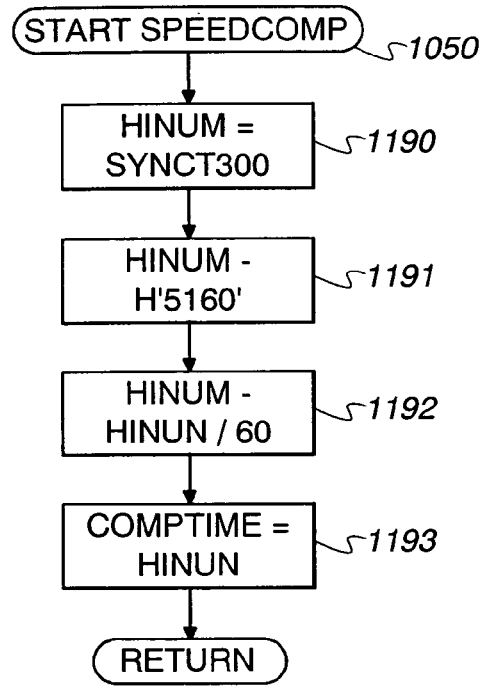
Figure 10J:
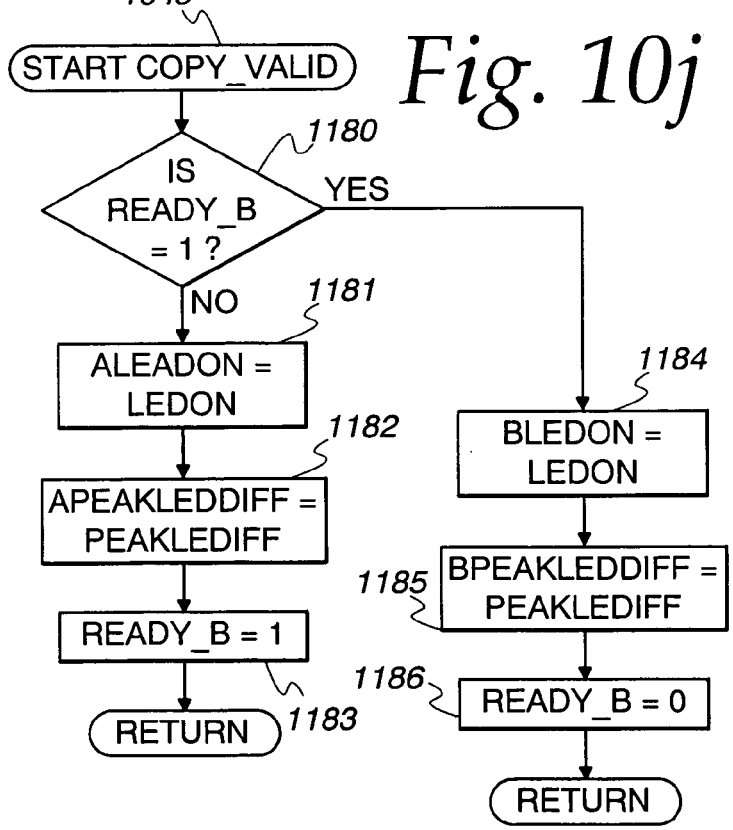
Figure 10M:
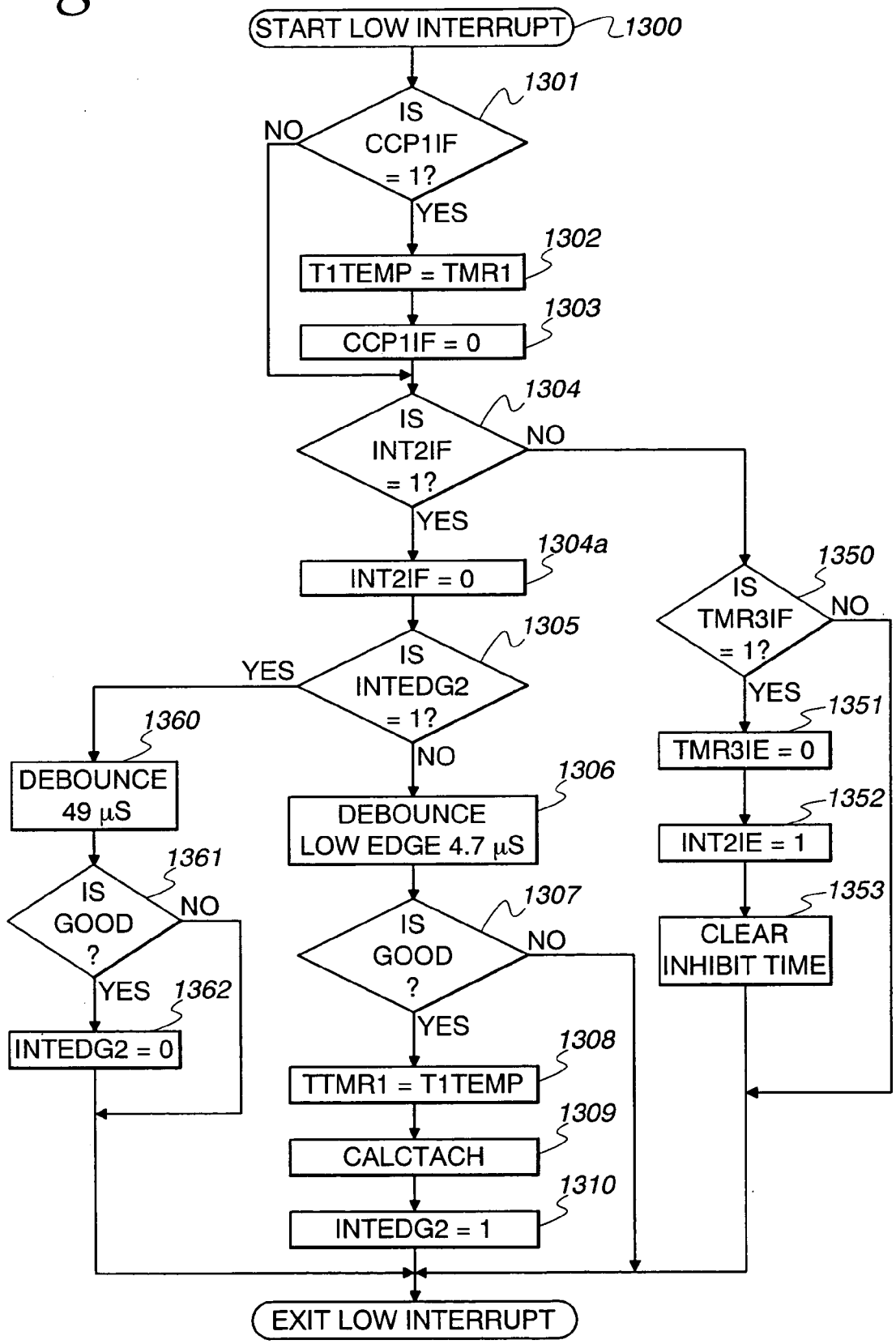
Figure 10O:
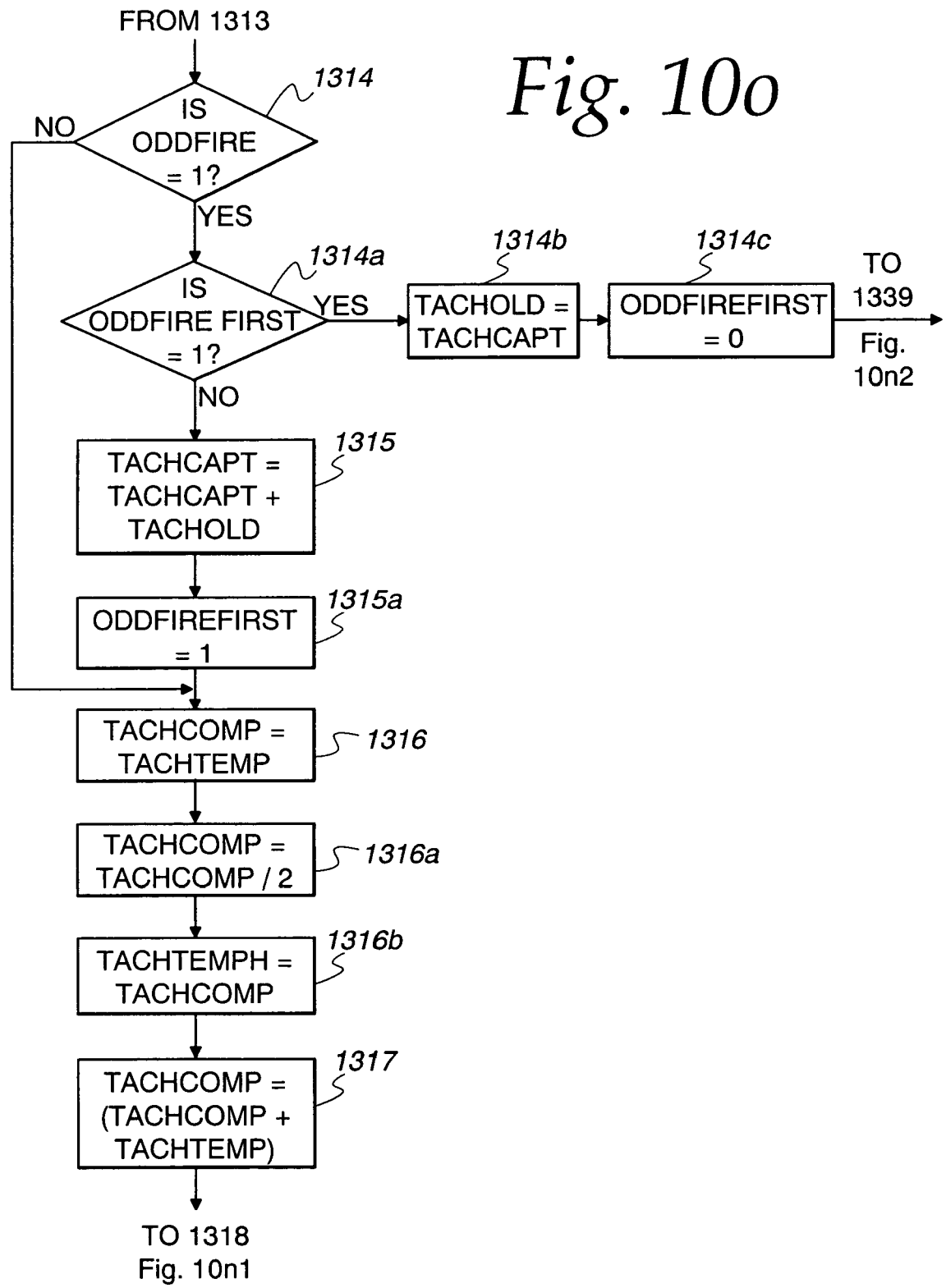
Figure 10T:
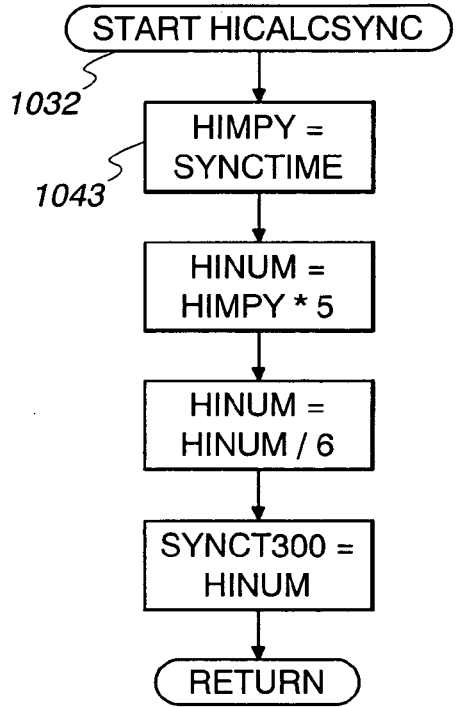
Figure 10U:
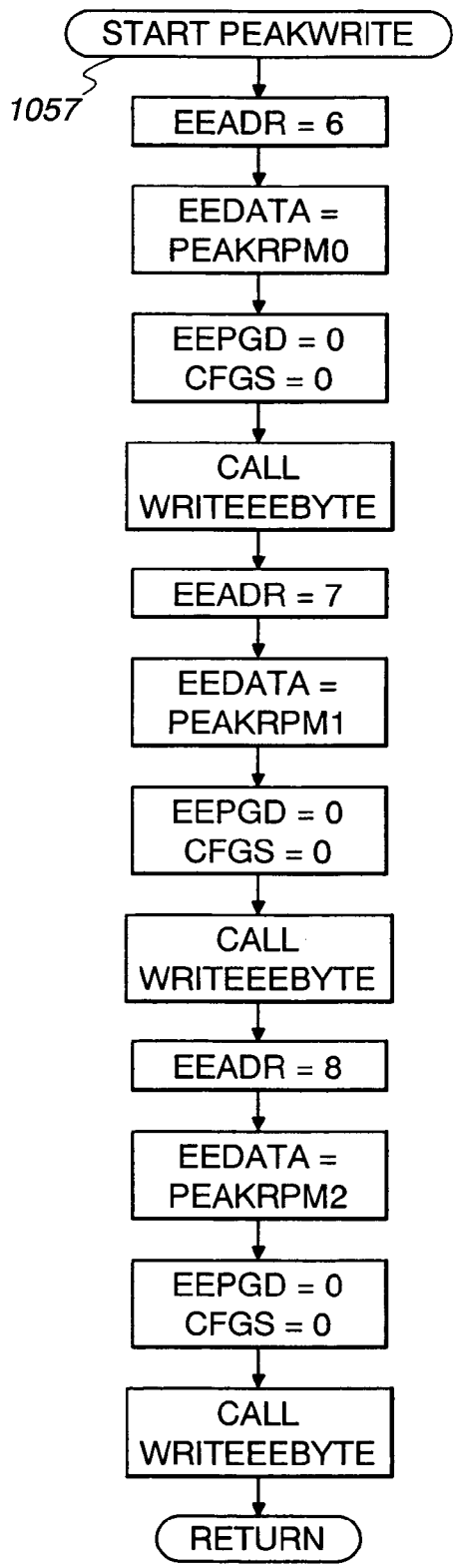
Figure 10V:
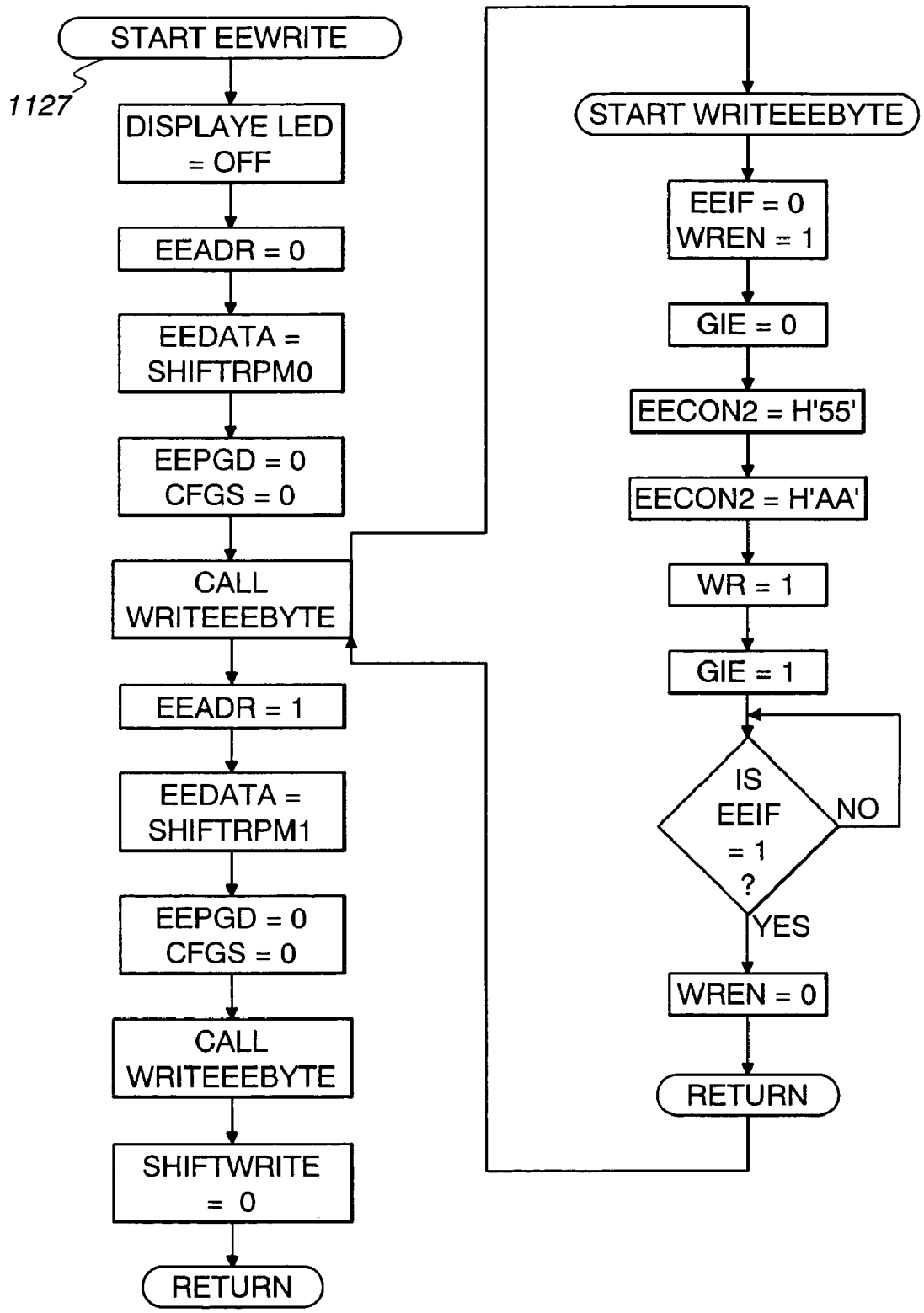
Figure 10W:
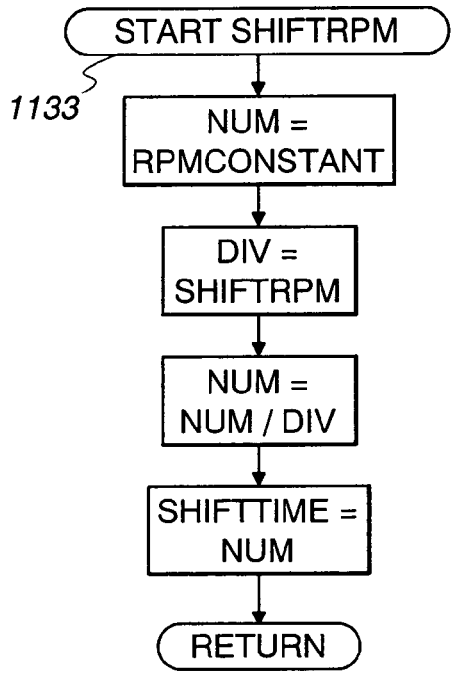
Figure 10X:
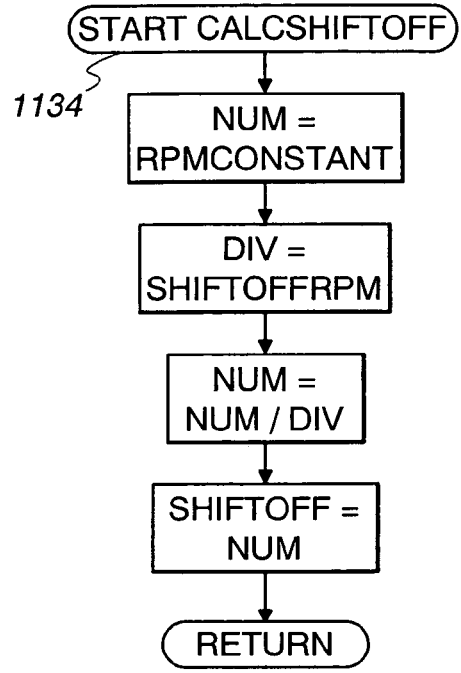
Figure 10Y:
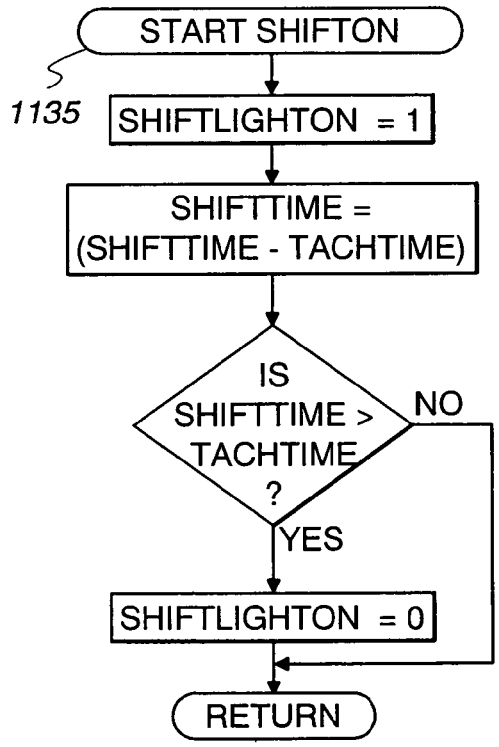
Figure 10Z:
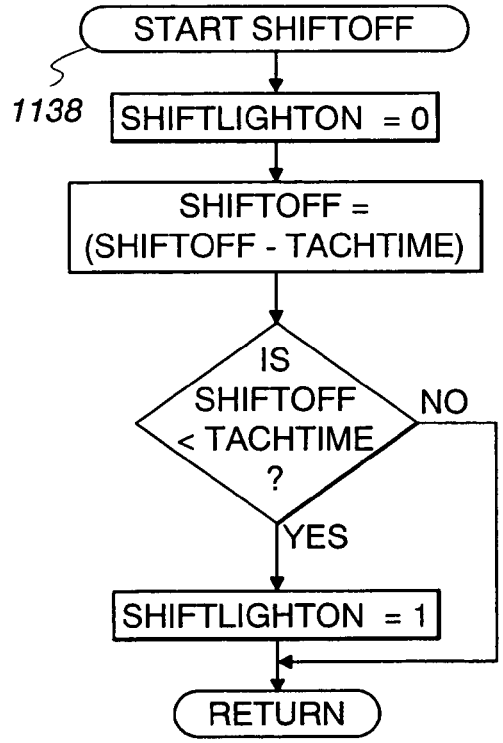
Figure 10A:
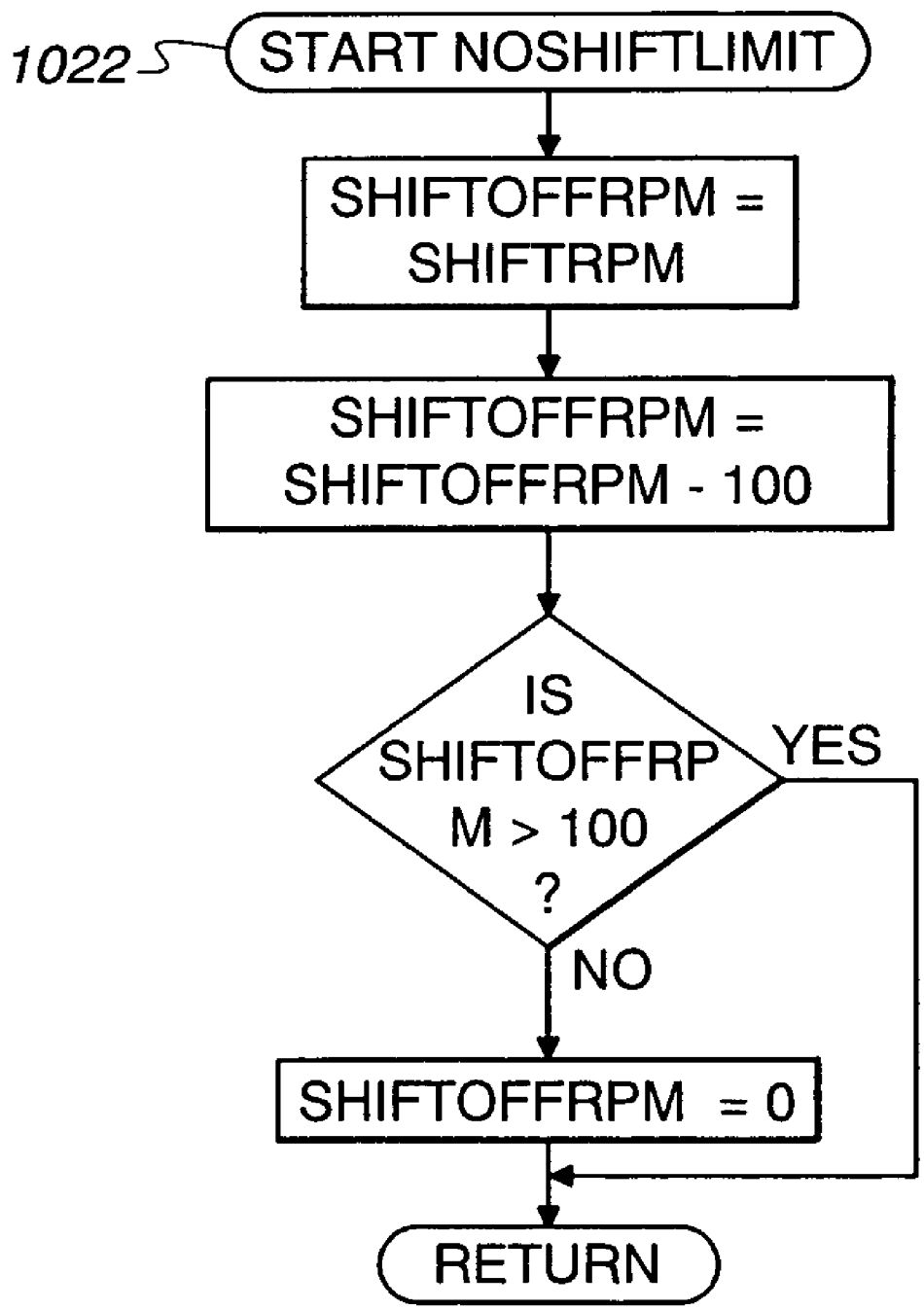

Referring now to FIGS. 10a–10aa, one example of and approach that controls the hardware of the spinning LED (of FIGS. 2a–f) is described. It will be understood that this is one example of an approach and that that different routines, variables, programming structures, and programming sequences may be used to accomplish the same or similar results as known to those skilled in the art. This approach allows for a precise indication of RPM or any other physical or mechanical data. The LED is turned on for a precise time and then turned off. The spinning LED appears to a user to be a growing bar when the data it displays are getting larger, or if the data is displayed at maximum to decrease the bar when the data are getting smaller. The calculations are based on a 10 MHz clock. Consequently, the smallest time to be calculated is 100-nanoseconds in duration at the display. In order to display anything with the spinning LED, the physical or mechanical data has to be converted into timing events or duration of clock time displayed.

After power is supplied to the device, execution begins with the program segment "INIT" at step 1001. In this segment, the program sets all necessary registers and I/O that are used for capturing, calculating, and displaying data. At step 1002, all interrupts are turned off. This guarantees that all steps are executed in a predetermine order. The next step 1003 initializes TIMER0 as a high interrupt source; TIMER1 and TIMER3 are initialized as low interrupt source. In addition TIMER1 is to be initialized as a capture input to capture Timer1 clocks when an interrupt occurs on that specific I/O pin.

Also initialized are the EDG0 and EDG1 transitions for interrupting. Furthermore, PORTS are initialized as inputs and outputs as they are needed for the hardware.

After setting all necessary registers, the INIT segment initializes the DATA Ram to all zeros at step 1004. At step 1005, OddFireInput flag and OddFireFirst flag are set to zero to turn off OddFire program routines. At step 1006, "CYLINDER SETTING SWITCH" is read. The switch is read in on PORTA, and then decoded as 12CYL, 8CYL, 6CYL, 4CYL, 2CYL, 1CYL, 6ODD and 2ODD. After decoding, the program advances to the subroutine for that particular switch setting. At step 1007, the program copies the value of 12000 RPM in timer counts into MaxRpm register. The following formula is used to accomplish this:

$$(1/((12000\ RPM/60\ Sec)*(CYL/2)))/0.0000004 = MaxRpm\ \text{in timer counts.}$$

If in OddFire Mode, the flags OddFireInput and OddFireFirst are set to "one" in order to run the OddFire routines in the specific routines that are used for OddFire capturing and calculating.

At step 1008, the module InitCount is loaded with the value of 50 and then the LED is turned on at step 1009. After this step, the Sync input is tested at step 1010. If the Sync input is high then it waits for the Sync input to go low again. If the Sync input goes low (at step 1011) the InitCounter is decremented at step 1012. Then, at step 1013, the InitCount is tested for the value of zero. If the value is not zero then the routine starts again with step 1010. However, if InitCount equals zero, then PeakRpm (at step 1014), TachTime (at step 1015), and TachTemp (at step 1016) are initialized to the lowest RPM that is 0xFFFFFF in timer counts, and ShiftRpm (at step 1017) count is set to one. Then, at step 1018, the flags ShiftWrite, ShiftMode, ShiftSet, and at step 1019 NoEEWrite and TachLost are set to zero.

The program now calls various subroutines. The first subroutine called is EERead at step 1020. At step 1021, the value for ShiftRpm is read from EEPROM and is copied into ShiftRpm which is used to determine by the use of this formula (ShiftTime=(RpmConstant/ShiftRpm)) to turn on or turn off the shiftlight. The next subroutines that are called are NoShiftLimit (at step 1022) and CalcShiftOff (at step 1023). These routines calculate the Shift Set Limit which is 12000 Rpm and the shift turn off Rpm which is ShiftRpm−100).

After calculating the turn off or turn on of the shift light, the program reads the values for PeakDisplay found in the next data registers in EEPROM, this is done through the PeakRead subroutine at step 1024. The values read from EEPROM are used in the next subroutine. The subroutine (step 1025) calculates PeakRpm in timer counts and calculates the difference of PeakRpm−LedOnTime in timer counts. Then, TachCount is set to 20 (at step 1026) and the counter for ShiftDebCount (step 1027) is set to 50. Further, at step 1028, the flags, ResetTmr, DblSpeed, and RSwtch_Db are set to their initial values.

The next program segment will enable the high and low interrupts again (at step 1029) reloads the InitCounter (step 1030) with the value of four and starts the 2 second time delay routine. In this routine the program checks first for the hardware Sync high input of the sync signal. If the input is low, the routine waits until a Sync high (step 1031) is detected. After detecting a high the program now calls the HiCalcSync (at step 1032) routine. In this routine, the program calculates the 300Degree arc SyncDisplay in timer counts to be used for displaying maximum RpmMax, PeakRpm, and maximum ShiftRpm in timer counts. When the Sync input (at step 1033) changes to low, the program decrements the InitCounter (step 1034) by one and tests whether InitCounter reached zero count or not. If the InitCounter (step 1035) is not zero then the loop starts again at Step 1031. Otherwise, the program continues with turning the LED off at step 1036. Then, the subroutine for calculating HiCalcSync (step 1037) is called again to calculate the new SyncTime for calculating the 300 Degree arc SyncDisplay. The next subroutine calculates the ShiftRpm (at step 1038) in timer counts.

After calculating ShiftRpm the flag ShiftTest (at step 1039) is set, the flag TachLost (step 1040) is reset and InitCounter (step 1041) is loaded with the value six. The ShiftRpm is displayed for 1.5 seconds, which verifies again that the program and hardware is working properly.

The program segment that is called next is Main at step 1042. This program segment is a loop, which starts with the command clrwdt and ends by a command branch to the start of Main loop. Main can be interrupted at any time by the LowInterrupt routine and the HiInterrupt routine.

At step 1043, in the Main subroutine, the first subroutine calls the HiCalcSync subroutine and this routine is used to calculate the new SyncTime and calculates the 300 Degree arc SyncDisplay time in timer counts. The Main Loop checks for the ShiftMode flag. (at step 1044). If this flag is set, the program then copies the ShiftTime into TachTime (at step 1045) in order to display the current ShiftRpm setting. Next, at step 1046, the PeakRpm is cleared and set to 0xFFFFFF which will indicate the lowest possible RPM for the device.

If the ShiftMode flag (at step 1044) was not set, the program continues with the calling of the DisplayTime subroutine at step 1047. The first thing that is checked is the ShiftMode flag. (at step 1100) If the flag is set then instead of TachTime, the ShiftTime (at step 1101) is used to calculate the timer counts for a maximum of 300 Degree arc DisplayTime. If the ShiftMode flag is not set at step 1100, then TachTime is used for the calculation. The result of the calculation is then copied into the LedOn (at step 1102) register. Before executing step 1106, the program checks for ShiftTest flag at step 1103. The only place were the ShiftTest flag can be set is in the INIT routine discussed previously.

At step 1106, the shift light is turned on or off depending on the ShiftRpm and displayed with the help of the moving pointer display. The program tests for the shift switch which is debounced for 50-msec during pressing the switch and releasing the switch or switch activation and deactivation. The debounce switch routine is described later in greater detail. If the shift switch is pressed once and released during the first 0.75 seconds, then the PeakRpm is set to 0xFFFFFF or the lowest RPM possible, and the current ShiftRpm, which is stored in EEPROM, is displayed for one second. If the shift switch is pressed again during the 0.75 second display time, the ShiftRpm will be increased. For the first second the ShiftRpm is increased at rate of 200 RPM/second, and then the ShiftRpm is increased at a rate of 800 RPM/second after the first second, which makes it faster to reach the set point. The rate of 200 RPM/second equates to about 2.4 RPM/revolution of the pointer at a pointer speed of 5000 RPM. The rate of 800 RPM/second equates to about 9.4 RPM/revolution of the pointer at a pointer speed of 5000 RPM. When the switch is released for a moment and pressed again before 0.75 second has elapsed then the ShiftRpm is increased at the slower rate of 200 RPM/second again. This method makes it possible to increase at a slower rate then speed up to a much faster rate to the final setting in a very short amount of time. In order to reset the ShiftRpm to the minimum RPM, the shift switch has to be pressed for more than 1.75 seconds.

At step 1106, the ShiftMode flag is tested. If the ShiftMode flag is not set then it tests for the RSwtch_DB flag (at step 1107). If the RSwtch_DB flag is set, then the ShiftMode flag is set at step 1108. This is the only place in the program where the ShiftMode flag can be set. After setting the ShiftMode flag, the ResetTmr flag is initialized at step 1109 and the ResetTimeOut is initialized at step 1110 with the count of 3*0.25 seconds.

The next step is to clear TicTime0 at step 1111. This is in preparation for the ShiftRpm setting and to reset PeakRpm to 0xFFFFFF. The next program step is to test whether the RSwtch_DB is still set at step 1112. If the RSwtch_Db is still set, then the program will test for the ShiftSet flag at step 1113. If RSwtch_DB is no longer set, then the program branches to step 1114. At step 1114, the subroutine ResetTimer is called. ResetTimer routine now tests for the ResetTmr flag at step 1115. If this flag is set, the subroutine tests for the RSwtch_DB at step 1116 again. If RSwtch_DB flag is cleared then it returns to the calling routine. If the flag is not set, at step 1117 the flag ShiftSet is set and the program returns to the calling routine.

If the ResetTmr flag is cleared the program branches to step 1118. The first step in this routine is to test whether the ShiftSet flag is set or not. If ShiftSet flag is not set, the program branches to step 1119. In this routine ShiftRpm is loaded with the value of one, the flag ShiftWrite is set to one at step 1120, and the flags ShiftMode and ShiftSet are reset to zero at steps 1121 and 1122. The last step in this routine is to turn off the Shiftlight (at step 1123) LED if it was set before.

If ShiftSet was set at step 1118, the program continues now with clearing ShiftMode (at step 1124) and ShiftSet (at step 1125) flag. Then, it tests for the ShiftWrite flag at step 1126. If the flag is set the program calls the subroutine EEwrite at step 1127. In this routine, the ShiftRpm is stored in EEPROM and ShiftWrite flag is cleared. The next step before leaving the ResetTimer subroutine is to load TachTime at step 1129 and PeakRpm at step 1130 with the value of 0xFFFFFF and turning the ShiftLight Off.

Next, the program loads CountDown at step 1131 with the value of four and clears the DblSpeed flag at step 1132. Then, the subroutine ShiftRpm is called at step 1133 where the ShiftRpm is converted into timer counts. Then, another call is made to a subroutine called CalcShiftOff at step 1134. In CalcShiftOff, timer counts for ShiftOff are calculated. After calculating ShiftOff the subroutine ShiftOn is called at 1135. In the ShiftOn subroutine, ShiftTime is compared with TachTime. If ShiftTime is greater than TachTime the ShiftLightOn flag is cleared and the subroutine returns to its caller.

If the ShiftLightOn flag is cleared at step 1136, this in turn will turn on the ShiftLight at step 1137 and the program will exit and return to Main. If the flag at step 1136 was set, then the subroutine ShiftOff is called at step 1138. In this routine, (ShiftTime−100 Rpm) is compared with TachTime. If TachTime is grater than (ShiftTime−100 Rpm) than the flag ShiftLightOn is set to one and the program returns back to the calling routine.

If the ShiftLightOn flag is determined to be set at step 1139, the shift light is turned off at step 1140 and the program returns. If ShiftLightOn flag is determined not to be set at step 1139, the program returns without turning off the shift light.

If it is determined that the ShiftMode flag was set at step 1106, then the program continues with testing the flag RSwtch_DB at step 1112. If the RSwtch_DB flag is not cleared, then the program tests the ShiftSet flag at step 1113. If the ShiftSet flag is set then the ShiftWrite flag is set at step 1141. Then, the variable ResetTimeOut is loaded with the value of three at step 1142 and, after loading the variable ResetTimeOut, the program calls the subroutine IncrShiftCount at step 1144. In this subroutine, the flag DblSpeed is tested at step 1145. If the flag is not set, then the routine branches to step 1149). However, if the flag DoubleSpeed was set, a test is made to determine whether the flag ShiftDelay is set or not at step 1146.

If the flag is not set then the program will not increase ShiftRpm and branches to step 1149. If the flag is set, then the ShiftRpm is increased by the count of three at step 1147 and the flag ShiftDelay is cleared at step 1148. Then, the flag ShiftDelay is tested again at step 1149. If the flag is not set, the program branches to step 1152. However, if the flag ShiftDelay is set, then the program increases the ShiftRpm by one at step 1150, and clears the ShiftDelay flag at step 1151.

The program now compares whether ShiftRpm is above 12000 RPM or not at step 1152. If the ShiftRpm is greater then 12000 Rpm, ShiftRpm, at step 1153, is loaded with the value of 12000. However, if the ShiftRpm is smaller then 12000 RPM, ShiftRpm is copied into ShiftOffRpm at step 1154 and 100 Rpm hysteresis is subtracted from ShiftOffRpm at step 1155. Next, ShiftOffRpm is tested for a value smaller than zero at step 1156. If the ShiftOffRpm is smaller than zero, ShiftOffRpm is loaded with the value of zero, and the program returns back to the calling routine at step 1157. But if ShiftOffRpm is greater than zero, the program returns, without updating, to the calling routine.

The next subroutine in Main is called PeakDisplay at step 1048. In this routine, timer counts for the PeakRpm pointer are calculated. The calculation is done as following (Synct300*MaxRpm)/PeakRpm)). The result is then stored in the PeakLedOn register at step 1170. The next step is to calculate PeakLedDiff, for the off time on the display, in timer counts. The timer counts are calculated by copying PeakLedOn into PeakLedDiff at step 1171. Then, LedOn is subtracted from PeakLedDiff and the result is copied back into PeakLedDiff at step 1172. If it is determined that PeakLedDiff is smaller than LedOn at step 1173, then the value of zero is loaded into PeakLedDiff at step 1174. This indicates there is no PeakRpm to be displayed. The program now returns to the Main loop again. If PeakLedDiff is greater than LedOn, the program returns with the PeakLedDiff value calculated and PeakRpm will be displayed.

Following the PeakDisplay routine, the Copy_Valid subroutine is executed at step 1049. This routine is used in conjunction with the HiSync routine. The Copy_Valid subroutine tests the Ready_B flag at step 1180. If the flag is not set, then LedOn is copied into ALedOn register at step 1181 and PeakLedDiff is copied into APeakLedDiff at step 1182. At the end of the routine, the Ready_B flag is set at step 1183 and the subroutine returns to Main. However, if Ready_B was set the program branches to step 1184. Then, LedOn is copied into BLedOn at step 1184 and PeakLedDiff is copied into BPeakLedDiff at step 1185. Before exiting to Main, the flag Ready_B is cleared at step 1186.

The next subroutine called is SpeedComp at step 1050. In this subroutine, 200 RPM are compensated for the on time of the LED. The 200 RPM are taken out as a fraction over the whole arc of the display. This is done to keep the LED turn-on position relative to the zero display position across the complete RPM displayed range. This is done by copying Synct300 Time into HiNum at step 1190. Next, the highest possible number (in timer counts, for example, 0×5160) is subtracted from HiNum at step 1191. HiNum then is divided by 60 at step 1192 and the result is copied into CompTime at step 1193. This is the end of this subroutine and then returns to Main.

Then, the subroutine TicPoll is called at step 1051. The first step in this routine is to copy Timer1 value into TicTemp register at step 1200. In this routine, a software counter is updated every millisecond. This is done by comparing TicTemp with TicRefTime at step 1201. When TicRefTime is greater than TicTime the program returns to Main.

If TicTemp is greater than TicRefTime, then the value of 0x09C4 is added to TicRefTime at step 1202 and the DebounceMs flag is set at step 1203, which means that one millisecond has elapsed.

The TicPoll routine now continues with counting up and resetting certain software timers needed in the main program. One of the first software timers used is TicDelayTime. At step 1204, TicDelayTime is counted from zero to five. When five is reached, (at step 1205) after five milliseconds, then the flag ShiftDelay is set at step 1206 and the TicDelayTime is reset to zero again at step 1207. However, if the count of five was not reached then the routine continues with step 1208. The ShiftDelay flag is tested at step 146) in the IncrShiftCount routine (step 1144) to slow down the ShiftRpm increase if it is not set.

Every millisecond the software timer TicTime is increased up by one at step 1208 until 250 milliseconds are reached and then TicTime is reset to zero at step 1210. If it is determined that 250 milliseconds are not reached at step 209, then the TicPoll routine returns back to Main.

The next software down count in the TicPoll subroutine (step 1051) after 250 milliseconds has elapsed is ResetTimeOut (at step 1211) which is set initially in the Start DisplayTime routine (step 1047). If ResetTimeOut decreased to zero (at step 1212), that is, after 0.75 seconds, then the flag ResetTmr and ResetTimeOut are cleared at steps 1213 and 1214.

The ResetTmr flag is also used in the DisplayTime routine at step 1047. The next step is the CountDown routine. Countdown is set and started in the DisplayTime (step 1047) routine. CountDown (at step 1215) is decremented by one every 250 milliseconds until zero is reached. If it is determined that zero is not reached (at step 216), the program continues with testing of the ShiftTest flag at step 1219. However, if zero was reached, then the DblSpeed flag is set at step 1217 and CountDown is set to zero at step 1218. The time delay for CountDown is one second. After one second, the flag DblSpeed is set. This indicates the ShiftRpm is increased by four as described above.

The next program segment in TicPoll is used only once after Init routine, right before the program starts the Main loop. The purpose for this time delay is to allow the last ShiftRpm setting to be displayed for 1.5 seconds. If it is determined that the ShiftTest flag was not set at step 1219, then the routine returns to Main. But if the flag was set, then InitCounter is decreased by one every 250 milliseconds at step 1220. If the InitCounter is determined not to be zero at step 1221, then the routine returns to Main. Otherwise, the routine clears ShiftTest at step 1222, calls subroutine PeakRead at step 1223 and resets InitCounter to zero at step 1224.

The last subroutine that is called in the Main loop is SwDeb at step 1052. The purpose of this routine is to debounce the shift/reset switch. This routine uses a software one millisecond up down counter for determining the status of the shift/reset switch. If the switch is pressed for less than 50 millisecond the RSwtch_DB flag will not be set. If the switch is pressed for more than 50 milliseconds the RSwtch_Db flag will be set.

The use of an up down software counter allows for the use of an electronic switch that is oscillating when active, such as the touch switch integrated circuit used in this invention.

The first step in this subroutine is to test the DebounceMs flag at step 1230. If the flag is not set, then the subroutine returns to Main, but if the flag was set then the program continues with resetting the DebounceMs flag at step 1231) and RswtchCount to zero at step 1232. The next step is to test the RSwtch input three times at steps 1233. If the switch is low then RSwtchCount is incremented by one at steps 1233a. Then, the value of RSwtch is compared with the value of two. If it is determined that RswtchCount is smaller at step 1234, then at step 1235 ShiftDebCount is incremented by one.

The next test that follows in the program is to test ShiftDebCount. If it is determined that ShiftDebCount is smaller than 49 at step 1236, the program returns to Main. But, if ShiftDebCount reached fifty then ShiftDebCount is set to 49 at step 1237 and Rswitch_Db is set to zero at step 1238 and returns to Main. If RswtchCount has the value of two or greater then ShiftDebCount is decremented by one at step 1239. After decrementing ShiftDebCount the program tests that ShiftDebCount is not smaller than zero at step 1240. If ShiftDebCount is greater than zero, the routine returns to Main. Otherwise, ShiftDebCount is set to zero at step 1241 and RSwtch_Db is set to one at step 1242. This ends the SwDb routine and control returns to Main.

The next step is to test if the ShiftTest flag is set. If ShiftTest is determined to be set at step 1053, then the Main loop is started all over again. If ShiftTest is not set, then it continues with the test of TachLost flag at step 1054. If this flag is not set, then it returns to top of the Main loop. But if the TachLost flag is set then it copies 0xFFFFFF into TachTime at step 1055. The next program step is to test for the NoEEWrite flag at step 1056. If this flag is not set, then the subroutine PeakWrite is called at step 1057 and the last PeakRpm value is stored into EEPROM. Then, another test is done to check the NoEEWrite flag again at step 1058. If this flag is not set, then it will be set at step 1059. If it is determined the flag was set, then it checks for NoEEWrite flag again. If it is determined that NoEEWrite is not set at step 1060, the PeakOff flag is set at step 1061 and the Main loop is started all over again. If it is determined that the NoEEWrite flag is set at step 1060, the PeakOff flag will not be set and the program continues with the Main loop again.

The next routine executed is the LowInterrupt routine. This routine can be interrupted at any moment by the HiInterrupt routine. The only ways to branch to the LowInterrupt routine is with a falling input edge of the CCP1IP input pin, any input edge of the tach-input RB2, and Timer3 interrupt only when enabled by the LowInterrupt routine. Every time LowInterrupt is executed the status register is saved and at the exit of the LowInterrupt routine the original status is restored.

At step 1301, the LowInterrupt routine tests for the CCP1IF flag. If the flag is not set, then the program branches to step 1304. If it is determined that the CCP1IF flag is set at step 1301, then the TIMER1 values are copied into the TITemp register at step 1302 and the CCP1IF flag is cleared at step 1303.

Then, the program continues with the testing of the INT2IF flag at step 1304. If the flag is not set, then the program branches to segment routine at step 1350. If the INT2IF flag is set, then the program clears the INT2IF flag at step 1304a. After clearing the flag, the next step is to test the INTEDG2 flag at step 1305. If it is determined that this flag is set, then the program branches to the routine at step 1360. If the flag is not set, then the next step is to debounce the low going edge of the tach input for 4.9-microseconds at step 1306. If it is determined that the input is not good at step 1307, this indicates that there was an invalid pulse at the tach input pin, and the program returns from the LowInterrupt routine. If the debounce was declared good, then T1Temp is copied into Ttmr1 register at step 1308. The next step is to call the subroutine CalcTach at step 1309.

The CalcTach routine has modules that provide for the calculation of TachTime, OddFire capture, testing whether the TachRpm is out of range from last TachRpm, testing for MaxRpm 12000 Rpm, testing for new PeakRpm, resetting of TachPeriod less than 150 msec, clearing flags NoEEWrite, PeakOff, copying PeakRpm to current Rpm, calculating average RPM, and finally calculating the inhibit time in timer counts for disabling the tach input for a duration of 22.5 Degree or a maximum of 16 msec.

After branching to the CalcTach subroutine, Ttmr1 value is copied into TachCapt register at step 1311. The program continues with calculating TachTime. This is performed by subtracting OldTach from TachCapt at step 1312. TachCapt then holds the new TachCapt time in timer clocks. The next step is to copy Ttmr1 into OldTach at step 1313.

The program continues by testing the OddFireFirst flag at step 1314. If this flag is not set, then the program branches to the program module at step 1316. But if the OddFireFirst flag was set in the INIT routine, then the program continues by testing the OddFireFirst flag at step 1314a. If the OddFireFirst flag is set, then TachCapt is copied into TachOdd register at step 1314b and the OddFireFirst flag is cleared at step 1314c. The program now continues with step 1339.

However, if OddFireFirst flag was not set then TachCapt is added to TachOdd and the result again is stored in TachCapt register with step 1315. Then, the OddFireFirst flag is set again at step 1315a or another input capture.

The next routine that follows is copying the TachTemp value into TachComp at step 1316. TachComp is now divided by two at step 1316a and copied into TachTempH register at step 1316b. TachTemp is now added to TachComp and the result stored back into TachComp at step 1317.

The next step in the program is to compare TachCapt with TachComp at step 1318. If TachCapt is greater than TachComp, TachCapt is copied into TachTemp at step 1319 and the program branches to step 1339. If TachCapt was smaller than TachComp, the program continue with comparing if TachCapt with TachTempH at step 1320. If it is determined TachCapt is smaller than TachTempH, TachCapt is copied into TachTemp at step 1321 and a branch is made to step 1339. However, if it is determined that TachCapt was not smaller than TachTempH, TachCapt is copied into TachTemp register at step 1322.

The next step in this routine is to test the ShiftTest flag at step 1323. If this flag is set, then the program branches to step 1326. However, if the flag is not set, then the program tests the ShiftMode flag at step 1324. If this flag is set, the program branches to step 1326. If this flag is not set than TachCapt value is copied into TachTime register at step 1325.

TachTime then is compared with MaxRpm at step 1326. If TachTime is greater than MaxRpm, MaxRpm is copied into TachTime at step 1327. If TachTime is not greater than MaxRpm, the program branches to step 1328.

The next step is to test for NewPeakRpm at step 1328). If TachTime is greater then PeakRpm, the TachTime value is copied into PeakRpm at step 1329. If TachTime is smaller then PeakRpm, then the PeakRpm is not changed. Next, TachTime is compared with timer counts greater than 100 Rpm at step 1330. If TachTime is smaller than 100 Rpm (in timer counts), the program branches to step 1335. If TachTime is greater than 100 Rpm (in timercounts), then the NoEEWrite flag is set at step 1331, and TachCount register is reloaded with the value of 20. After this step is performed, the TachLost flag is cleared at step 1332.

The next step is to test for the PeakOff flag at step 1333. If the PeakOff flag is not set, then the program continues with step 1335. However, if the flag is set then PeakRpm is loaded with 0xFFFFFF and the PeakOff flag is cleared at step 1334.

The next step is to test for AvgRpmCount at step 1335. If AvgRpmCount is not greater then zero, the program continues with step 1339. Otherwise, the program continues with testing the AvgCount register at step 1336. If the register is not zero, then the program continues with calculating AvgRpm and incrementing AvgRpmCnt register at step 1336a. However, if the register is zero, then it clears AvgRpm and AvgRpmCnt register at step 1337. After clearing the register, AvgTmpRpm is copied into TachTime at step 1338.

In the next routine, TachCapt is copied into LoNum at step 1339. LoNum is divided by four at step 1339a and compared with the value for 16 msec at step 1340. If LoNum is greater than 16-milliseconds (in timer counts) the value of 16-milliseconds (in timer counts) is copied into LoNum at step 1341. However, if LoNum was smaller than 16-milliseconds (in timer counts), the value in LoNum is then copied into TMR3 at step 1343. Before copying LoNum into TMR3, the flag TMR3IE is set and flag TMR3IF is cleared, and the TMR3 register is cleared at step 1342. In the last segment Inhibit Time flag is set at step 1344. This ends the subroutine and execution returns to its call in LowInterrupt.

The next step back into the LowInterrupt routine is to set the flag INTEDG2 at step 1310 and returns from the LowInterrupt routine. Still in the Low Interrupt subroutine, the INT2IF flag is tested at step 1304. If it was not set, then the TMR3IF flag is tested at step 1350. If the flag is not set, the program returns from the LowInterrupt routine. However, if the flag is set, then TMR3IE is cleared at step 1351 and INT2IE is enabled at step 1352. Inhibit Time flag is cleared and the program returns from the LowInterrupt routine at step 1353.

If INTEDG2 was set at step 1305, the program branches to step 1360. In this routine, the high going edge is debounced for 49-microsecond at step 1360. If it is determined that the input is not good at step 1361, then the program returns from the LowInterrupt routine. However, if the input was good then the INTEDG2 flag is cleared and the program returns from the LowInterrupt routine at step 1362.

Every time HiInterrupt is executed the status register is saved and at the exit of the HiInterrupt routine the original status is restored. The next program segment that is executed is the HiInterrupt routine at step 1400. This routine can interrupt both the LowInterrupt routine and the Main loop at any time. There are two interrupt sources that execute the HiInterrupt routine. One is TMR1 overflow and the other is RB0 input (sync input). When HiInterrupt is executed, the first thing that is processed is the test of TMR1IF flag at step 1401. If the flag is not set, the program branches to step 1408. However, if the flag is set, the program continues with clearing the TMR1IF flag at step 1402. The next step is to increase the Stmr1u counter at step 1403. After increasing the counter, the program decreases the TachCount by one at step 1404. If the TachCount is determined to be zero at step 1405, the TachLost flag is set and the NoEEWrite flag is cleared at step 1406. Then, TachCount is set to zero at step 1407 and the program returns from the HiInterrupt routine. If it is determined that TachCount was not zero at step 1405, then the program returns from HiInterrupt without changing the before mentioned flags.

If it is determined that TMR1IF was not set at step 1401, the program branches to step 1408. In this routine, the INT0IF flag is tested. If the flag is set then the routine branches to the HiSyncIn routine at step 1409. In this routine, the flag INT0IF is cleared at step 1410 and the flag INTEDG0 is tested at step 1411. If the flag is not set, then the TMR1 value is copied into Stmr1 at step 1412 and the flag INTEDG0 is set at step 1413.

Next, the subroutine HiSyncTime is called at step 1414 where SyncTime is calculated. This is done by copying Stmr1 into SyncTime at step 1415. Then, SynctOld is subtracted from SyncTime, at step 1416 and the result is loaded in SyncTime. Before returning from subroutine, Stmr1 is copied into SynctOld register at step 1417. The program returns to HiSyncIn at step 1418, the AvgCounter is cleared at step 1418 and the routine returns to the calling the Hi Interrupt routine.

However, if it is determined that the INTEDG0 flag was set at step 1411, then the program clears the INTEDG0 flag at step 1419 and the TMR3 register is set to zero at step 1420. The flags for TMR0IF and TMR0IE are cleared at step 1421 and the TMR0 is loaded with CompTime at step 1422 calculated in Main. Then, the program waits in a loop until the TMR0 is timed out at step 1423. After TMR0 has timed out, TMR0 is cleared again at step 1424. Next, TMR0IF is cleared and TMR0IE interrupt is set at step 1425. Then, the display Led is turned off (Step 1426) and the subroutine GetTimer is called at step 1427).

In the GetTimer subroutine, the Ready_B flag is tested at step 1428. If the flag is set, then the program copies AleadOn into LedOn at step 1429 and APeakLedDiff into PeakLedDiff at step 1430 and return to step 1433. However, if the flag was not set then the program copies BLedOn into LedOn at step 1431 and BPeakLedDiff into PeakLedDiff at step 1432 and returns to step 1433.

Returning to the HiSyncIn routine, the complement of LedOn value is copied into TMR0 at step 1433 and the display LED us turned on at step 1434. Before leaving the subroutine, PeakRpm flag is set at step 1435 and PeakLedDiff value is complemented at step 1436.

If it is determined that the INT0IF flag was not set at step 1408, then the program tests for the TMR0IF overflow flag at step 1437. If the TMR0IF flag was not set, the program returns from the HiInterrupt routine. However, if the TMR0IF flag was set then the program continues with clearing TMR0IF and TMR0IE at step 1438. Further, TMR0 is cleared at step 1439 and the display Led is turned off at step 1440. The program now tests for ShiftTest flag at step 1441. If the flag is set, then the program branches to step 1448. However, if theShiftTest flag was not set, then the program tests for ShiftMode flag at step 1442. If this flag is set, the program branches to step 1448.

Then, if it is determined that the ShiftMode flag is not set at step 1442, the program tests for PeakRpm flag at step 1443. If the PeakRpm flag is not set, then the program branches to step 1448. Otherwise, PeakLedDiff is copied into TMR0 at step 1444 and TMR0IE flag is set at step 1445. The display LED is turned off at step 1446 and before leaving HiInterrupt, the PeakRpm flag is cleared at step 1447. At step 1448, the display LED is turned on for 10-microsecond. Before leaving HiInterrupt, the flags TMR0IE, TMR0IF are cleared at step 1449 and PeakRpm is cleared at step 1450.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A measuring gauge comprising:
    a rotatable LED pointer having a light output, the output of the LED pointer appearing an arc of light to a user as the pointer is rotated, the arc of light representing a quantity of a desired display unit;
    a rotary transformer;
    a brushless motor magnetically coupled to the LED pointer;
    a high speed controller coupled to the motor and the rotary transformer, the controller receiving an indication of the quantity and responsively programmed to actuate the rotary transformer in order to illuminate the LED pointer rotating radially about a face of a graduated lens at a substantially constant speed and to activate and deactivate the LED pointer so as to adjust the length of the arc of light and thereby to indicate the quantity of the desired display unit to the user;
    a touch switch to allow the user to view, reset, and program operating functions of the gauge; and
    circuitry for sensing the ambient light level for responsively controlling the intensity of the LED pointer and a LED shift light output.

2. The gauge of claim 1 wherein the high speed controller receives a signal indicating both a speed of the motor and an angular position of the motor and wherein the rotary transformer comprises a primary winding and a secondary winding; and
    wherein the high speed controller drives the primary winding of the rotary transformer, the primary winding being stationary, wherein the controller also drives the secondary winding, the secondary winding being magnetically coupled to the primary winding, the secondary winding rotating to provide a drive current to the LED pointer.

3. The gauge of claim 1 wherein the touch switch is mounted in a gage lens backside and the touch switch is polled by the high speed controller;
    wherein the touch switch has no moving parts and exposed electrodes;
    wherein the high speed controller performs debounce functions for the touch switch; and
    wherein the touch switch provides functions selected from a group comprising viewing a preset shiftlight value as an arc of light at a programmed shiftlight value; resetting a peak RPM value; and allowing the user to reset the shiftlight value.

4. The gauge of claim 1 wherein the circuitry for sensing ambient light is controlled by an adjustable voltage regulator and light sensing device; and
    wherein a voltage output of the circuitry is set to specific minimum and maximum voltage output values.

5. The gauge of claim 1 wherein the rotary transformer is driven by the high speed controller with a high frequency gated clock signal; and
    wherein the rotary transformer has a stationary primary winding and a rotating secondary winding; and wherein the transformer delivers power to the rotating LED pointer to produce a point of light and an arc of light visible to the user through a display lens.

6. The gauge of claim 1 wherein the desired unit is engine RPM.

7. The gauge of claim 1 wherein the desired units are air/fuel ratios.

8. The gauge of claim 1 further comprising an LED backlight portion for providing backlight for the display of the arc of light.

9. The gauge of claim 1 further comprising a power supply and input protection circuit for providing overvoltage protection to the controller.

10. The gauge of claim 1 further comprising a shift light driver and LED circuit for providing a shift light to a user.

11. The gauge of claim 1 further comprising a cylinder select BCD switch, the switch allowing a user to select a number of cylinders in an engine.

12. The gauge of claim 1 wherein the controller is further programmed to display an indicia representative of a peak value of the indication of the quantity to display on the lens.

13. A method of providing measurement information to a user comprising:
    receiving information indicating a quantity to be displayed;
    determining activation times of when to activate and deactivate an LED pointer to produce an arc of light as the pointer is rotated, the arc having a length based upon the quantity indicated in the received information; and
    rotating the LED pointer about a glass lens at a substantially constant rate of speed and activating the LED pointer according to the activation times to display the arc of light to a user.

14. The method of claim 13 further comprising determining a maximum value of the received information and displaying the maximum value to the user.

15. The method of claim 13 further comprising determining a minimum value of the received information and displaying the minimum value to the user.

16. The method of claim 13 wherein the receiving the information comprises receiving engine RPM data.

17. The method of claim 13 wherein the receiving the information comprises receiving air/fuel meter data.

18. The method of claim 13 further comprising providing an LED backlight portion for providing backlight for the glass lens.

19. The method of claim 13 further comprising providing a shift light to a user.

20. The method of claim 13 further comprising allowing a user to select a number of cylinders in an engine.

21. The method of claim 13 further comprising determining and displaying a both minimum and maximum peak values of the received information.

22. The method of claim 13 further comprising allowing the user to program a shiftlight value by displaying an arc of light representative of an RPM value.

23. A measuring gauge comprising:
a rotating light pipe having a light output, the output of the pipe reflected from a mirror about a lens and appearing an arc of light to a user, the arc of light representing a quantity of a desired display unit;
a stationary LED for providing light to the light pipe;
a brushless motor coupled to the light pipe; and
a high speed controller coupled to the motor, the controller receiving an indication of the quantity and responsively programmed to illuminate the LED in order to illuminate the light pipe radially about a face of the lens at a substantially constant speed and to activate and deactivate the stationary LED so as to adjust the length of the arc of light and thereby to indicate the quantity of the desired display unit to the user.

24. The gauge of claim 23 wherein a desired unit is engine RPM.

25. The gauge of claim 23 wherein a desired units are air/fuel ratios.

26. The gauge of claim 23 further comprising an LED backlight portion for providing backlight for the display of the arc of light.

27. The gauge of claim 23 further comprising a power supply and input protection circuit for providing over-voltage protection to the controller.

28. The gauge of claim 23 further comprising a shift light driver and LED circuit for providing a shift light to a user.

29. The gauge of claim 23 further comprising a cylinder select BCD switch, the switch allowing a user to select a number of cylinders in an engine.

30. The gauge of claim 23 wherein the controller is further programmed to display an indicia representative of a peak value of the indication of the quantity to display.

31. The method of claim 23 further comprising allowing the user to program a shiftlight value by displaying an arc of light representative of an RPM value.

* * * * *